United States Patent
Bax et al.

(10) Patent No.: US 7,375,937 B2
(45) Date of Patent: *May 20, 2008

(54) CURRENT FAULT DETECTOR AND CIRCUIT INTERRUPTER AND PACKAGING THEREOF

(75) Inventors: Ronald A. Bax, Burbank, CA (US); Rudy H. Rusali, Fountain Valley, CA (US); Timothy E. King, Auburn, WA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/678,496

(22) Filed: Feb. 23, 2007

(65) Prior Publication Data

US 2007/0139985 A1    Jun. 21, 2007

Related U.S. Application Data

(63) Continuation of application No. 11/242,246, filed on Oct. 3, 2005, now Pat. No. 7,248,451, which is a continuation of application No. 10/199,488, filed on Jul. 19, 2002, now Pat. No. 7,016,171, which is a continuation-in-part of application No. 09/954,474, filed on Sep. 14, 2001, now Pat. No. 6,618,229, which is a continuation-in-part of application No. 09/775,337, filed on Feb. 1, 2001, now Pat. No. 6,583,975.

(51) Int. Cl.
*H02H 3/00* (2006.01)

(52) U.S. Cl. ........................................ 361/42

(58) Field of Classification Search ............. 361/42
See application file for complete search history.

(56) References Cited

U.S. PATENT DOCUMENTS 3,512,045 A    5/1970    Tipton et al.

(Continued)

FOREIGN PATENT DOCUMENTS

DE    3504034    8/1986

(Continued)

OTHER PUBLICATIONS

Leach International, "Smart" Contactors, Application Notes, No. 104, Jun. 2000.

(Continued)

*Primary Examiner*—Stephen W. Jackson
(74) *Attorney, Agent, or Firm*—Fulwider Patton LLP

(57) ABSTRACT

A power controller is positioned within a current path between the line side and the load side of an electrical circuit. The power controller closes the current path in the presence of a control supply and opens the current path in the absence of the control supply. A power supply electrically connected to the current path provides the control supply. A sensor system receives power from the power supply, monitors the current in the current path and outputs a sensor signal indicative of a current condition within the current path. A logic controller also receives power from the power supply, receives the sensor signal and removes the control supply from the power controller when the sensor signal does not satisfy an established criteria. The sensor system may include one or both of an imbalance sensor for monitoring the current balance among two or more electrical lines and over-current sensors for monitoring current in individual lines.

21 Claims, 76 Drawing Sheets

U.S. PATENT DOCUMENTS

| | | |
|---|---|---|
| 3,611,038 A | 10/1971 | Benham |
| 3,800,121 A | 3/1974 | Dean et al. |
| 4,034,267 A | 7/1977 | Wilson |
| 4,093,977 A | 6/1978 | Wilson |
| 4,115,829 A | 9/1978 | Howell |
| 4,173,774 A | 11/1979 | Hyvarinen et al. |
| 4,205,358 A | 5/1980 | Washington |
| 4,271,444 A | 6/1981 | Howell |
| 4,347,540 A | 8/1982 | Gary et al. |
| 4,672,501 A | 6/1987 | Bilac et al. |
| 4,685,022 A | 8/1987 | Nichols, III et al. |
| 4,688,134 A | 8/1987 | Freeman et al. |
| 4,783,713 A | 11/1988 | Chen |
| 5,019,956 A | 5/1991 | Nakayama et al. |
| 5,047,890 A | 9/1991 | Kessler |
| 5,241,443 A | 8/1993 | Efantis |
| 5,309,311 A | 5/1994 | Ballada |
| 5,334,912 A | 8/1994 | Counts |
| 5,361,183 A | 11/1994 | Wiese |
| 5,521,787 A | 5/1996 | Baker et al. |
| 5,552,952 A | 9/1996 | Kramer et al. |
| 5,644,510 A | 7/1997 | Weir |
| 5,745,322 A | 4/1998 | Duffy et al. |
| 5,835,322 A | 11/1998 | Smith et al. |
| 5,966,280 A | 10/1999 | Cerminara et al. |
| 5,969,921 A | 10/1999 | Wafer et al. |
| 6,002,563 A | 12/1999 | Esakoff et al. |
| 6,091,591 A | 7/2000 | Heinz et al. |
| 6,246,332 B1 | 6/2001 | Hubbard |
| 6,246,556 B1 | 6/2001 | Haun et al. |
| 6,249,230 B1 | 6/2001 | Baldwin et al. |
| 6,266,219 B1 | 7/2001 | Macbeth et al. |
| 6,278,381 B1 | 8/2001 | Bogert |
| 6,278,596 B1 | 8/2001 | Simpson |
| 6,320,731 B1 | 11/2001 | Eaves et al. |
| 6,327,124 B1 | 12/2001 | Fearing et al. |
| 6,329,785 B1 | 12/2001 | Starkie et al. |
| 6,583,975 B2 * | 6/2003 | Bax .................... 361/93.1 |

FOREIGN PATENT DOCUMENTS

| | | |
|---|---|---|
| EP | 0 905 849 | 3/1999 |
| GB | 2318002 | 4/1998 |
| JP | U 4-28737 | 3/1992 |
| JP | 4-178109 | 6/1992 |
| JP | 4-200229 | 7/1992 |
| JP | 7-105819 | 4/1996 |
| JP | 8-223777 | 8/1996 |
| JP | 3062858 | 10/1999 |

OTHER PUBLICATIONS

Leach International, Application Notes, No. 105- Aircraft Ground Fault Detection and Protection—Mar. 2002.

Brochure—Eaton Aerospace—"Are Fault Circuit Interrupter" Jan. 2001, 4 pages.

Primex Aerospace Company—Ground Fault Current Detector P/N 436, 437—Jul. 26, 1999.

Federal Register/vol. 66 No. 88/May 7, 2001/Rules and Regulations, pp. 23129-23131.

Fuel Take Ignition Prevention, Conference notes Jun. 20, 2001 at Sea Tae Airport Hilton.

* cited by examiner

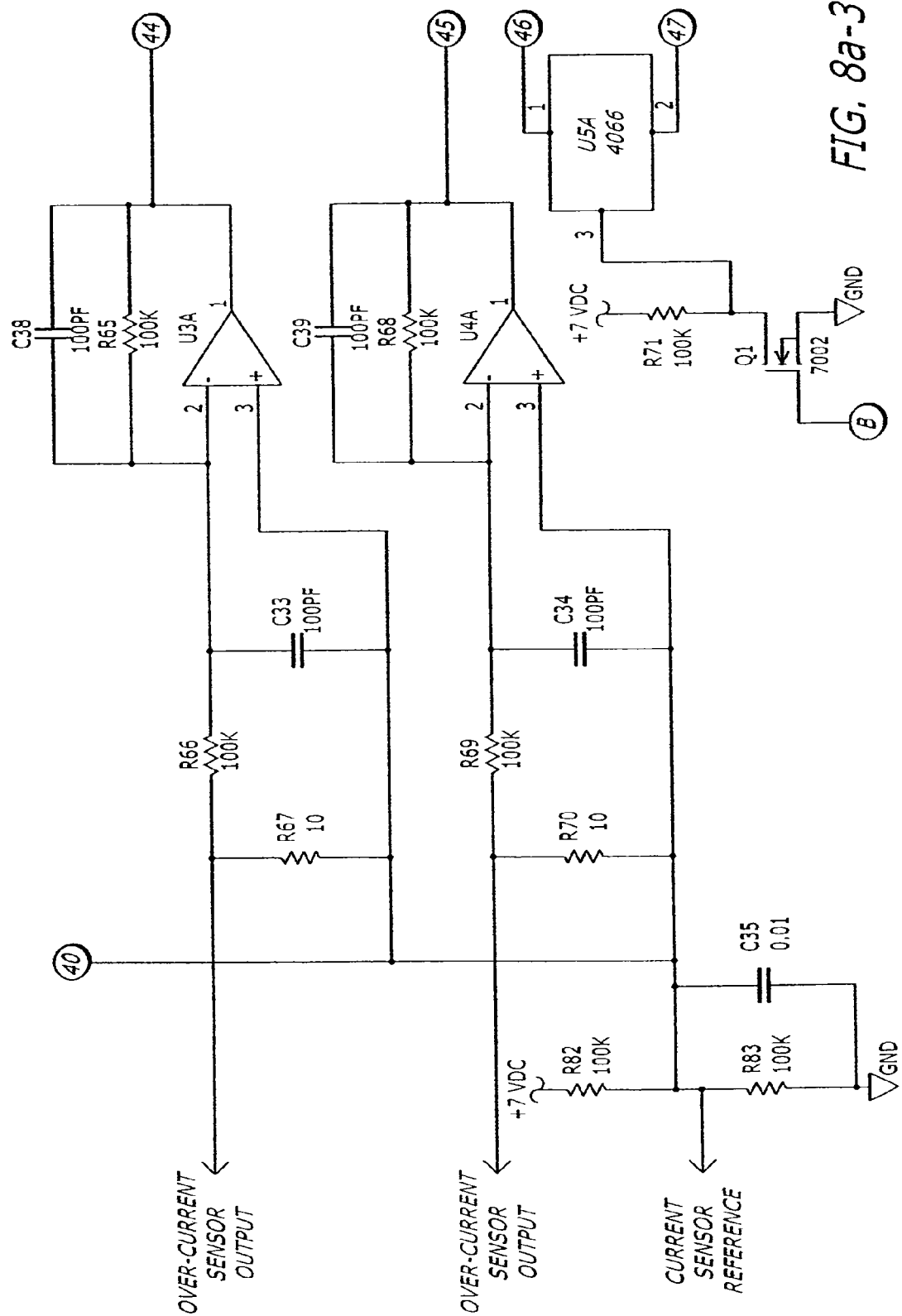

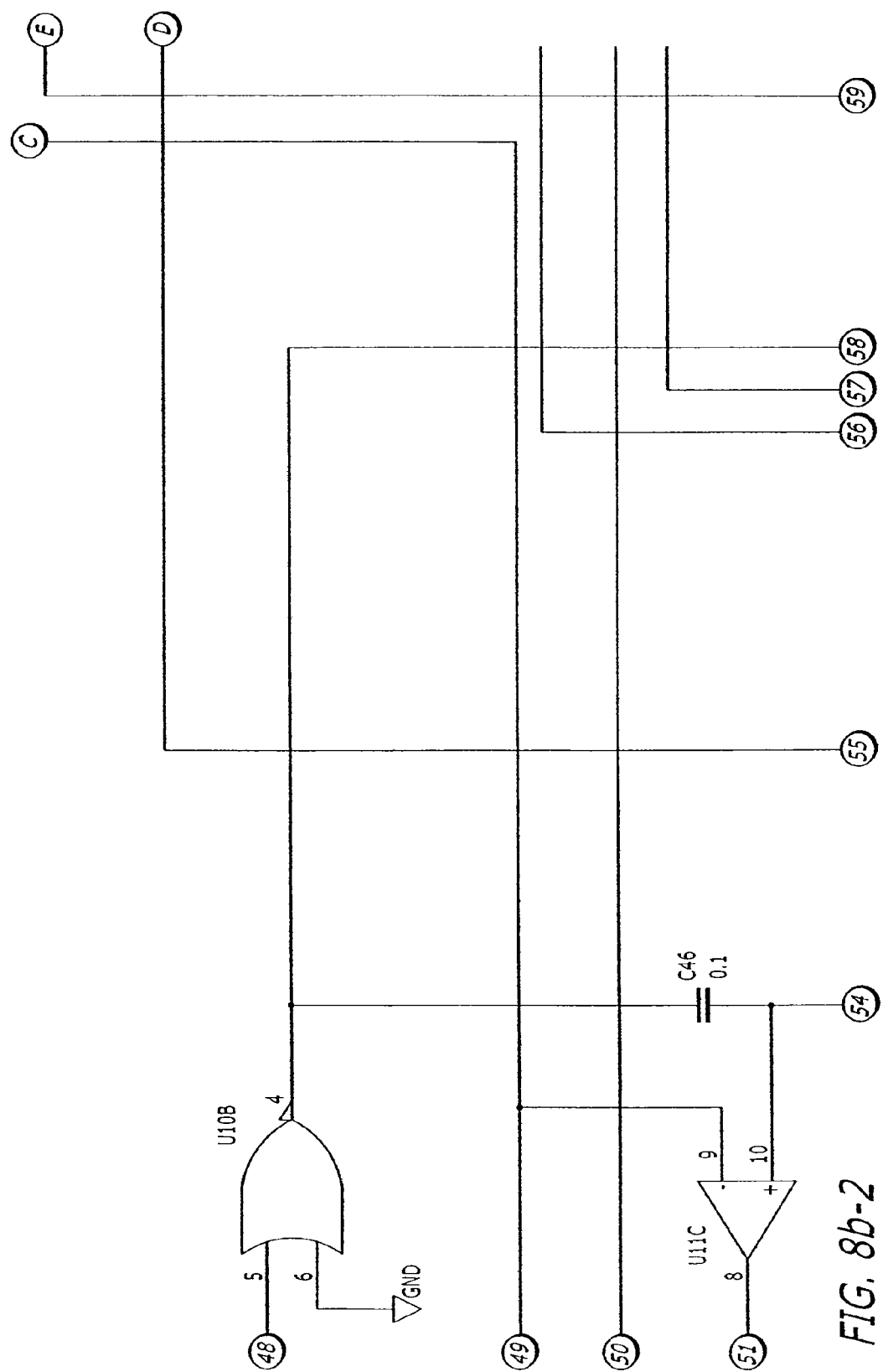

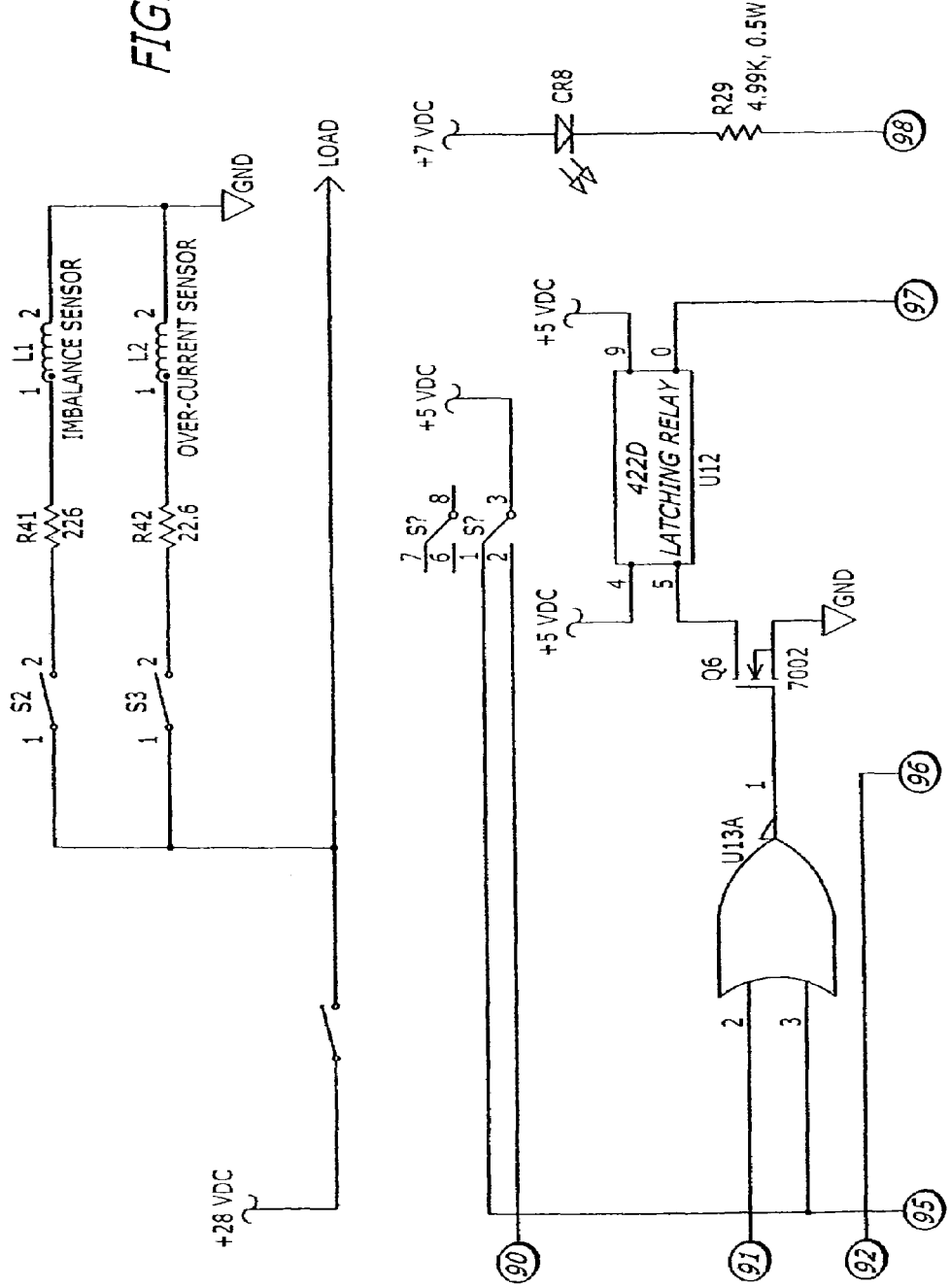

CURRENT FAULT DETECTOR AND CIRCUIT INTERRUPTER AND PACKAGING THEREOF

RELATED APPLICATIONS

This is a continuation of 11/242,246, filed Oct. 3, 2005, which is a continuation of 10/199,488, filed Jul. 19, 2002, now U.S. Pat. No. 7,016,171, which is a continuation-in-part of application Ser. No. 09/954,474, filed Sep. 14, 2001, now U.S. Pat. No. 6,618,229, which is a continuation-in-part of application Ser. No. 09/775,337, filed Feb. 1, 2001, now U.S. Pat. No. 6,583,975.

BACKGROUND OF THE INVENTION

1. Field of the Invention

This invention relates generally to electrical control systems, and more specifically to an aircraft electrical control system that monitors the current condition in a current path and interrupts the current path upon detection of a current fault.

2. Description of the Related Art

In the electromechanical arts, current imbalances are indicative of serious problems that can lead to disastrous results, such as arcing within fuel pumps. Since fuel pumps are often housed within a fuel vessel to directly pump fuel out of the vessel, arcing within a fuel pump can lead to an explosion of fuel-air mixture and a subsequent breach of the fuel vessel, which can be catastrophic. In light of the seriousness of such an event, a device or methodology is needed which can suppress this type of arcing, as well as other associated problems. Presently, a common type of circuit protection device being utilized in aircraft is a thermal circuit breaker. However, arcing typically does not cause thermal circuit breakers to activate. Thus, there has been a long-felt need for the function of current imbalance detection in an aircraft. One very important form of current imbalance is a ground fault in which current is flowing between a circuit or electrical device to ground, when such current flow is not desired. In the prior art, ground fault detection has been addressed by a separate ground fault interruption unit. However, such prior art systems have had limitations, including the necessity of rewiring the aircraft In addition to the requirement to rewire the aircraft, additional space had to be found to accommodate the ground fault interruption system.

One currently available ground fault interruption unit made by Autronics (model 2326-1) has been used in large commercial aircraft for the purpose of ground fault protection for fuel pumps. The Autronics unit detects a ground fault and outputs a signal indicative of a fault by use of a current transformer and acts by removing power to the fuel pump control relay.

There exists a need for an improved circuit protection device for aircraft. It would further be desirable for the circuit protection device to be included within an existing device in the aircraft, or to be packaged with an existing device, sharing the same connections to existing electrical circuits, since space for avionics is limited in any aircraft and adding wiring to accommodate a new device is very difficult. The present invention addresses these and other concerns.

SUMMARY OF THE INVENTION

Briefly, and in general terms, the invention is directed to devices and method for monitoring the current conditions within a current path between the line side and load side of an electrical circuit and interrupting the current path when a current fault condition is detected.

In one currently preferred embodiment, the invention is a device for interrupting a current path between the line side and the load side of an electrical circuit. The device includes a power supply that is electrically connected to the current path, either at the line side or the load side. The device also includes a power controller that is positioned within the current path. The power controller is adapted to close the current path in the presence of a control supply and open the current path in the absence of the control supply. The device further includes a sensor system and a logic controller. The sensor system receives power from the power supply, monitors the current in the current path and outputs a sensor signal indicative of a current condition within the current path. The logic controller also receives power from the power supply, receives the sensor signal and removes the control supply from the power controller when the sensor signal does not satisfy an established criteria.

In a detailed aspect of the device, the control supply is provided by the power supply and the power supply is adapted to, when the power controller is open and the sensor signal satisfies the established criteria, output a control supply having a first voltage for a first amount of time that sufficient to cause the power controller to close the current path. After the first amount of time, the power supply outputs a control supply having a second voltage, less than the first voltage, sufficient to hold the power controller in the closed position. In other detailed facets of the device, the sensor system includes either a single sensor associated with the three electrical lines of a three-phase AC system or the two lines of a DC system for providing a current balance measurement among the lines, or individual sensors, each associated with one of the electrical lines of the current path, for providing individual current measurements for each electrical line, or a combination of both.

In another currently preferred embodiment, the invention is an integrated current fault detection/circuit breaker that includes a circuit breaker adapted to be positioned within a current path having a line side and a load side and a power supply electrically connected to the current path. The device also includes a sensor system that receives power from the power supply, monitors the current in the current path and outputs a sensor signal indicative of a current condition within the current path. The device further includes a controller that receives power from the power supply, receives the sensor signal and opens the circuit breaker when the sensor signal does not satisfy an established criteria.

In another aspect, the invention relates to a method of interrupting a current path between the line side and the load side of an electrical circuit having a power supply electrically connected thereto. The method includes positioning a power controller in the current path. The power controller is adapted to be in a closed position when provided with a control supply and in an open position otherwise. Monitoring the current in the current path and outputting a sensor signal indicative of a current condition within the current path using a sensor system and providing the control supply to the power controller only when the sensor signal satisfies an established criteria.

In a detailed aspect, the method further includes monitoring the voltage level of the power provided to the sensor system by the power supply and ignoring the sensor signal when the voltage level to the sensor system is less than a predetermined value. By ignoring the sensor signal the current fault detection aspect of the system is essentially inhibited until such time the voltage supply is at or above the predetermined value. In a related detailed aspect, the method further includes monitoring an external on/off power switch and removing the control supply from the power controller when either of the following conditions occur: the sensor signal does not satisfy the established criteria, or the external power switch is off. In yet another detailed facet, the established criteria is dependent on the operating current of the electrical load connected to the load side which may have a first operating current for a first amount of time and a second operating current for a second amount of time In this case, the method further includes setting the established criteria to a first level based on the first operating current during the first amount of time and a second level based on the second operating current during the second amount of time.

In another aspect, the invention relates to a device for monitoring the current path through an electrical circuit having a line side and a load side and a power controller therebetween. The power controller closes the current path in the presence of a control supply and opens the current path in the absence of the control supply. The electrical circuit is housed within a housing and the device includes a power supply that is also housed within the housing and is electrically connected to the current path. The device also includes a sensor system and a logic controller both of which are also housed within the housing. The sensor system receives power from the power supply, monitors the current in the current path and outputs a sensor signal indicative of a current condition within the current path. The logic controller receives power from the power supply, receives the sensor signal and removes the control supply from the power controller when the sensor signal does not satisfy an established criteria. In a detailed aspect, the device further includes a flexible printed wiring board positioned around a portion of the power controller and circuitry comprising at least one of the power supply, sensor system and logic controller is mounted on the board.

In another facet, the invention relates to a method of replacing an existing power controller positioned between the load side and line side of an electrical current path and housed within a housing having a specific form factor. The method includes removing the existing power controller from the current path and providing a device adapted to monitor a current condition through the current path and interrupt the current path when the current condition does not satisfy an established criteria The device is housed within a housing having substantially the same form factor as that of the removed power controller. The method further includes installing the device within the current path at the location where the removed power controller was previously located.

In another facet, the invention relates to a device for closing a current path between the line side and the load side of an electrical circuit The device includes a power controller having an opened position and a closed position The power controller is located within the current path and switches from the open position to the closed position in the presence of a first control supply and maintains the closed position in the presence of a second control supply. The device further includes a power supply which, when the power controller is open, outputs the first control supply having a first voltage for a first amount of time and after the first amount of time, outputs the second control supply having a second voltage, less than the first voltage and sufficient to hold the power controller in the closed position.

In another aspect, the invention relates to a device for interrupting a current path between the line side and the load side of an electrical circuit that is connected to an electrical load having an associated first operating current for a first amount of time and a second operating current for a second amount of time. The device includes a power controller that is positioned within the current path. The power controller closes the current path in the presence of a control supply and opens the current path in the absence of the control supply. The device also includes a sensor system that monitors the current in the current path and outputs a sensor signal indicative of a current condition within the current path. The device further includes a logic controller that receives the sensor signal and during the first amount of time compares the sensor signal to a first established criteria defined by the first operating current and removes the control supply from the power controller if the sensor signal does not satisfy the first established criteria. During the second amount of time, the logic controller compares the sensor signal to a second established criteria defined by the second operating current and removes the control supply from the power controller if the sensor signal does not satisfy the second established criteria.

These and other aspects and advantages of the invention will become apparent from the following detailed description and the accompanying drawings which illustrate by way of example the features of the invention.

BRIEF DESCRIPTION OF THE DRAWINGS

FIGS. 3-1 through 3-3 form a schematic diagram of the power supply of FIG. 2;

FIGS. 5a-1 through 5c-4 form a schematic diagram of the logic controller of FIG. 2;

FIGS. 7-1 through 7-3 form a schematic diagram of the power supply of FIG. 6;

FIGS. 8a-1 through 8c-4 form a schematic diagram of the logic controller of FIG. 6;

FIGS. 12-1 and 12-2 form a schematic diagram of the logic controller of FIG. 9;

FIGS. 17-1 and 17-2 form a schematic diagram of the logic controller of FIG. 14;

FIG. 19b through 19d are top, front and bottom views respectively of the device of FIG. 19a;

FIG. 20b through 20d are top, front and bottom views respectively of the device of FIG. 20a;

FIG. 21b through 21d are top, front and bottom views respectively of the device of FIG. 21a;

FIG. 24b through 24d are top, front and bottom views respectively of the device of FIG. 24a;

FIGS. 27a-1 through 27c-4 form a schematic diagram of the logic controller of FIG. 25;

FIG. 30b and 30c are top and front views respectively of the device of FIG. 30a;

DETAILED DESCRIPTION OF THE PREFERRED EMBODIMENTS

Figure 1:
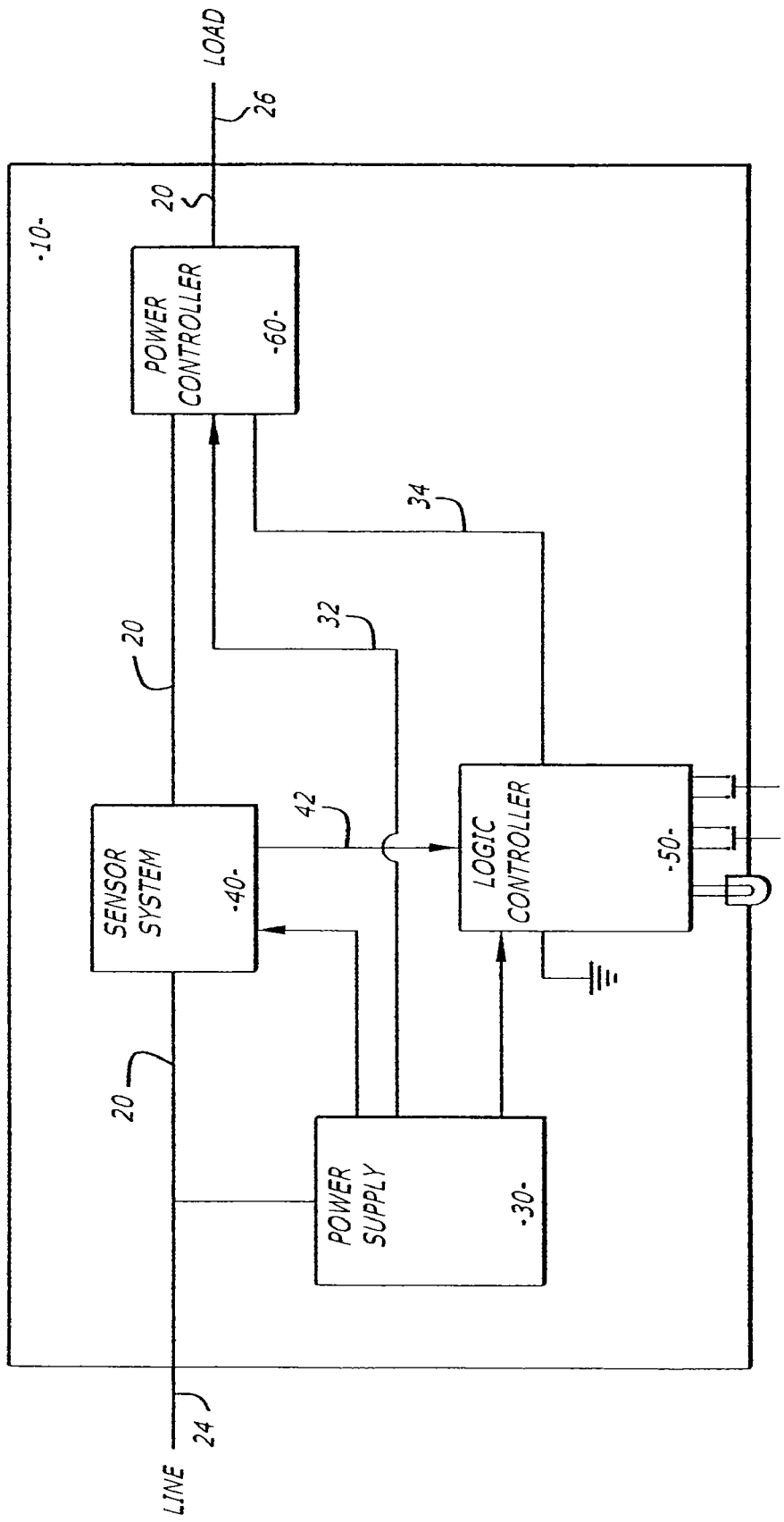
FIG. 1 is a general block diagram of a system configured in accordance with the invention including a power supply, a sensor system, a logic controller and a power controller.

Referring now to the drawings, which are provided for purposes of illustration and not by way of limitation, and particularly to FIG. 1, there is shown a system 10 constructed in accordance with the present invention for interrupting a current path 20 between the line side 24 and the load side 26 of an electrical circuit upon detection of a current fault-condition within the electrical circuit. A current fault-condition may be the result of a current imbalance condition or an over-current condition within the electrical circuit.

In one of its most basic forms, the system 10 includes a power supply 30, a sensor system 40, a logic controller 50 and a power controller 60. The power supply 30 provides power to the logic controller 50, the sensor system 40 and the power controller 60. The power controller 60 may be an electromechanical relay, either AC coil or DC coil, or a solid state device. Coil type relays are powered by a control supply 32 provided by the power supply. The return path 34 for the control supply 32 passes through the logic controller 50. In other embodiments, the control supply 32 is fed directly to the power controller 60 through an external switch instead of the power supply 30.

The sensor system 40 monitors the current passing through the current path 20 and outputs one or more sensor signals 42 indicative of current conditions in the current path. The logic controller 50 receives the one or more sensor signals 42 from the sensor system 40 and removes power from the power controller 60 when at least one of the sensor signals does not satisfy an established criteria. The established criteria is described further below, but in general defines the boundaries of acceptable current imbalance and over-current conditions within the electrical circuit. When the sensor signal does not satisfy the established criteria, the logic controller 50 interrupts the return path 34 of the control supply 32. This causes the power controller 60 to interrupt the current path 20 thereby removing power to the load side 26 of the circuit. The logic controller 50 includes circuitry and external switches related to fault indication and system testing and resetting. Upon interruption of the current path 20, the logic controller 50 provides a fault indication which may be an illuminated LED or a mechanical indicator (not shown). Mechanical indicators are beneficial in that they do not require electrical power, thus if the power to the system is shut off the fault is still indicated.

The system 10 of the invention is adaptable for use in various aircraft and various systems within the aircraft. For example the system may be incorporated into any one of the Boeing 737, 747, 757, 767, DC-10, MD11 and Airbus fuel systems as a means of monitoring the power circuit being used to supply power to the pumps within the aircraft fuel system. The system 10 may also find application in other aircraft systems employing electromechanical devices or solid state switches such as the braking system which includes hydraulic pumps/motor and shut-off valves and the aircraft environment system which includes switch controlled lights, fans, ovens, etc.

The systems of the invention may be categorized into three general configurations. The first general configuration is an integrated current-fault protection/power controller. This configuration incorporates current-fault protection into a power control relay and is intended to replace existing aircraft system relays. The second general configuration is an integrated current-fault protection/circuit breaker. This configuration incorporates current-fault protection into a circuit breaker and is intended to replace existing aircraft system circuit breakers. The third general configuration is a standalone current-fault protection device. This configuration does not replace existing aircraft system components and instead is an additional device intended to be installed between existing aircraft circuit breakers and aircraft loads. Each of these three configurations is described below within the context of aircraft fuel systems. Application of these systems, however, is not limited to fuel systems.

Integrated Current-Fault Protection/Power Controller

Each of the pumps within a fuel system typically receives its power from a three phase AC power supply, via an electromechanical relay. The relay itself is typically a DC coil relay, although an AC coil relay may be used. DC coil relays are currently preferred due to their faster response time, which is approximately 10-15 microseconds (usec) maximum. A typical AC coil relay has a response time of approximately 15-50 usec. However, AC coil relay designs that approach the response time of the DC coil relay are currently being developed within the industry. Depending on the type of relay, either an AC control supply or a DC control supply powers the relay. These control supplies are at times referred to as pump inputs. The power input to the relay is typically switchable through a cockpit switch.

The system of the invention is intended to replace the relays used in typical aircraft fuel systems. To this end, the system may take anyone of several configurations, depending on the type of relay being used in the existing aircraft system and the type of switchable pump input. For example, the Boeing 757 and the DC-10 aircraft employ a DC relay coil and an AC pump input. The Boeing 737, 747 and 767 and Airbus aircraft employ a DC relay coil and a DC pump input. For each of these existing aircraft configurations, the system includes a corresponding relay and the circuitry necessary to power the relay. The system of the invention is not limited to these existing aircraft system configurations and is fully adaptable to use in various contemplated systems. For example, the system may be configured to include an AC relay for use with either one of an AC pump input or DC pump input. Following are descriptions of various configurations of the system. For ease in describing the configurations, they are categorized based on their relay type and pump input type.

DC Relay with DC Pump Input

Figure 2:
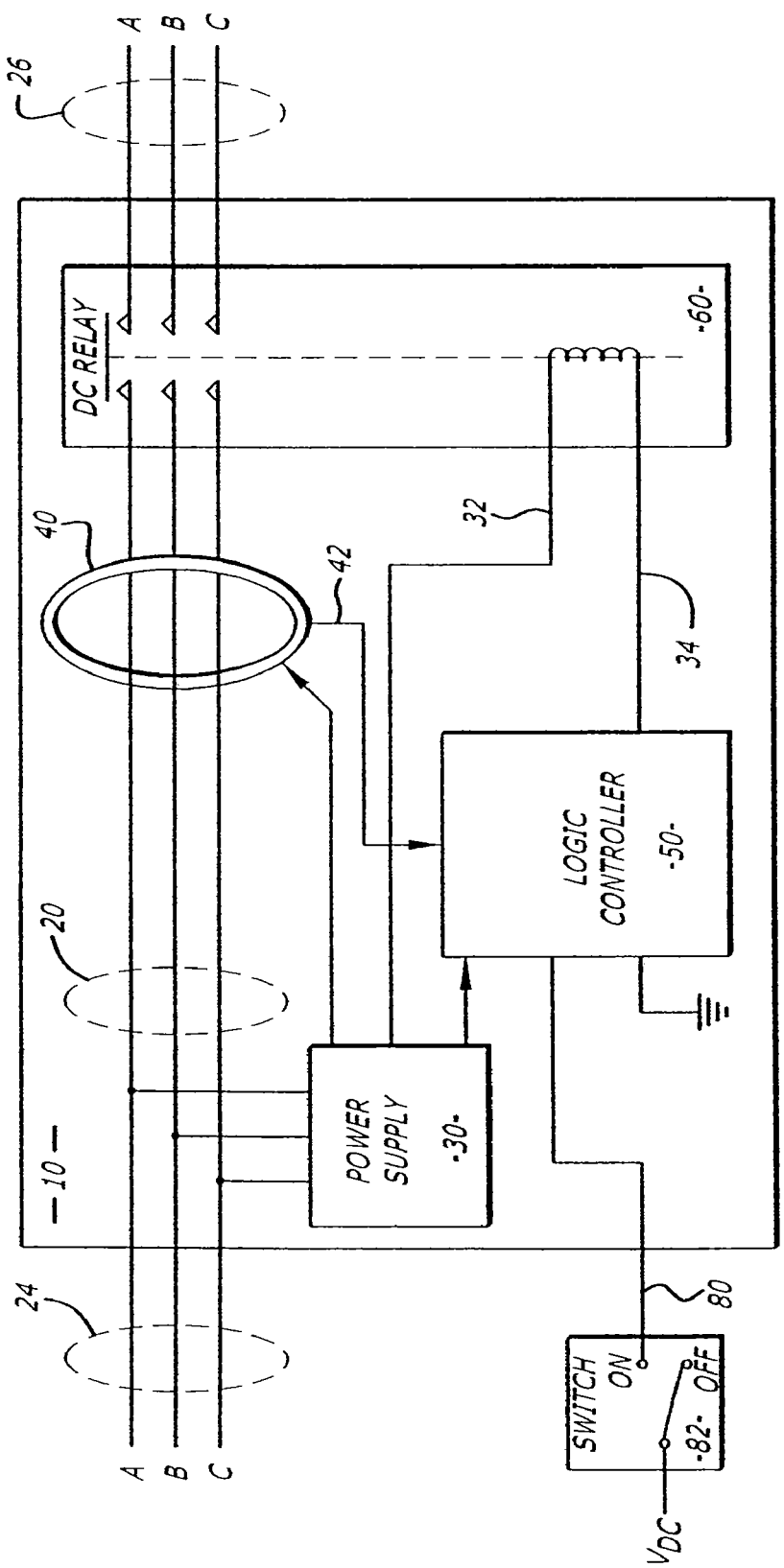
FIG. 2 is block diagram of one configuration of the system including a power supply, a sensor system comprising a current imbalance sensor, a logic controller, an external DC pump input switch and a power controller comprising a DC relay.

With reference to FIG. 2, there is shown a system 10 for use in an aircraft fuel system having a DC pump input 80 and an DC-coil relay 60, such as is present in the Boeing 737/747 Classic aircraft. The system 10 includes a power supply 30 that taps off of each of the 115 VAC three phase lines at the input side 24 of the electrical circuit. The power supply 30 provides power to the sensor system 40, the logic controller 50 and the DC relay 60. The DC pump input 80 to the logic controller 50 is provided by a cockpit pump switch 82 which receives power from an aircraft DC power source.

Figures 1, 3:
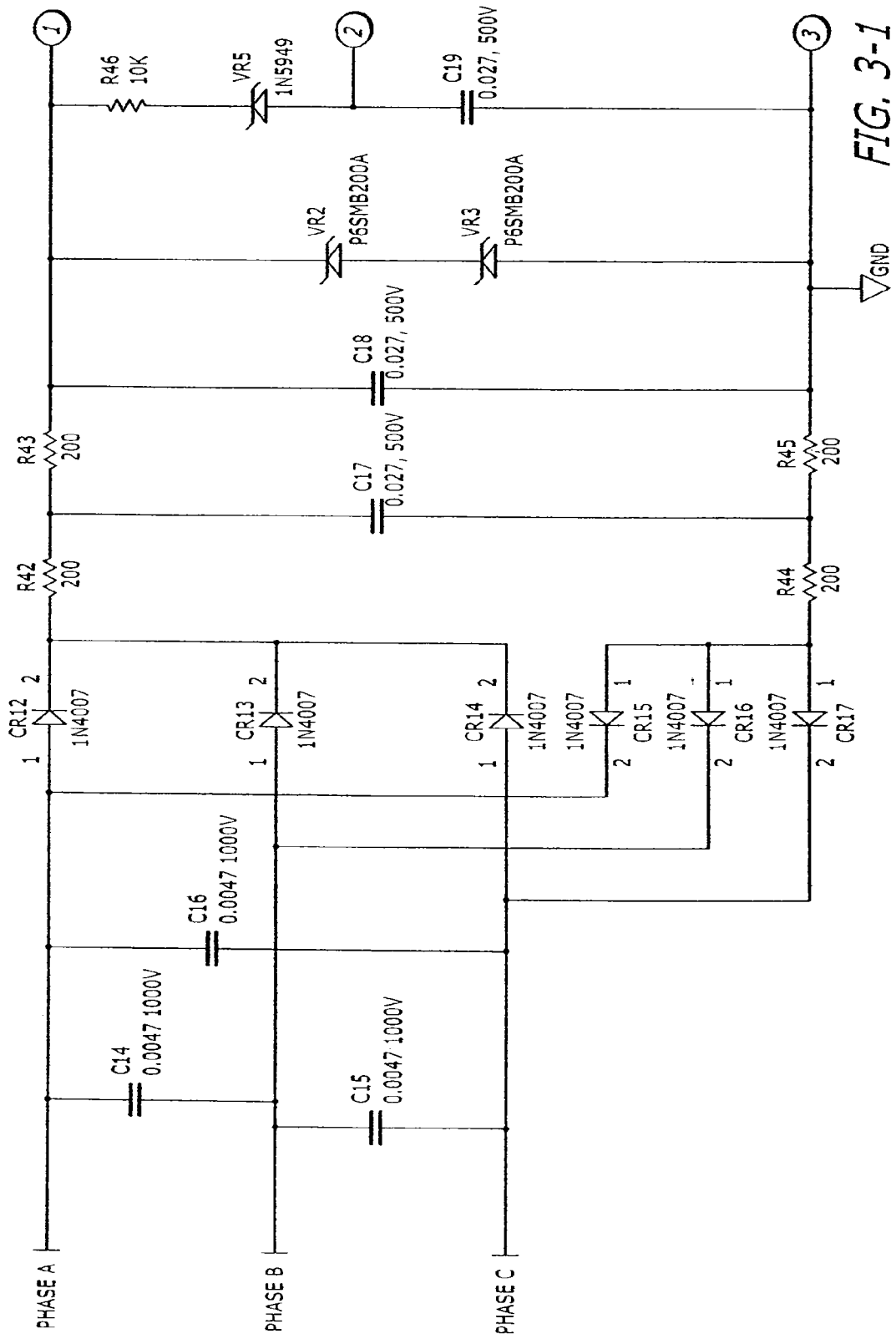
Figures 2, 3:
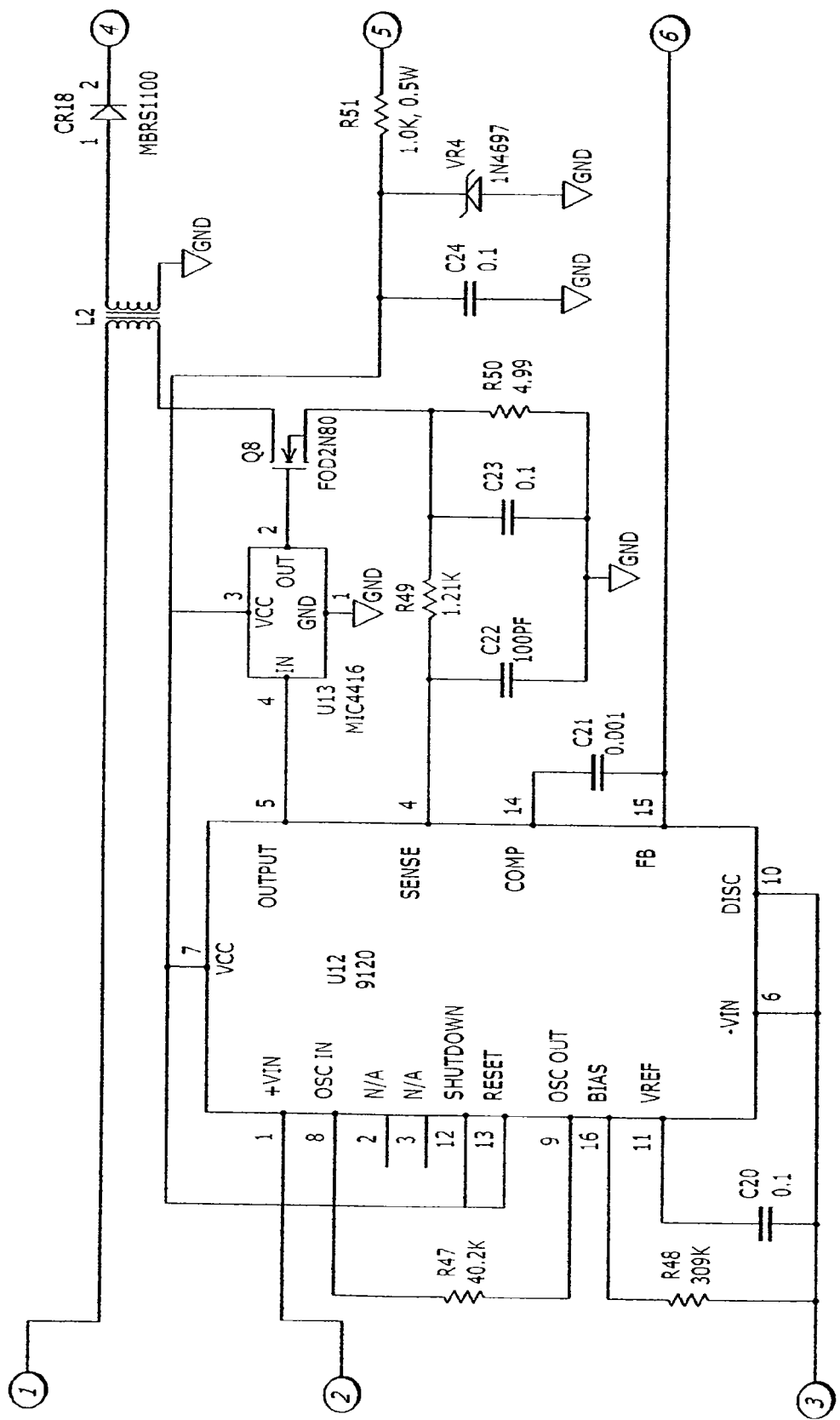
Figure 3:
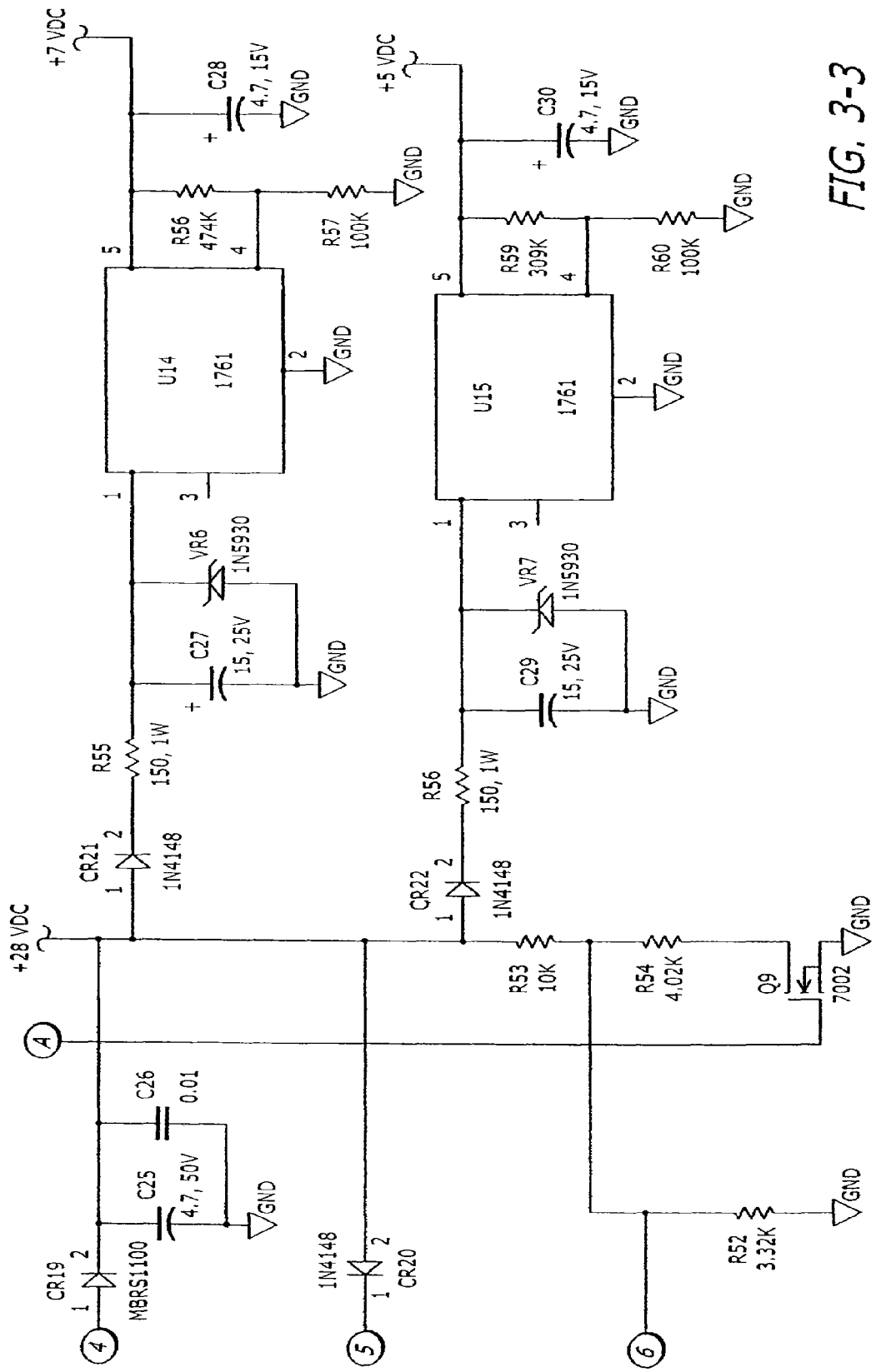

With reference to FIGS. 3-1 through 3-3, in one preferred embodiment, the power supply is a fly-back type switching power supply with two linear power supplies U14 and U15. Power supply U14 provides 7 VDC to the current sensor U7 (FIG. 4) in order to get the maximum gain out of the current sensor while power supply U15 provides 5 VDC to the logic controller circuitry (FIGS. 5a-1 through 5c-3). As explained later below, the power supply also provides either 28 VDC or 16 VDC control supply to the power controller.

At the input side of the power supply, diodes CR12, CR13, CR14, CR15, CR16 and CR17 form a full-wave three-phase bridge. Capacitors C17 and C18 act as storage devices for the approximate 300V peak voltage produced by the bridge. Resistors R42, R43 provide a filtering function, with resistor R42 and capacitor C17 functioning as one RC network and resistor R43 and capacitor C18 functioning as another RC network of a two-pole filter. Resistors R44 and R45 provide EMI protection against noise going back out the input through any of diodes CR15, CR16 and CR17. Diodes VR2 and VR3 protect the control circuit U12 and transistor Q8 against voltage spikes that exceed their respective operating capabilities, which in one configuration are 450V and 800V.

Control circuit U12 senses the voltage across the primary winding of transformer L2 through transistor Q8. Resistor R49 and capacitor C22 filter noise going to the sense input of control circuit U12. If control unit U12 senses the output voltage is low, it turns on and remains on until the current through transformer L2 reaches a predetermined amount. Resistor R50 allows the current going through transformer L2 to build up to the predetermined amount. Once the predetermined amount is reached, the device shuts off and energy is transferred to the secondary side of transformer L2. At the secondary side, capacitor C26 filters out high frequency noise while capacitor C25 stores the majority of the energy. Energy from the secondary side of transformer L2 is then provided to linear power supplies U14 and U15.

Returning to FIG. 2, the sensor system 40 includes a single sensor surrounding the three, three-phase electrical lines which form the current path 20. The sensor 40 determines the current condition in the current path 20 by providing an output sensor signal 42 indicative of the current balance among the electrical lines.

Figure 4:
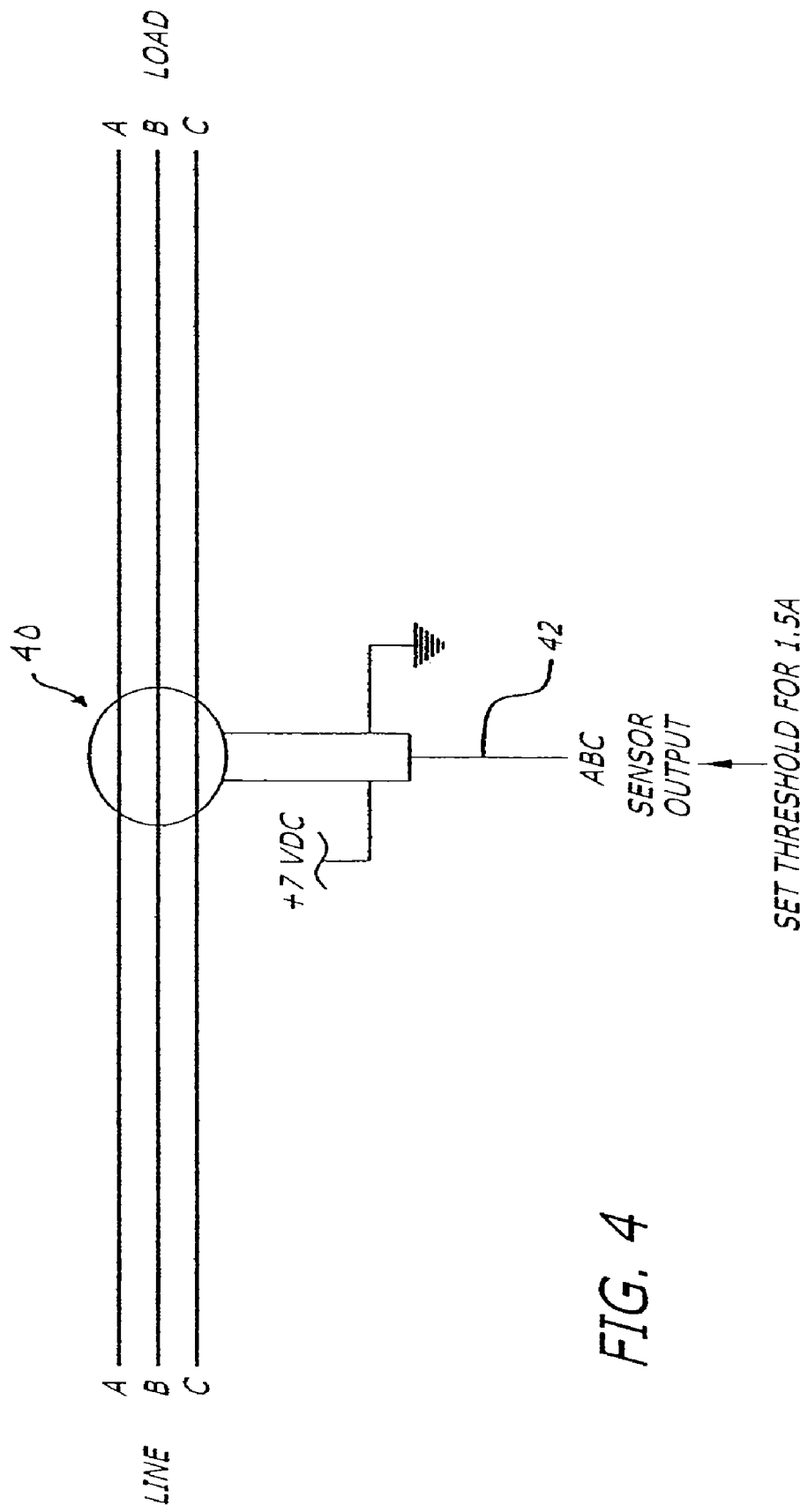
FIG. 4 is a schematic diagram of the current imbalance sensor of FIG. 2.

With reference to FIG. 4, in one embodiment, the sensor 40 is a Hall effect sensor such as an Amploc Pro 5 Hall effect linear current sensor. In alternate embodiments, the sensor 40 may be a current transformer or a giant magneto resistive (GMR) device. The sensor 40 has an output of 233 mV/A when operated at 10V. Ground fault detection is accomplished by monitoring the current of all three phases with the single current sensor. The current sensor 40 algebraically sums the magnetic flux generated by the three phase currents and produces an output signal 42 that is proportional to the result. Since 3-phase AC fuel pumps typically have an ungrounded neutral, the system is "closed", requiring the current going to the fuel pump to be equal and opposite the return current. Therefore, when a ground fault condition does not exist, the magnetic flux measured at the current sensor is zero. When a ground fault condition occurs, current flows to ground (which does not return through the sensor), breaking the closed loop system and resulting in a magnetic flux imbalance measured at the sensor. Since the flux imbalance is proportional to the current, the output of the sensor provides the magnitude of the current loss. In a preferred embodiment, the output of the sensor is approximately one-half of the supply voltage, for no measured imbalance.

Returning to FIG. 2, the sensor signal outputs 42 from the sensor systems 40 are received by the logic controller 50. The logic controller 50 compares the sensor signals 42 against an established criteria and interrupts the return path 34 of the power supply 32 if the criteria is not satisfied. This removes the drive signal to the power controller 60 and causes the DC relay to latch to a tripped condition and interrupt the current path 20 to the load side 26. The logic controller 50 includes circuitry and external switches related to fault indication and system testing and resetting, these switches are not shown in FIG. 2 to preserve clarity of illustration.

Figures 1, 5A:
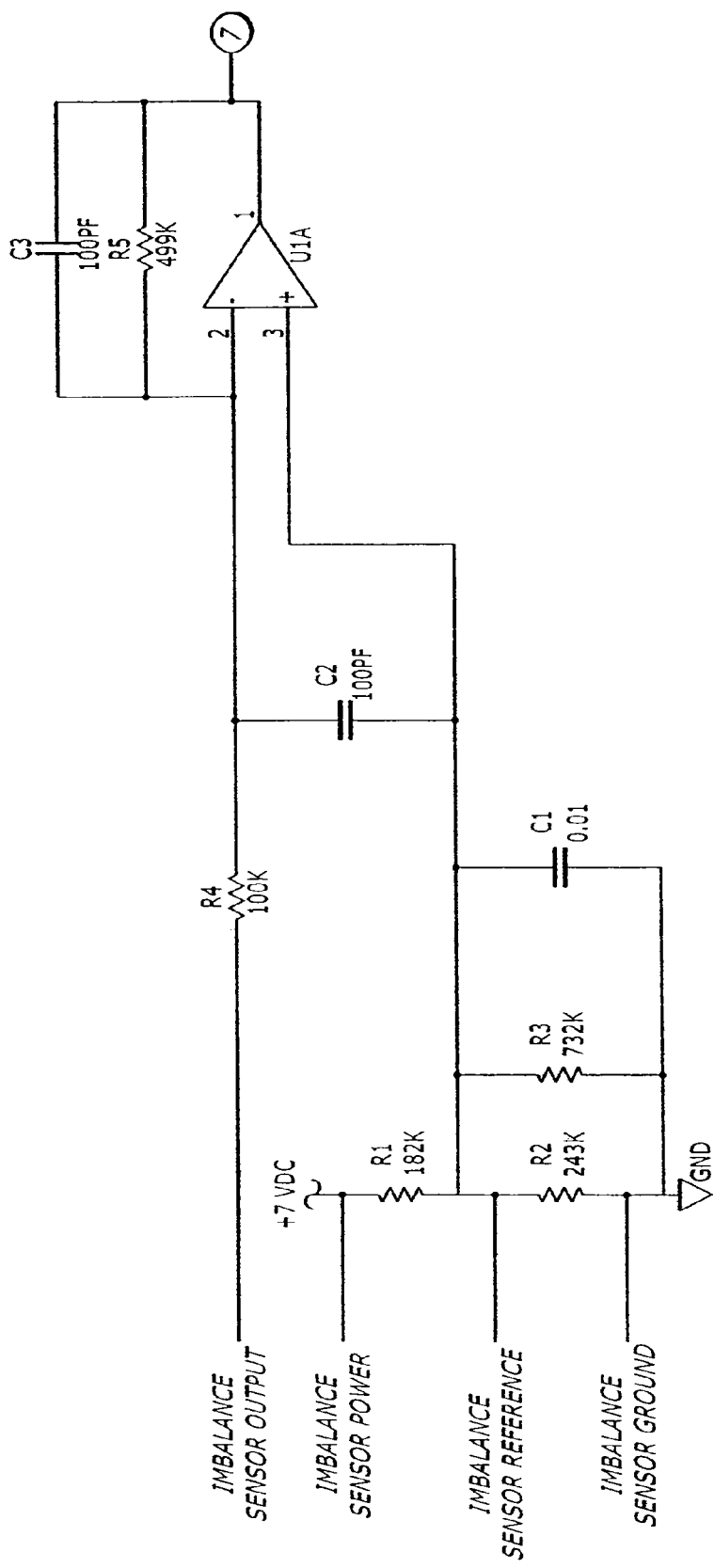
Figures 2, 5A:
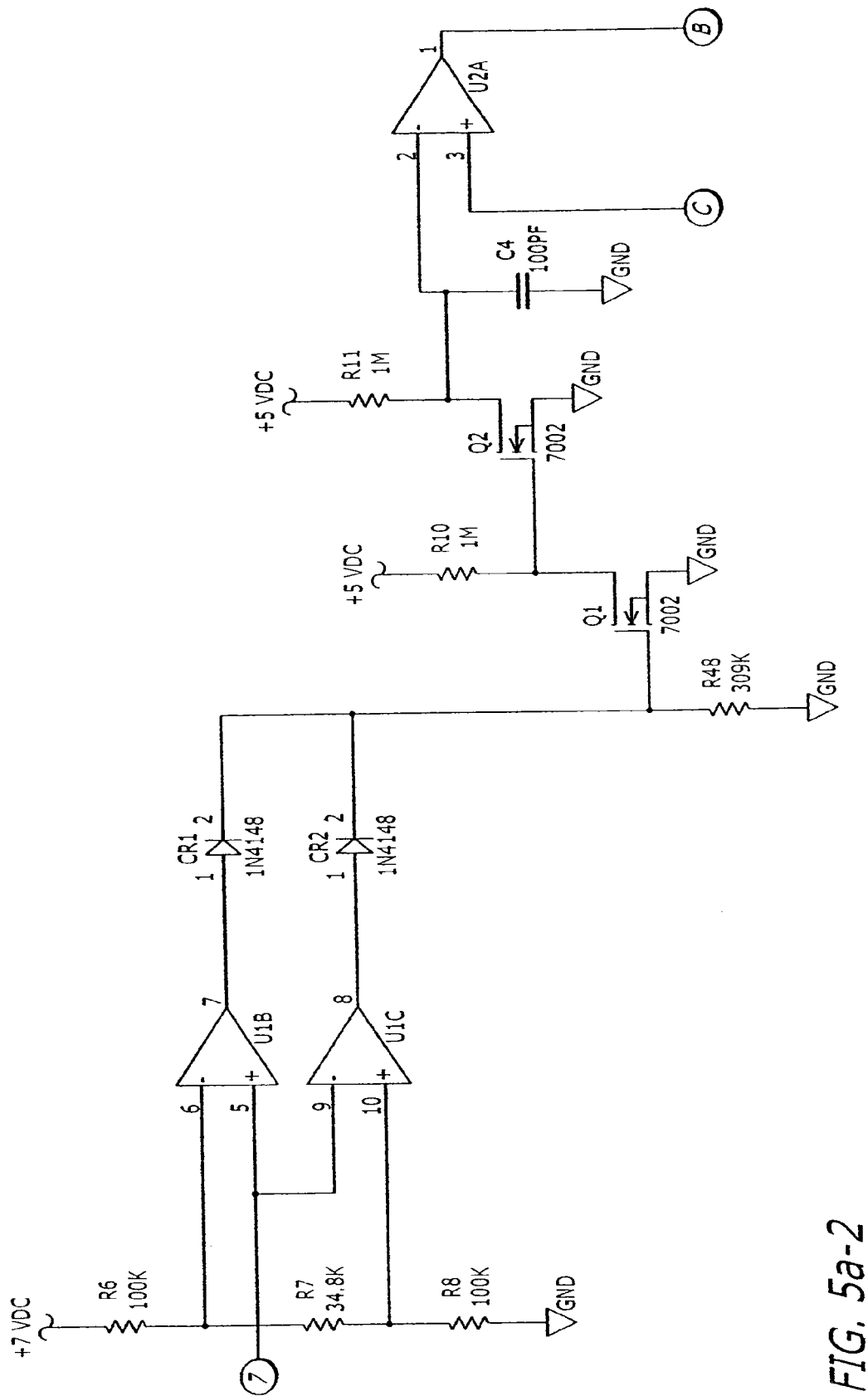

With reference to FIGS. 5a-1 through 5a-3, the sensor output is input to amplifier U1A, which adjusts the gain of the sensor output signal. Amplifier U1A also functions as a lowpass filter for the purposes of protecting against the threat of EMI or lightening. Resistors R6, R7 and R8 set the established criteria against which the sensor output signal is compared. Specifically, the resistors set the voltage reference levels at pin 6 of U1B and pin 10 of U1C such that one voltage corresponds to the upper threshold voltage while the other corresponds to the lower threshold voltage. These voltage levels in turn correspond to upper and lower current imbalance thresholds, which in one embodiment are +1.5 A RMS and −1.5 A RMS respectively.

Figures 1, 5B:
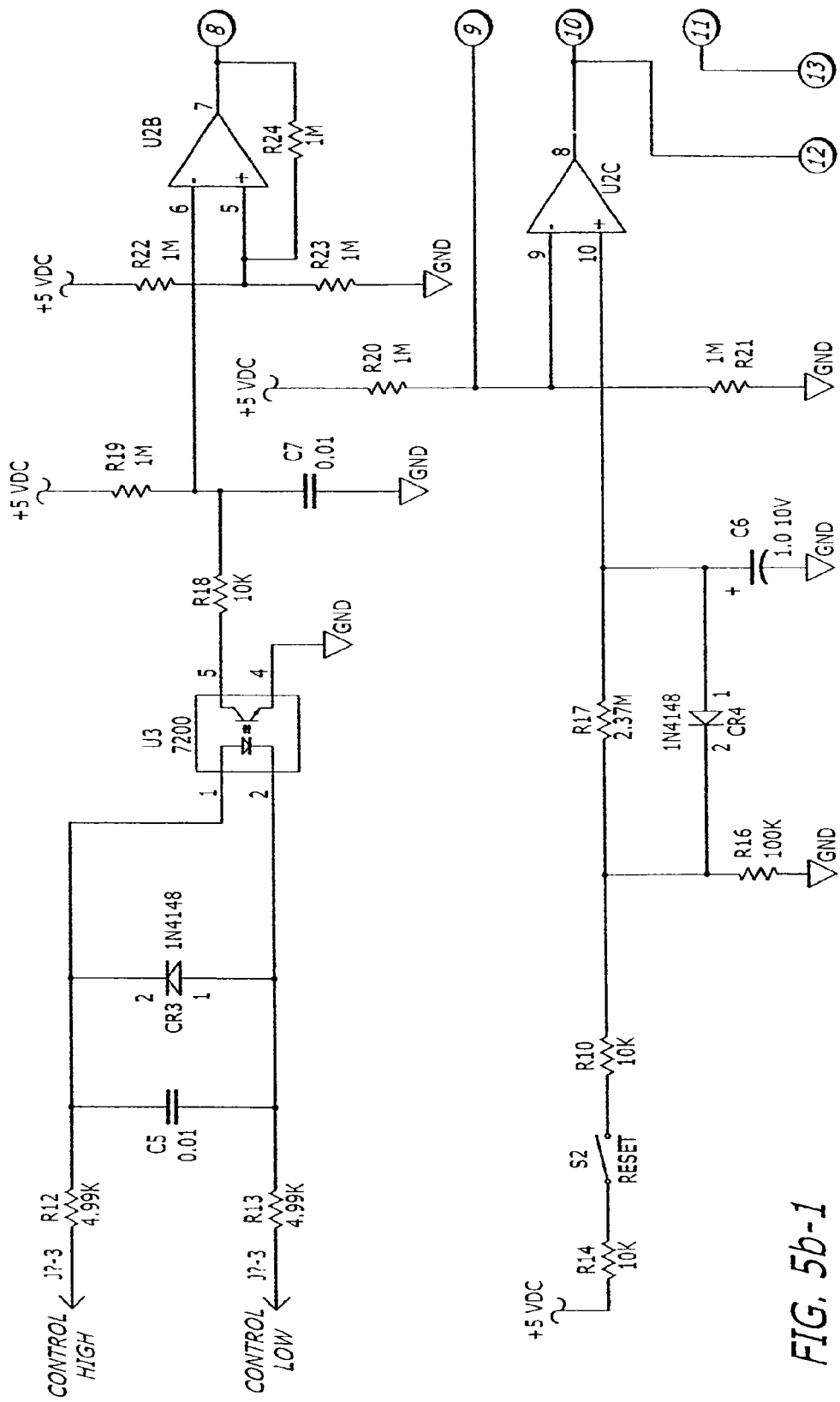
Figures 2, 5B:
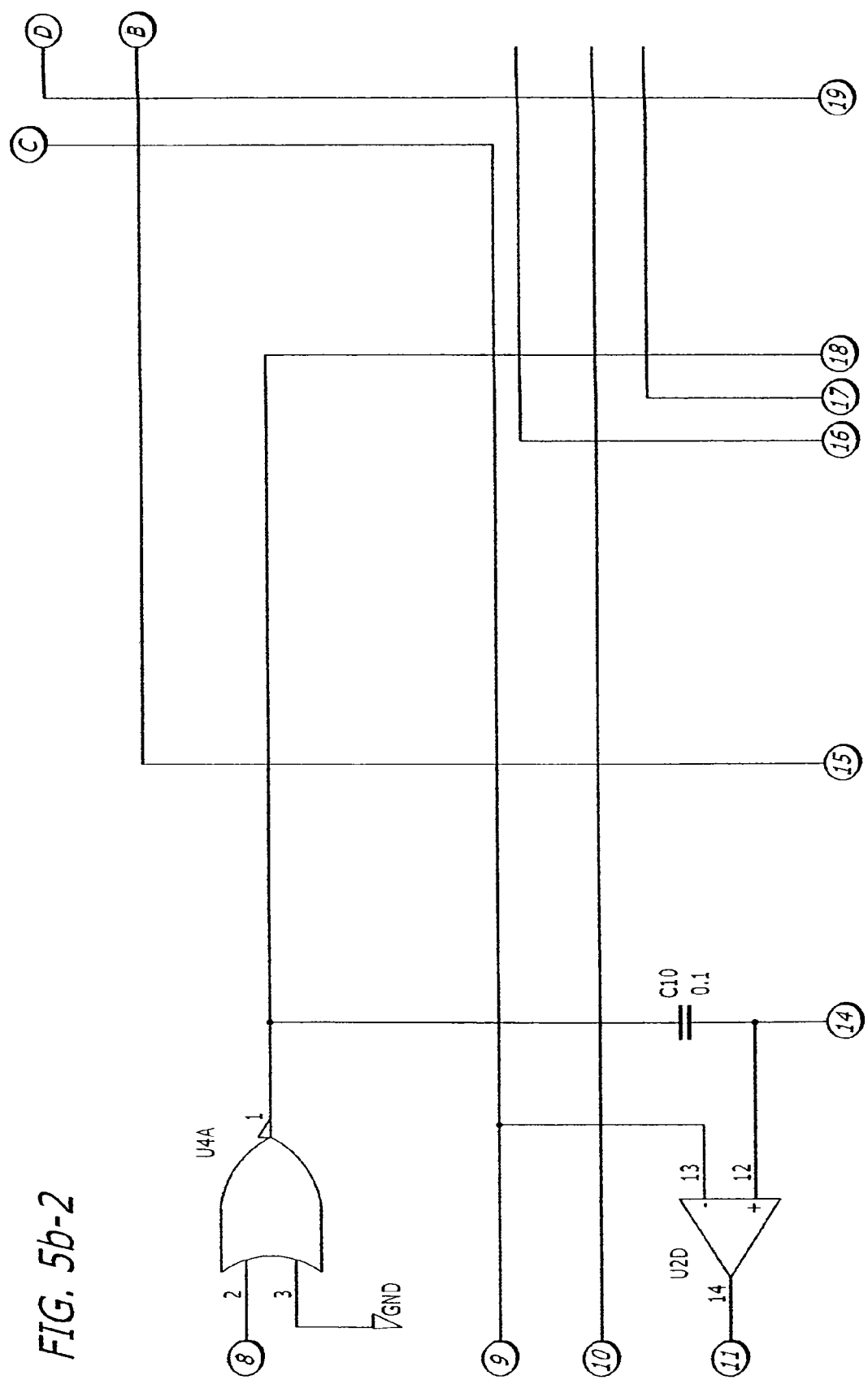
Figures 3, 5B:
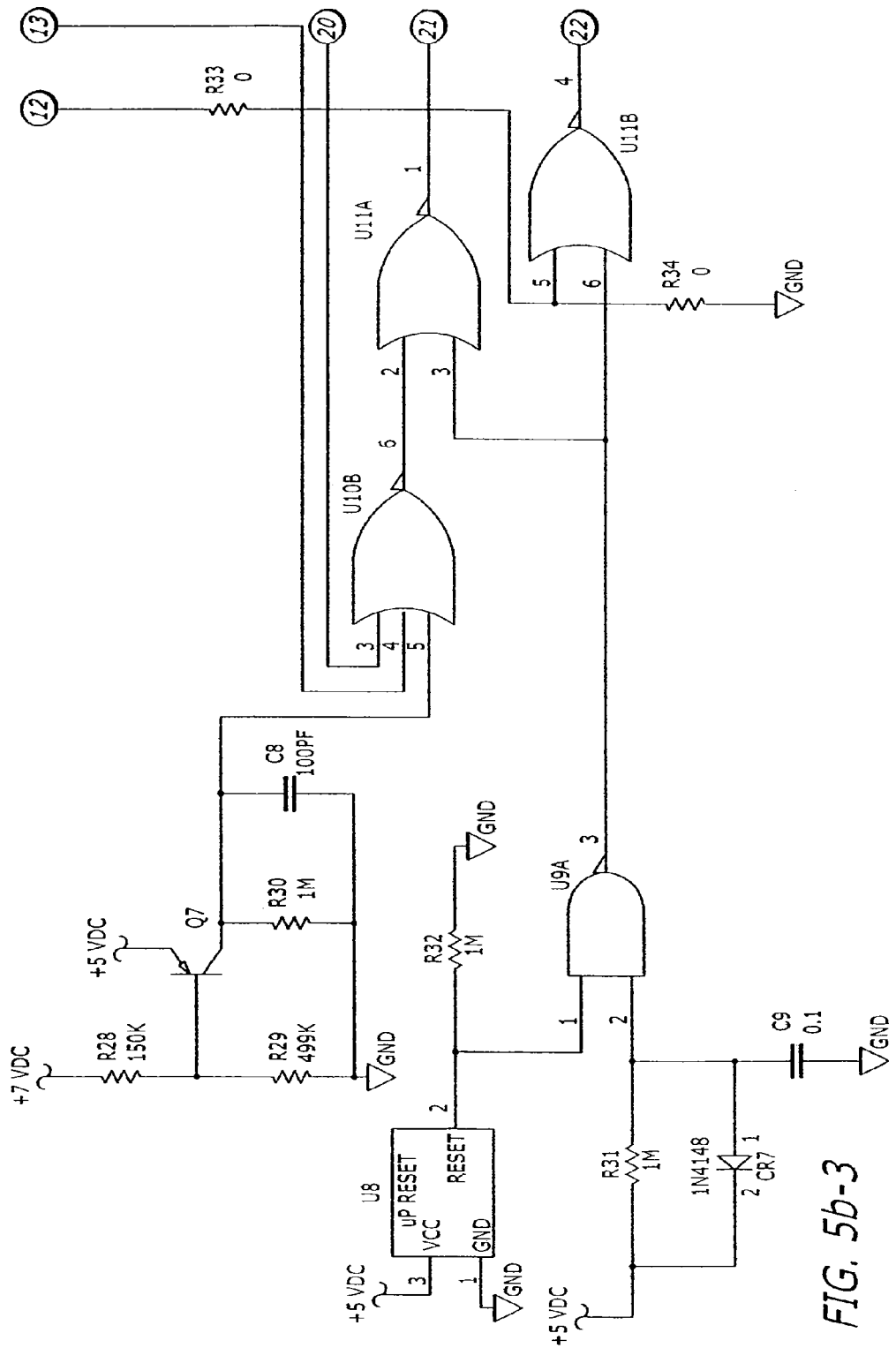
Figures 4, 5B:
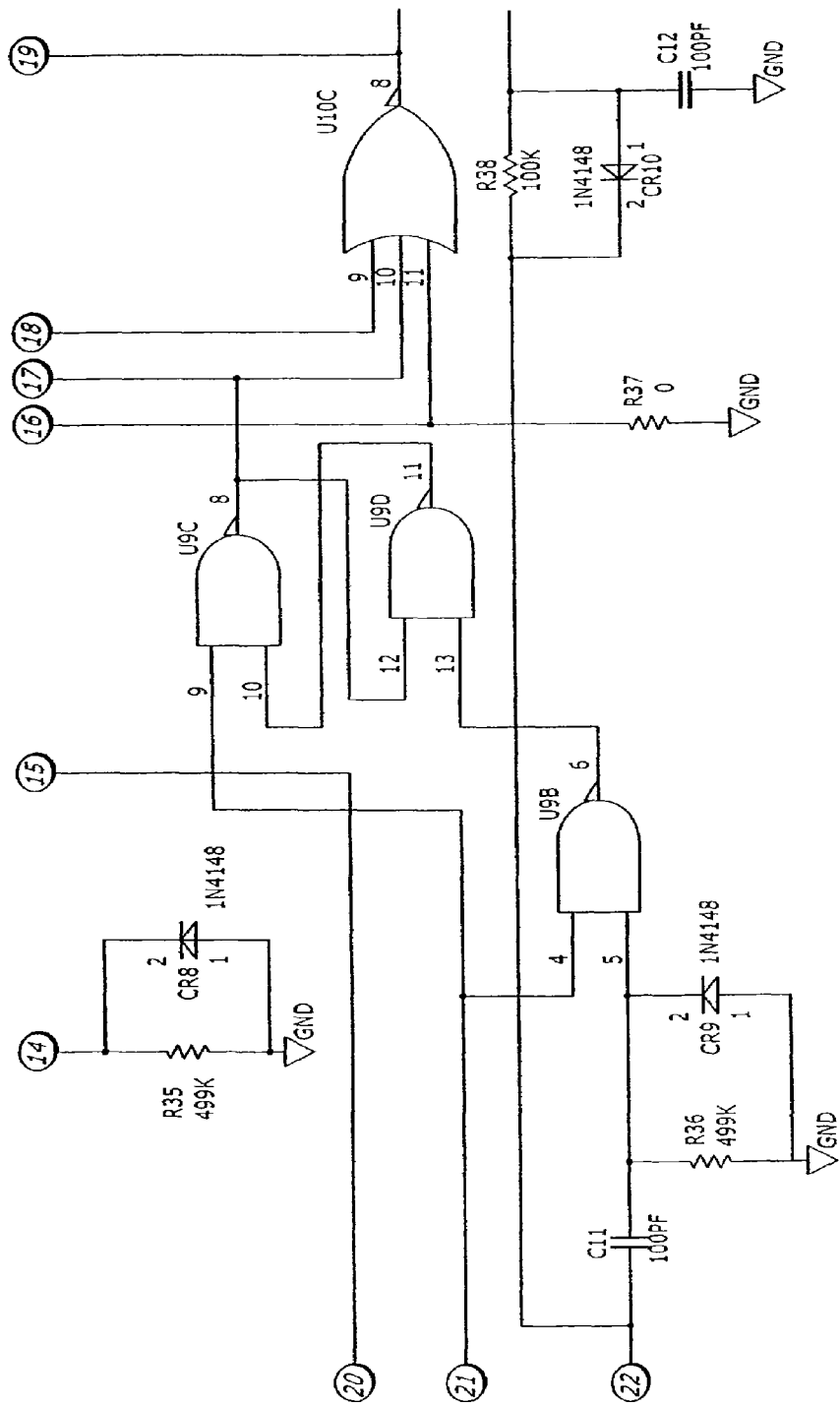
Figures 1, 5C:
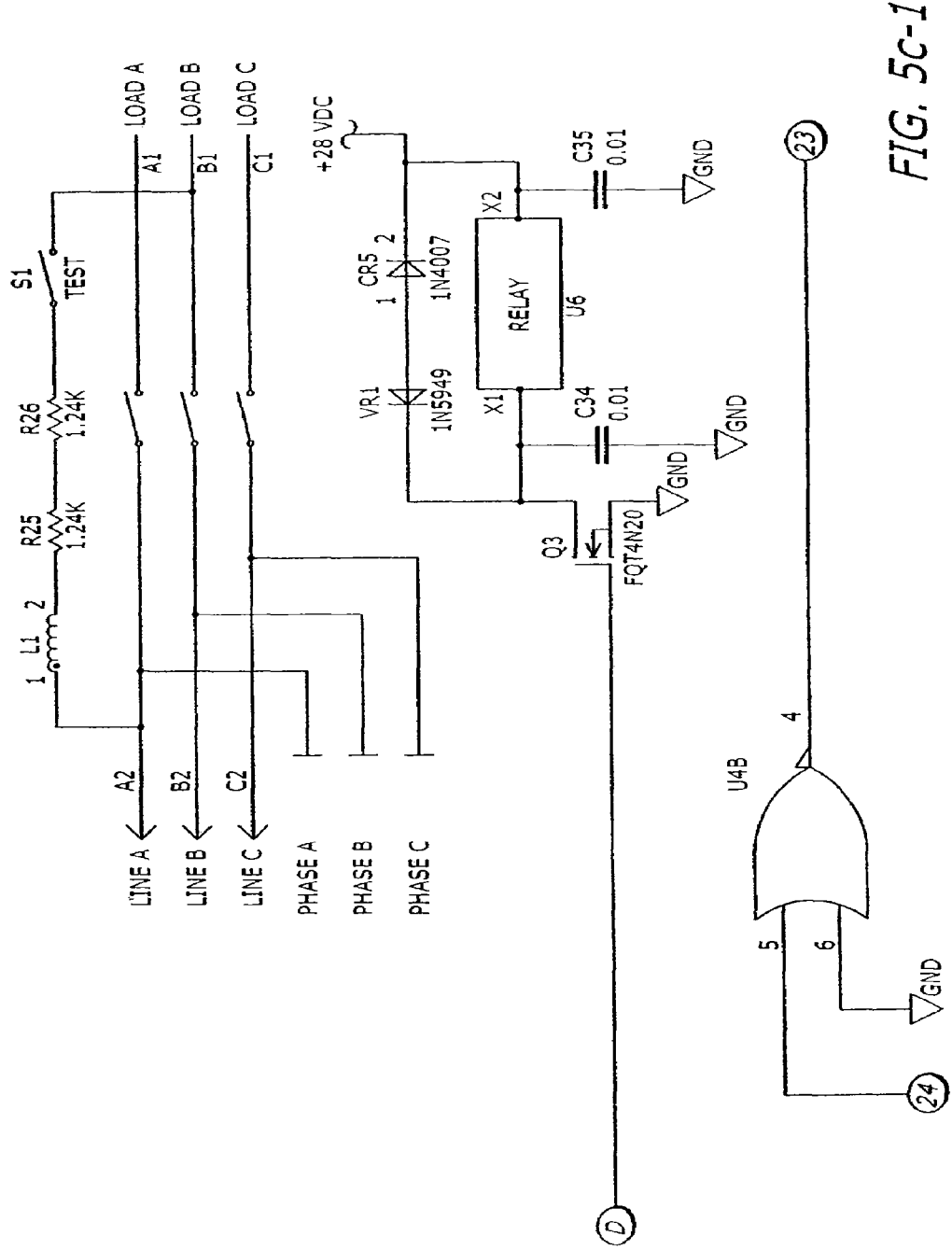
Figures 2, 5C:
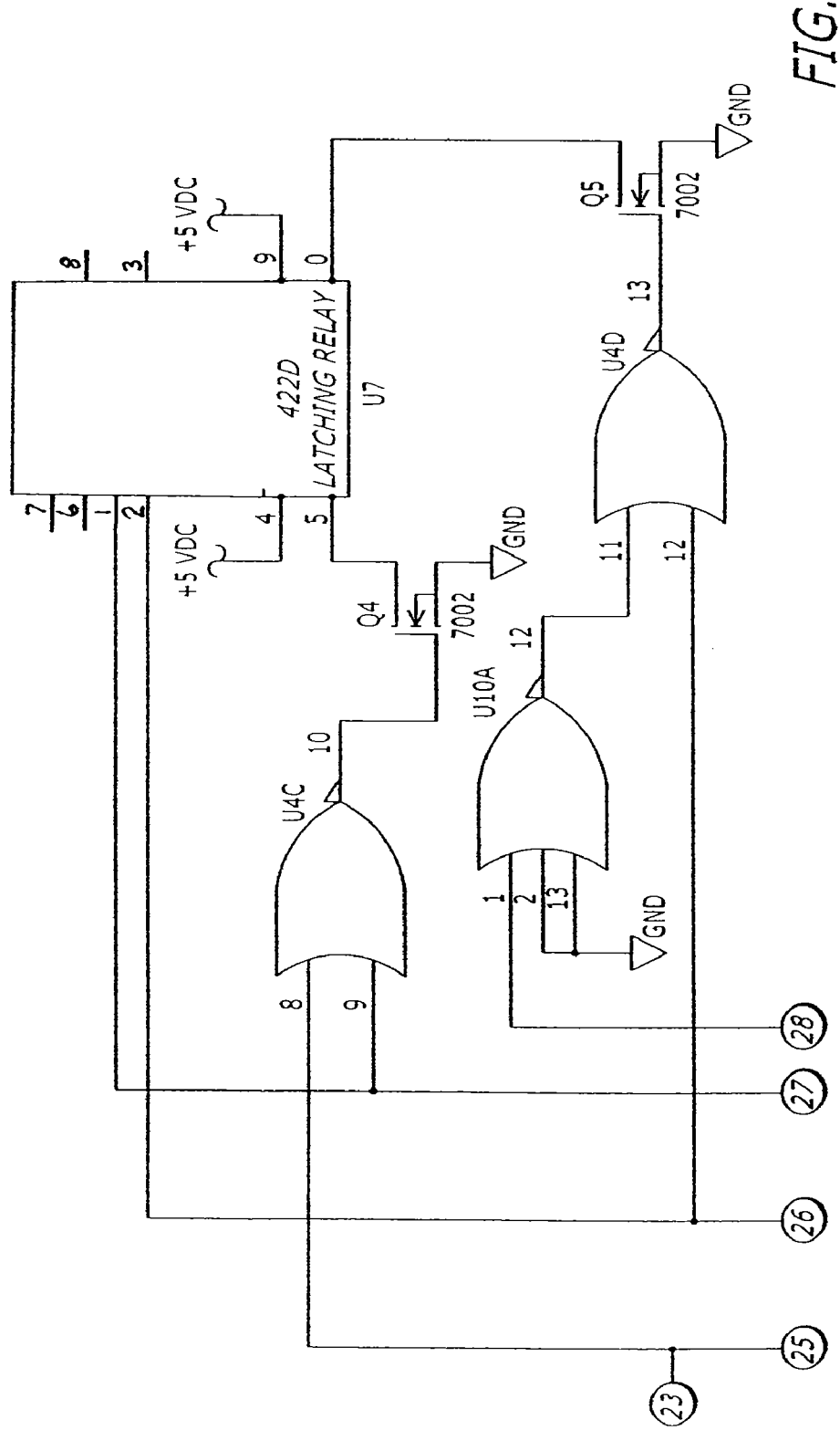
Figures 3, 5C:
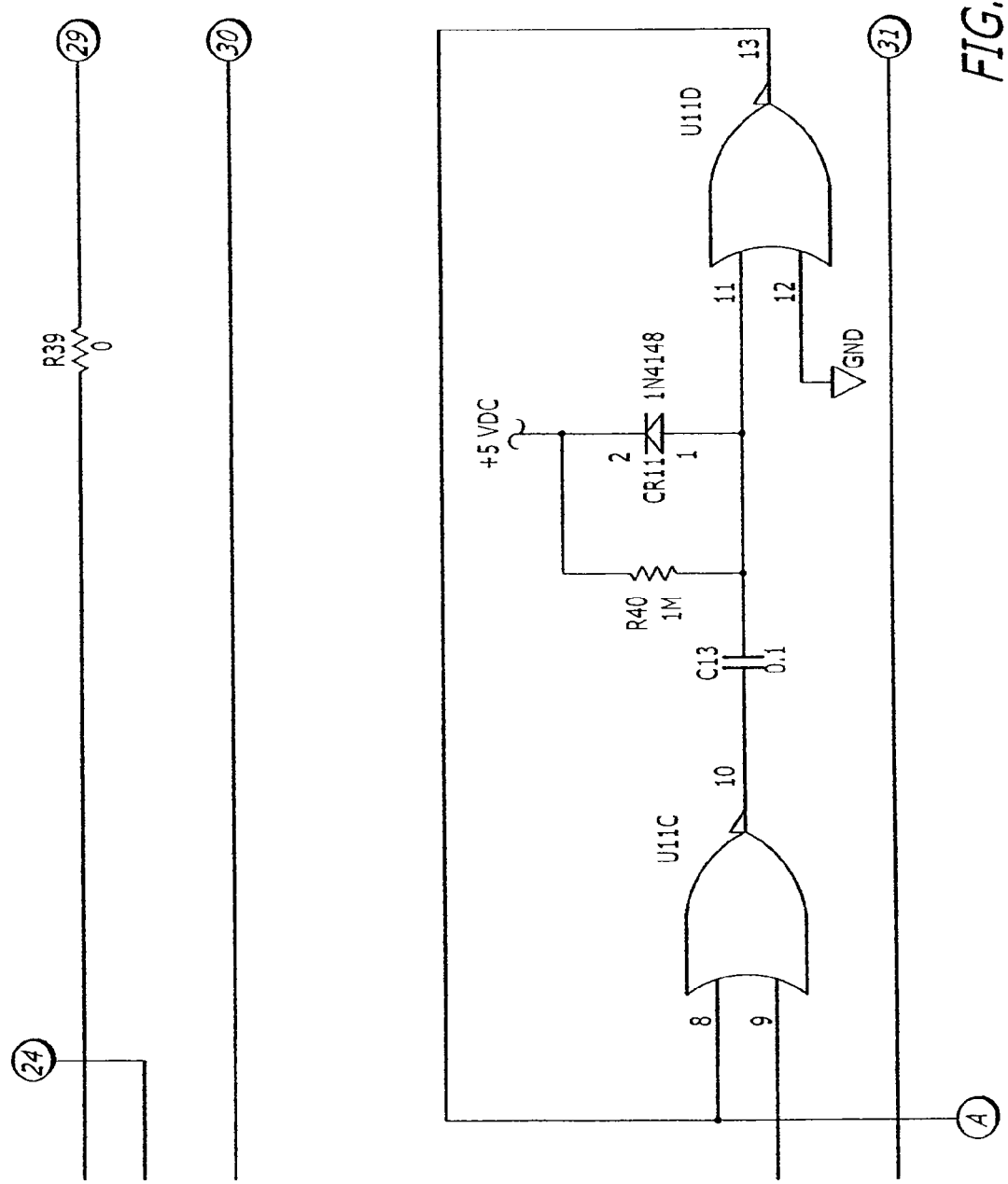
Figures 4, 5C:
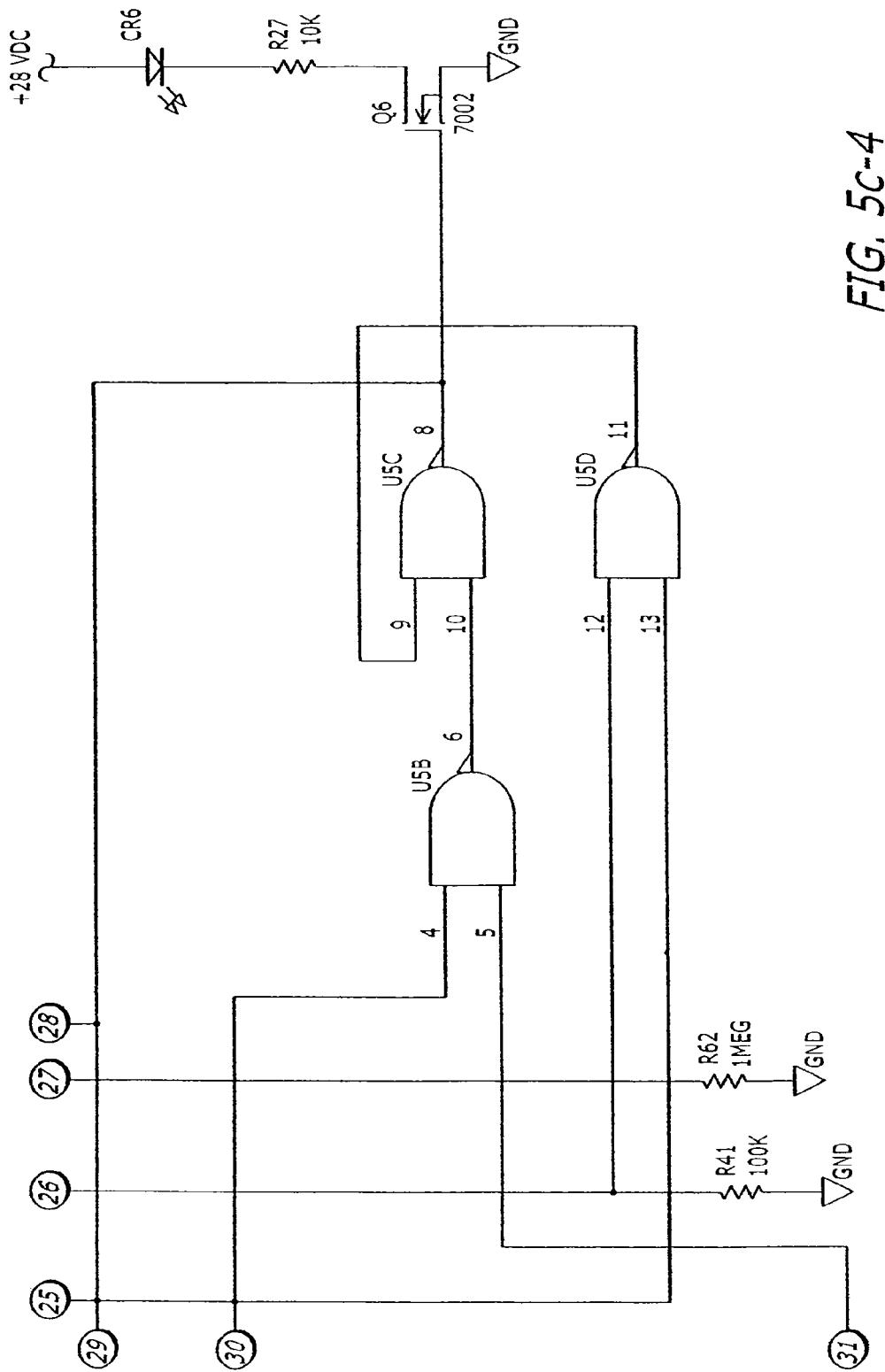

If the voltage coming from amplifier U1A exceeds the upper threshold voltage of pin 6 or is below the lower threshold voltage of pin 10 the output of the corresponding amplifier U1B, U1C goes high which serves as a fault signal. A high output from either of these amplifiers brings the gate of transistor Q1 high which in turn drives transistor Q2 output high transistor Q2 output passes through amplifier U2A. The output of amplifier U2A is input to logic gate U10B (FIG. 5b-3).

Logic gate U10B receives two additional inputs. One from a control supply circuit and one from a sensor power monitor circuit. In order for logic gate U10B to operate, each of its inputs must be logic low. Regarding the control supply circuit (FIG. 5b-1), the external DC control supply passes through optical coupler U3, amplifier U2B and logic gate U4A. In an alternate configuration, the control supply circuit may be adapted to receive an external AC control supply by changing the value of resistors R12 and R13 from 4.99 k to 49.9 k. When the control supply is high, i.e., the pilot switch is on, the output of U4A is low and logic gate U10B is allowed to operate provided the other inputs to the gate are low.

With respect to the sensor power monitor circuit (FIG. 5b-3), transistor Q7 monitors the 7 VDC power supply to the current sensor and inhibits the sensor output from effecting power controller operation when the voltage supply drops below a level where the sensor operates properly. When the supply voltage drops below the operating level, transistor Q7 turns on, which in turn inhibits logic gate U10B from operating. The system, in essence, ignores the sensor signal until the voltage supply is at or above the predetermined value, at which time operation of logic gate U10B resumes.

The logic controller is designed so that upon power-up, the system is put into a fault condition during which it does not deliver power to the load. After the system is up and stabilized, the system switches into the operate mode, provided that a fault doesn't exist. During reset, the signal from logic gate U9A in the reset circuitry (FIG. 5b-3) comes through U11A and goes to a latch (FIG. 5b-4) which is made up of logic gates U9C and U9D, putting the latch in a fault condition for the first 60 milliseconds (ms) to 100 ms depending on the values of resistor R31 and capacitor C9 (FIG. 5b-3) and the delay time of supervisory circuit U8 which is 140 to 560 ms. The longer delay controls the reset time. The two methods are used due to limitation to each.

Latch U9C/U9D may also be put in a fault condition by a fault signal from logic gate U10B (FIG. 5b-3). Such a fault would set the latch permanently. A reset function is necessary to remove the fault from the latch. Upon power-up reset, there is an inhibit for the historical latch. If a fault comes through, latch U9C/U9D goes to the latch condition and its output goes to U10C (FIG. 5b-4). All inputs have to be low for U10C to operate properly. If the output of logic gate U9C is high then a fault condition exists and the output of gate U10C is low. Such an output sets the gate of transistor Q3 (FIG. 5c-1) low, which interrupts the control supply-to-ground path and deenergizes the relay, i.e., opens the relay. The output from U9C is also input to logic gates U5B, U5C and U5D (FIG. 5c-4), which in turn, set LED CR6 on when the output of logic gate U9C is high.

Logic gates U11C and U11D (FIG. 5c-3), in conjunction with circuitry within the power supply, form a pop-up power supply. The pop-up power supply provides a first control supply voltage to relay U6 (FIG. 5c-1) when the relay is going from its open position to its closed position. Once the relay is closed for a certain amount of time, as defined by the values of capacitor C13 and resistor R40, the power supply provides a second voltage, less than the first voltage, to relay U6 in order to keep the relay closed. This reduces the heat dissipation in the power supply and the relay coil.

When the output of gate UC10 (FIG. 5b-4) is high, transistor Q3 turns on. This establishes the presence of the 28 VDC control supply to the relay by providing a return path for the control supply through transistor Q3. The presence of the control supply energizes relay U6 and causes it to close. At the onset of the command to close the relay, the output of logic gate U11D goes high and is feed back into logic gate U11C. When the output of gate U11D goes high, transistor Q9 (FIG. 3-3) in the power supply turns on and it pulls current through resistor R54, which shunts resistor R52. This causes the voltage at the top of resistor R53 to go to 28 VDC. When resistor R52 is not shunted, the voltage across resistors R52 and R53 is about 16 VDC. Thus the pop-up power supply provides 28 VDC to pull the relay in, i.e., to switch it from an opened to a closed position, and 16 VDC to maintain relay U6 in the closed position. At a time determined by resistor R40 and capacitor C13 (FIG. 5c-3), after the onset of the command to close the relay, the output of gate U11D goes low, which turns off Q9 returning the voltage to 16 VDC.

For devices that do not have over-current protection, the present approach would be to maintain the first voltage until the power controller closed and revert to the first voltage if the power controller opened. Otherwise it would maintain the second voltage as long as the power controller was closed. With over-current this would be augmented by a first voltage for a minimum first amount of time.

During a fault condition, the output of logic gate UC9 (FIG. 5b-4) is high. Following this output through logic gates U5B and U5C (FIG. 5c-4), the output of U5C is set high. This causes transistor Q6 to turn on and LED CR6 to light. The high output of gate U5C is input to logic gate U10A (FIG. 5c-2) which functions as an inverter and outputs a logic low to pin 11 of gate U4D. Pin 12 of gate U4D is also low. Thus the output of gate U4D drives transistor Q5, which in turn drives latching relay U7. Pin 3 of the latching relay switches to contact pin 2 and thereby provides 5 VDC to pin 12 of gate U4D which causes the output of U4D to go low. When the output of gate U4D goes low, transistor Q5 turns off conserving logic power.

Once in a fault condition, reset switch S2 (FIG. 5b-1) may be used to reset the logic controller. When switch S2 is closed, the output of amplifier U2C goes high and the output of U4B (FIG. 5c-1) goes low. At gate U4C (FIG. 5c-2), both inputs are low so the output is high. A high output from gate U4C turns transistor Q4 on, which in turn drives latching relay U7 to switch contact from pins 3 and 2 to pins 3 and 1. This causes the output of gate U4C to go low and transistor Q4 to turn off.

The logic controller includes various maintenance circuitry including the previously described reset switch S2 and fault indication LED CR6. Also includes is press-to-test circuitry (FIG. 5c-1).which includes coil L1, resistors R25 and R26, and switch S1. The coil is wrapped around the current sensor (not shown) a sufficient number of times such that when switch S1 is closed the sensor outputs a signal indicative of a current imbalance. In one configuration, the coil is wrapped around the sensor 25 times.

The system thus described monitors the current path 20 for a current imbalance and provides GFI protection to the load. However, current fault-conditions undetectable by a single sensor may be present in the electrical circuit. For example, if a short occurs across any two of the three electrical lines downstream from the single sensor, the summation of the current passing through the sensor may still be zero. Thus the short will go undetected. In accordance with the invention, the foregoing is guarded against by including over-current sensors as part of the sensor system.

Figure 6:
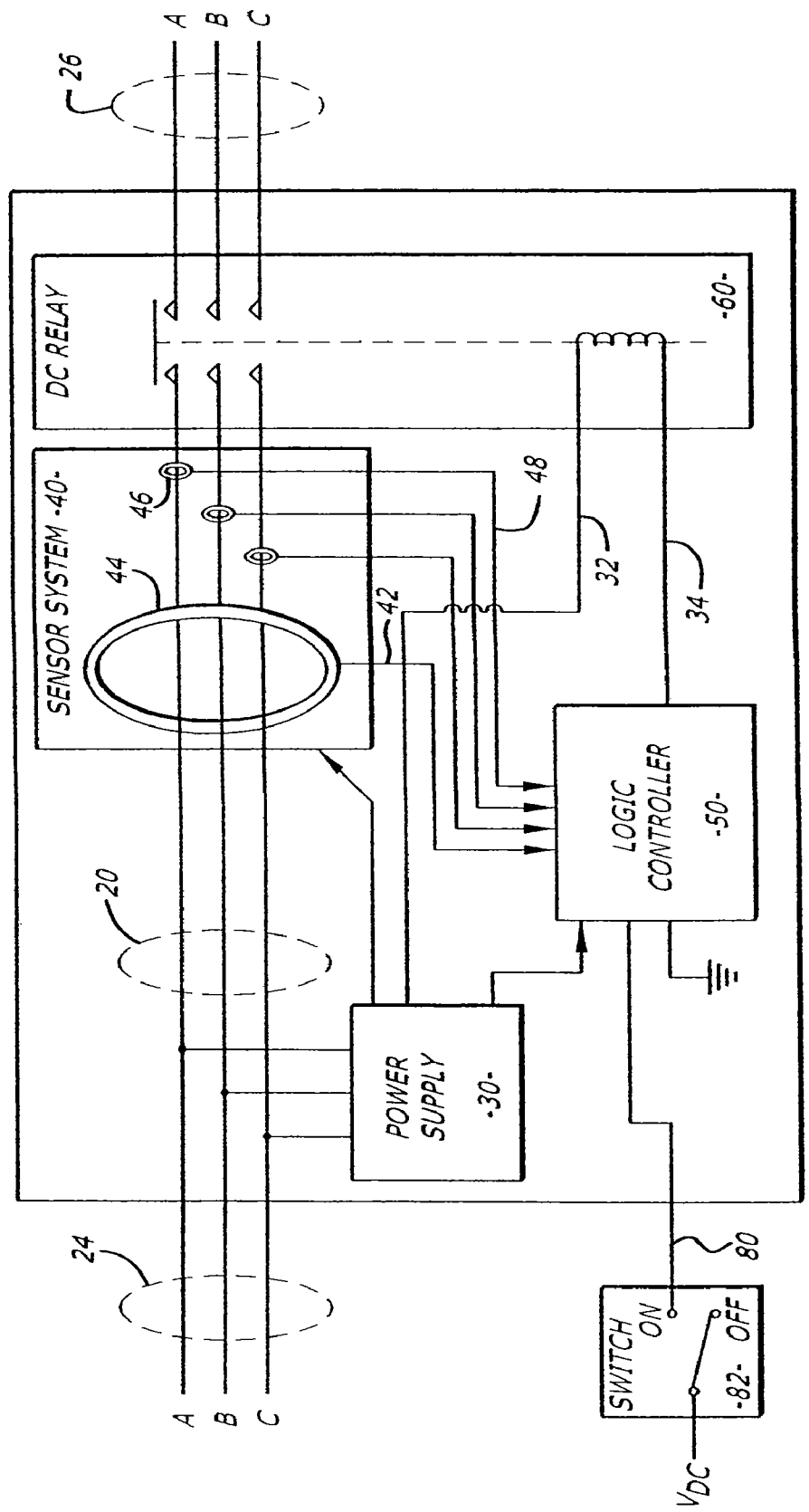
FIG. 6 is a block diagram of another configuration of the system including a power supply, a sensor system comprising a current imbalance sensor and three over-current sensors, a logic controller, an external DC pump input switch and a power controller comprising a DC relay.

With reference to FIG. 6, there is shown such a system 10 for use in an aircraft fuel system having a DC pump input 80 and an DC-coil relay 60, such as is present in the Boeing 747-400 or Boeing 767 aircraft. The system 10 includes a power supply 30 that taps off of each of the 115 VAC three phase lines at the input side 24 of the electrical circuit. The power supply 30 provides power to each sensor within the sensor system 40, the logic controller 50 and the DC relay 60.

The power supply is a fly-back type switching power supply, the configuration and operation of which is similar to that previously described with reference to FIGS. 3-1 through 3-3. The power supply includes two linear power supplies U14, U15. Power supply U14 provides 7 VDC to each of the current sensors in the sensor system while power supply U15 provides 5 VDC to the logic controller circuitry. The power supply also functions as a pop-up power supply which provides either 28 VDC or 16 VDC control supply to the DC relay. The DC pump input 80 to the logic controller 50 is provided by a cockpit pump switch 82 which receives power from an aircraft DC power source. A detailed schematic of an exemplary power supply is provided in FIGS. 7-1 through 7-3.

The sensor system 40 includes a single imbalance sensor 44 surrounding the three, three-phase electrical lines which form the current path 20. The sensor system 40 also includes three over-current sensors 46. Each of the over-current sensors 46 surrounds one of the three electrical lines forming the current path 20. Both the imbalance sensor 44 and the over-current sensors 46 may be Hall effect sensors such as previously described with reference to FIG. 4. The imbalance sensor 44 algebraically sums the magnetic flux generated by the three phase currents through the three phase electrical lines and produces an output signal 42 that is proportional to the result. Each of the over-current sensors 46 outputs a signal 48 indicative of the amount of current passing through its associated electrical line. In alternate configuration, the sensors 44, 46 may also be a current transformer or a GMR sensor.

With continued reference to FIG. 6, signals 42, 48 from the imbalance sensor 44 and the over-current sensors 46 are provided to the logic controller 50 where they are compared against respective preestablished criteria. With respect to the imbalance sensor 44 the criteria is similar to that previously described with reference to FIG. 2, namely, −1.5 A RMS to +1.5 A RMS. With respect to the over-current sensors 46, the criteria is a function of the electrical load connected to the load side 26 of the circuit. In one embodiment, the threshold is 1.25× the operating current of the load. In a preferred embodiment, the logic is hardware implemented. Alternatively, the logic may be provided by programmable firmware. In either case, the logic is such that if any of the sensor signals 42, 48 does not satisfy the preestablished criteria, the return path 34 of the control supply 32 is interrupted. This removes the drive signal to the power controller 60 and causes the DC relay to latch to a tripped condition and interrupt the current path 20 to the load side 26.

In a preferred embodiment, the system is configured to provide a two-tier threshold criteria for detecting over-current fault conditions. One criteria is applicable during normal operation of the load, while the other is applicable during power-up operation of the load. The over-current threshold for each is different. In normal operation the DC relay is closed and 115 VAC is being provided to the pump motor which has an associated steady-state operating current. During normal operation, the system detects the over-current condition using a threshold based on the steady-state operating current. For example, if the steady-state operating current of the motor is 5 A, the established threshold is 1.25×5 A RMS.

In start-up operation the load is off and then power is applied by closing the DC relay. During start-up operation, the system detects the over-current condition using a threshold established based on the start-up current of the load. For example, if the start-up current is 20 A, the established threshold is 1.25×20 A RMS. The system uses this start-up threshold for a certain period of time, i.e., the start-up period, before switching to the normal threshold. The duration of the start-up period is based on the time it takes for the load to power up and stabilize and may range from, for example, approximately 80 ms. Thus, if the system detects a current over the start-up threshold during the start-up time period, the relay is opened and power is removed from the load. A benefit of the two-tier threshold system thus described is that it prevents nuisance trips during start-up of the load and allows close monitoring during normal operation.

With reference to FIGS. 8a-1 through 8c-4, the sensor control circuitry of the logic controller is similar to that previously described with reference to FIGS. 5a-1 through 5c-4. The imbalance sensor output is input to amplifier U1A (FIG. 8a-1), which adjusts the gain of the sensor output signal. Resistors R6, R7 and R8 (FIG. 8a-2) set the established criteria against which the sensor output signal is compared. Specifically, the resistors set the voltage reference levels at pin 6 of U1B and pin 10 of U1C such that one voltage corresponds to the upper threshold voltage while the other corresponds to the lower threshold voltage. These voltage levels in turn correspond to upper and lower current imbalance thresholds, which in one embodiment are +1.5 A RMS and −1.5 A RMS respectively.

If the voltage coming from amplifier U1A exceeds the upper threshold voltage of pin 6 or is below the lower threshold voltage of pin 10 the output of the corresponding amplifier U1B, U1C goes high. A high output from either of these amplifiers brings the gate of transistor Q2 (FIG. 8a-4) low which in turn drives transistor Q4 output high. Transistor Q3 output passes through amplifier U4D. The output of amplifier U4D is input to logic gate U8.

Each of the over-current sensor outputs are input to an amplifier U2A, U3A, U4A (FIGS. 8a-1 and 8a-3), which adjusts the gain of the sensor output signal Each amplifier output is input to a pair of comparators U2B/U2C, U3B/U3C, U4B/U4C (FIGS. 8a-2 and 8a-4) which function as over-current detectors for each of line A, B and C of the three phase current path.

Figures 1, 8A:
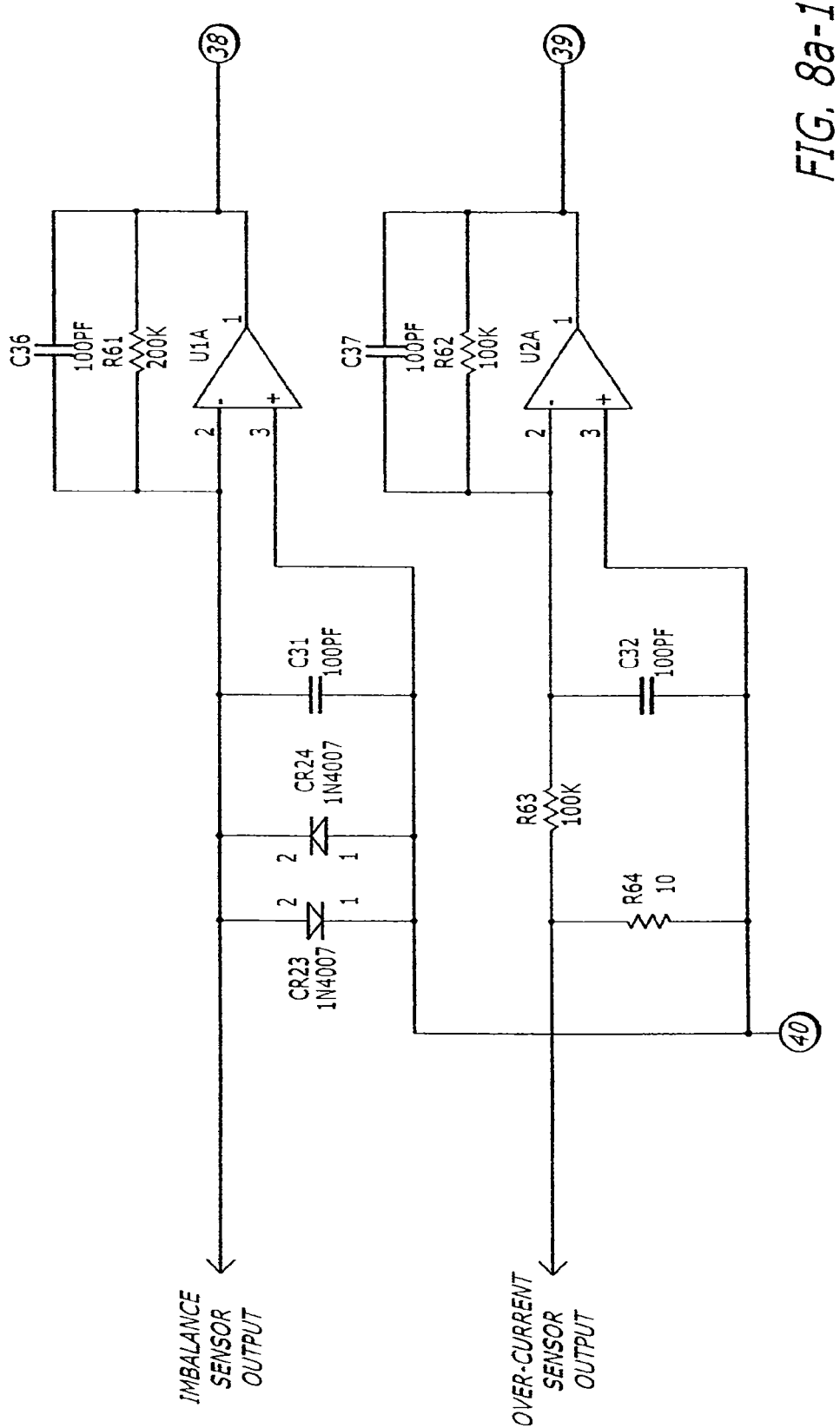
Figures 2, 8A:
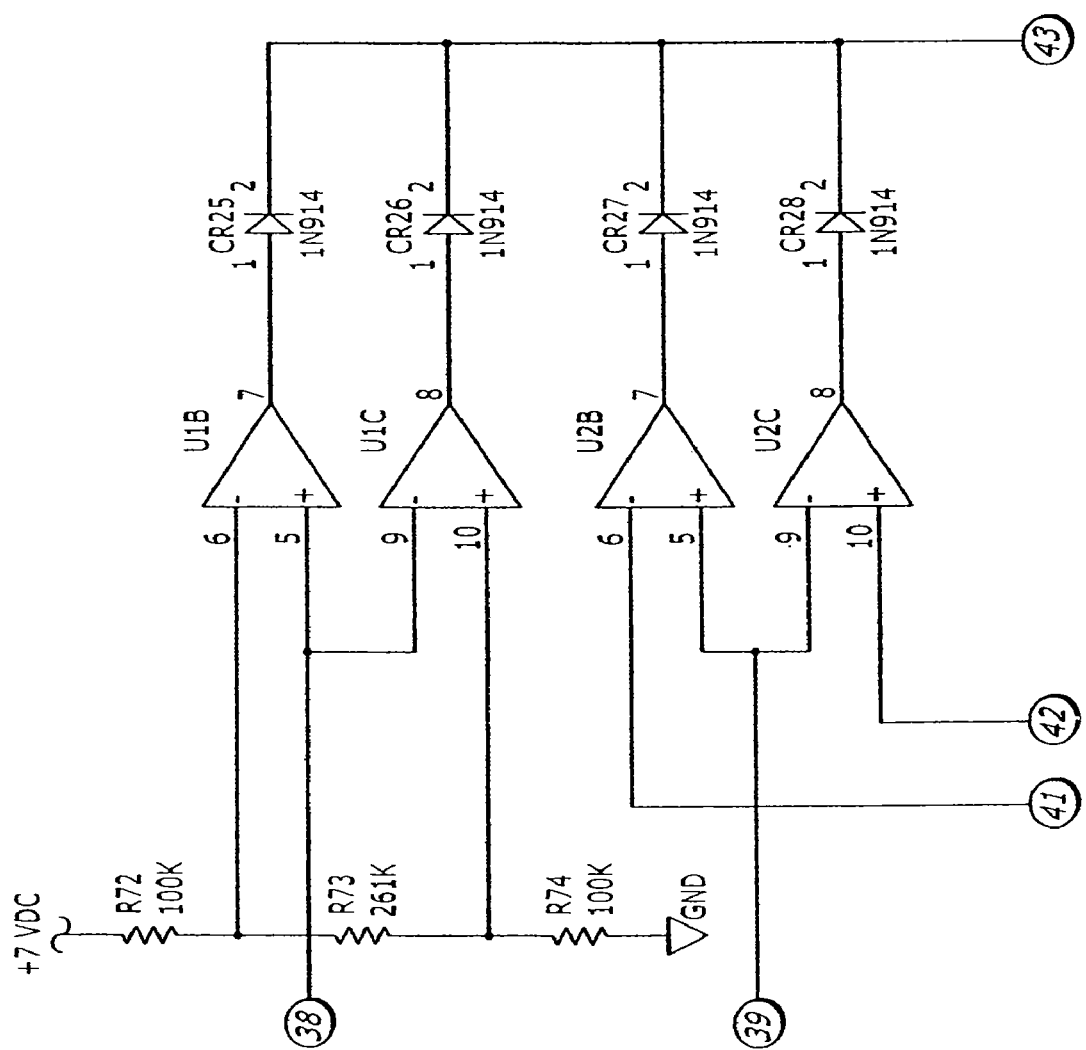
Figures 4, 8A:
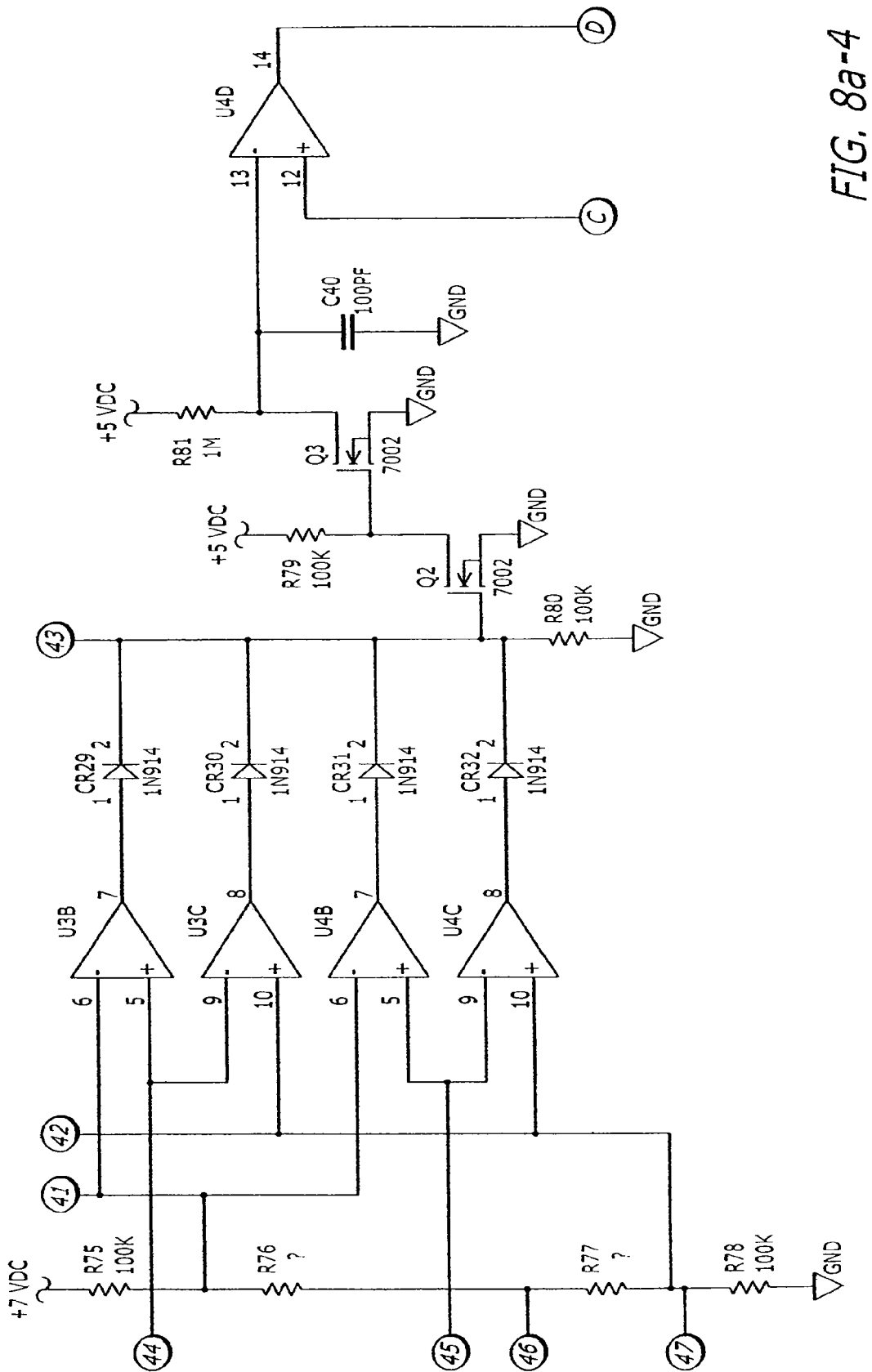
Figures 1, 8B:
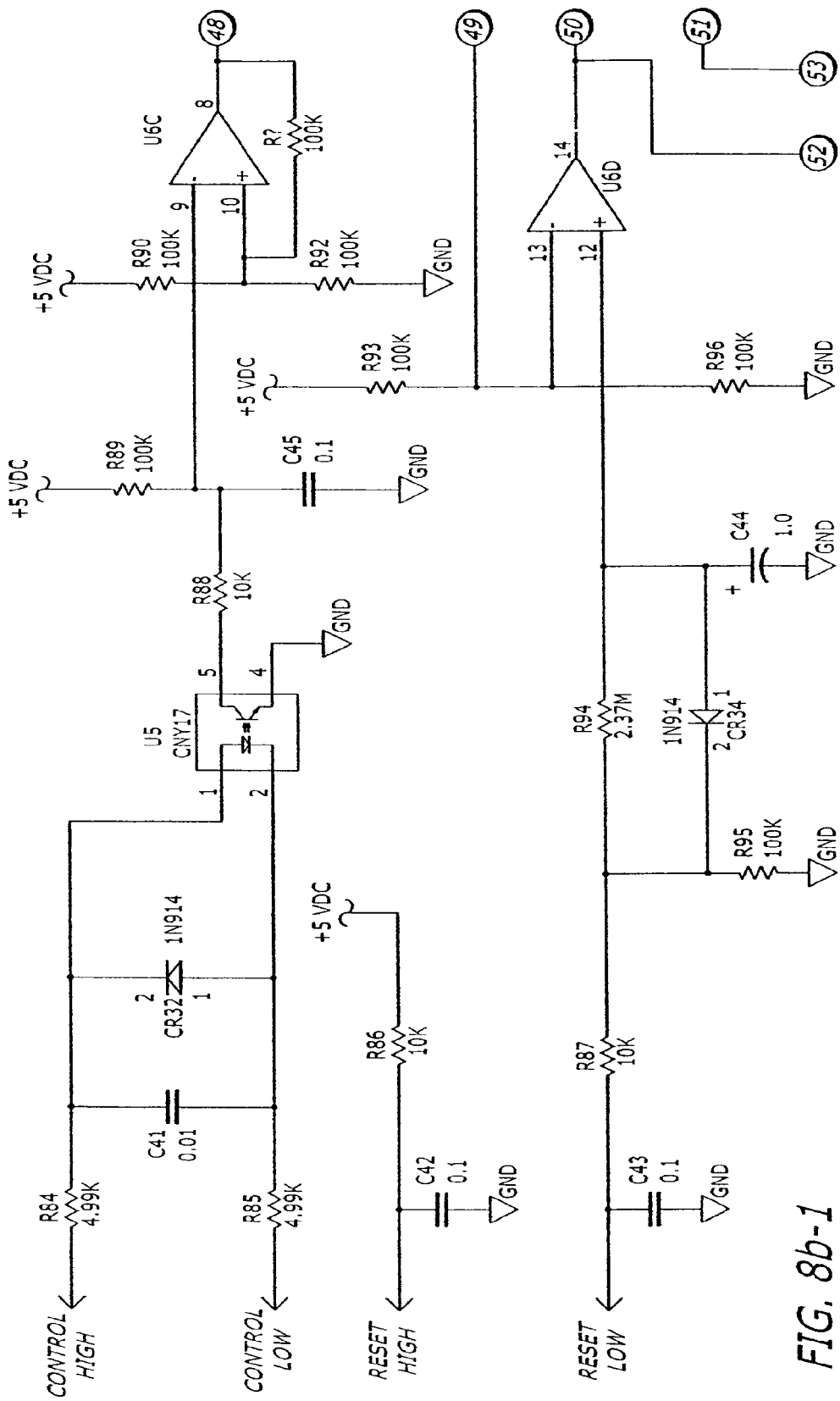
Figures 3, 8B:
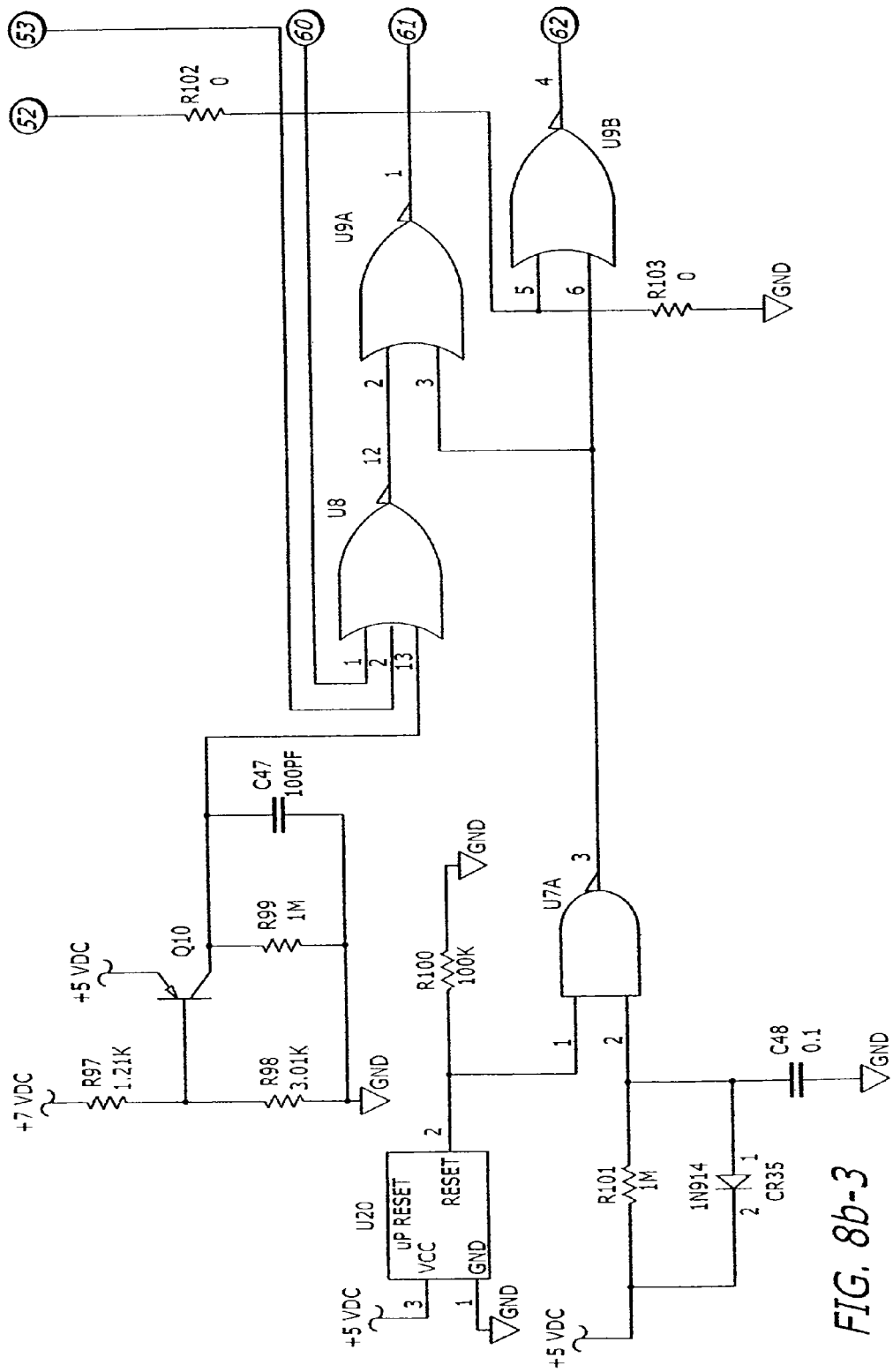
Figures 4, 8B:
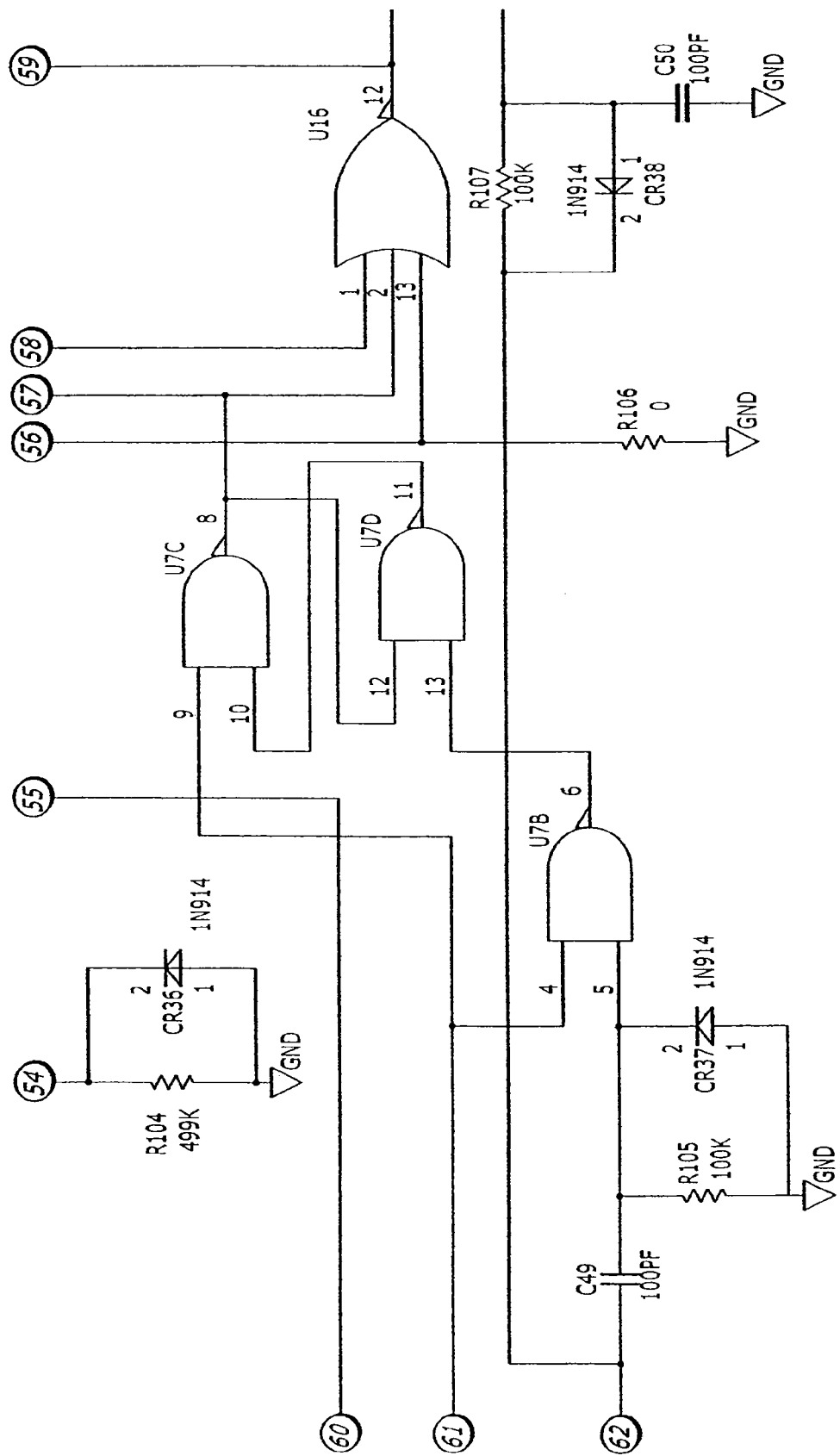
Figures 1, 8C:
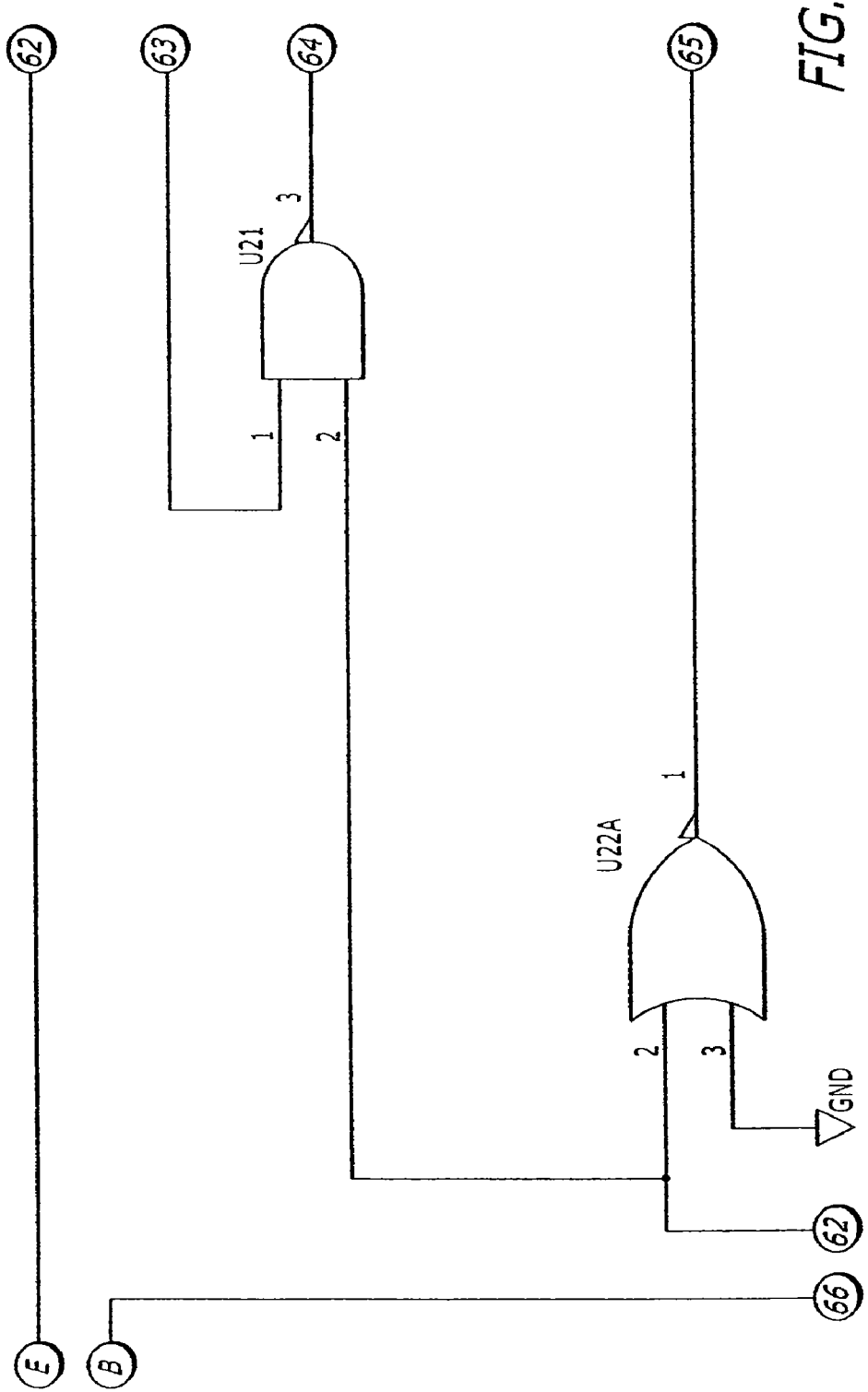
Figures 2, 8C:
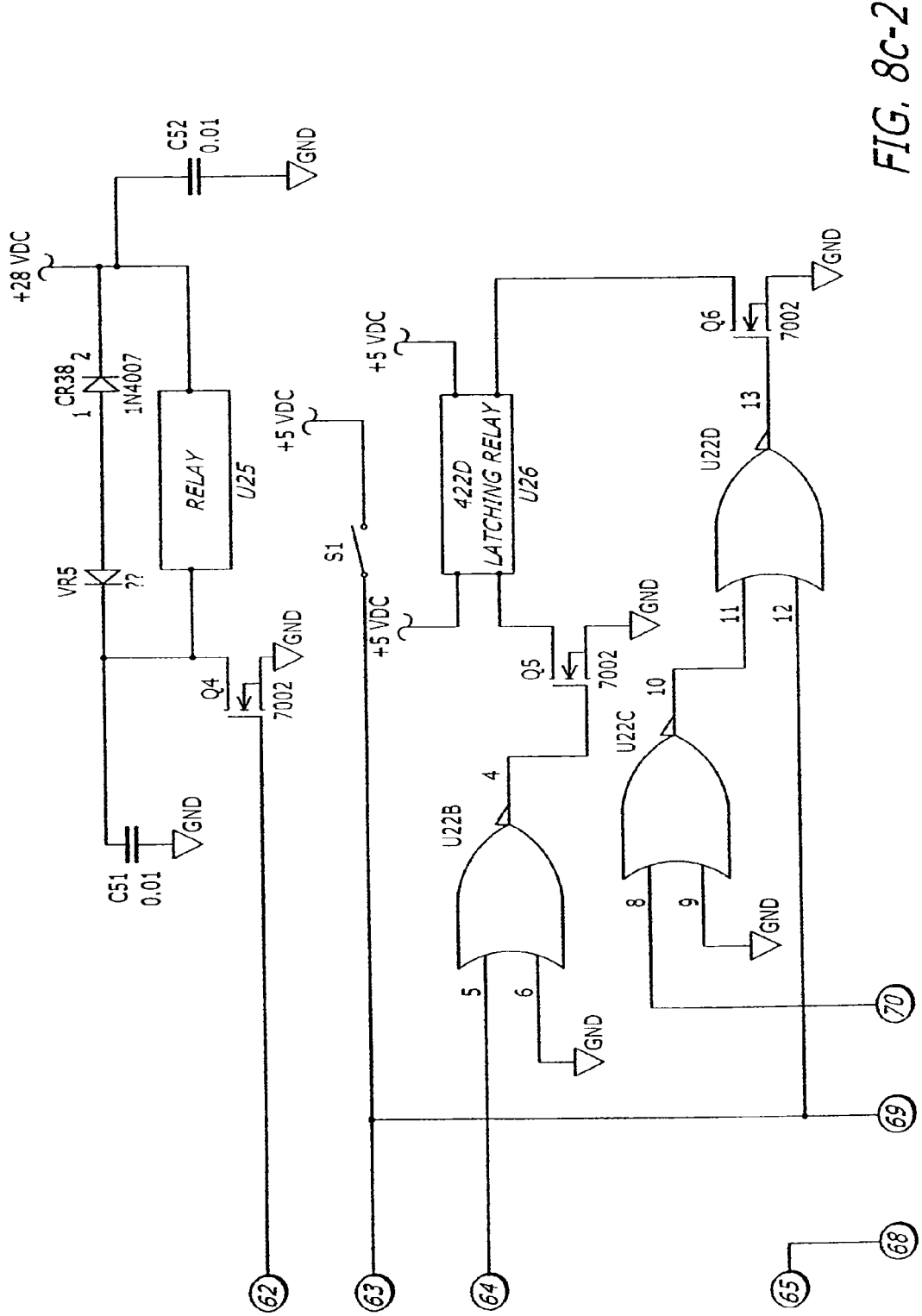
Figures 3, 8C:
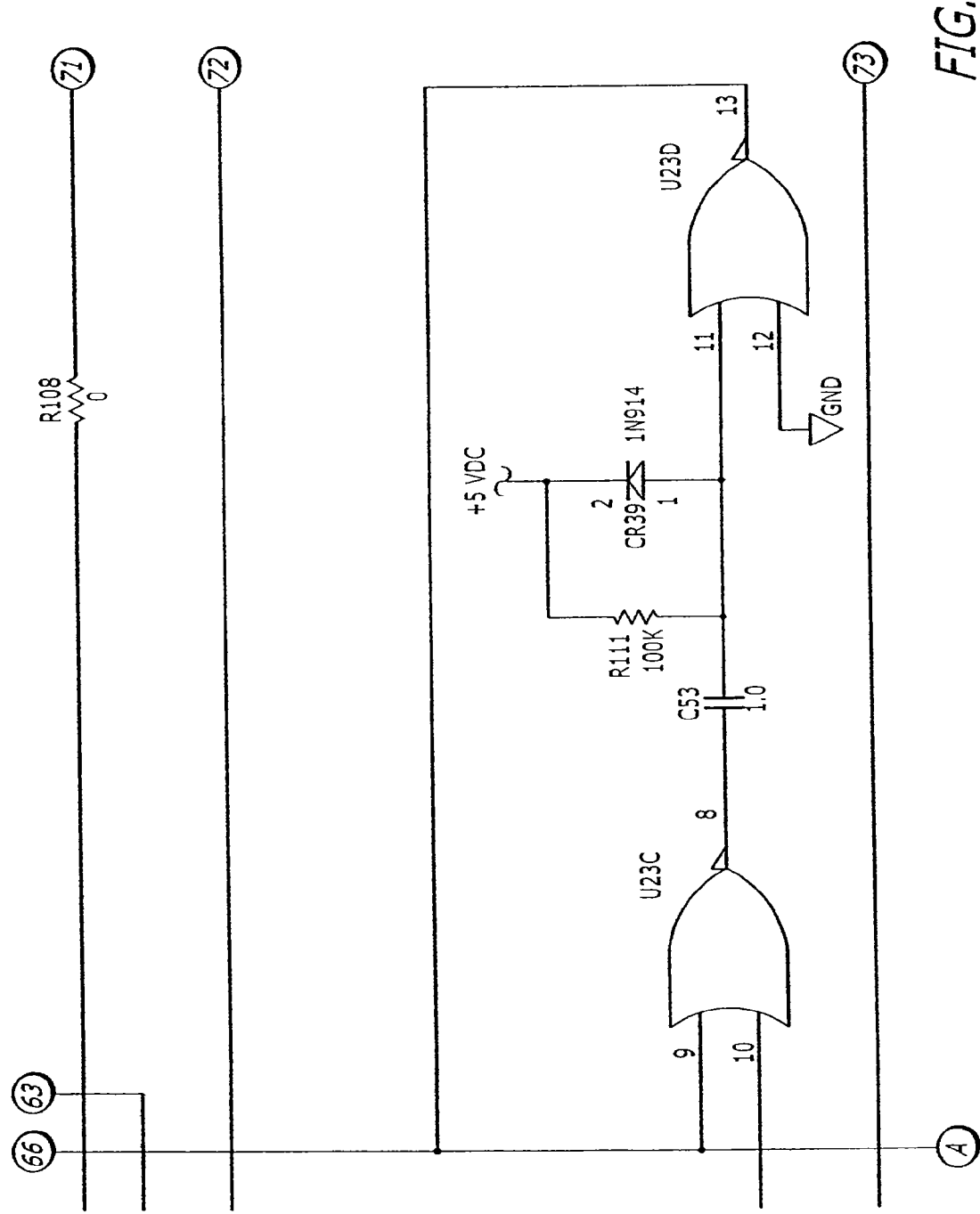
Figures 4, 8C:
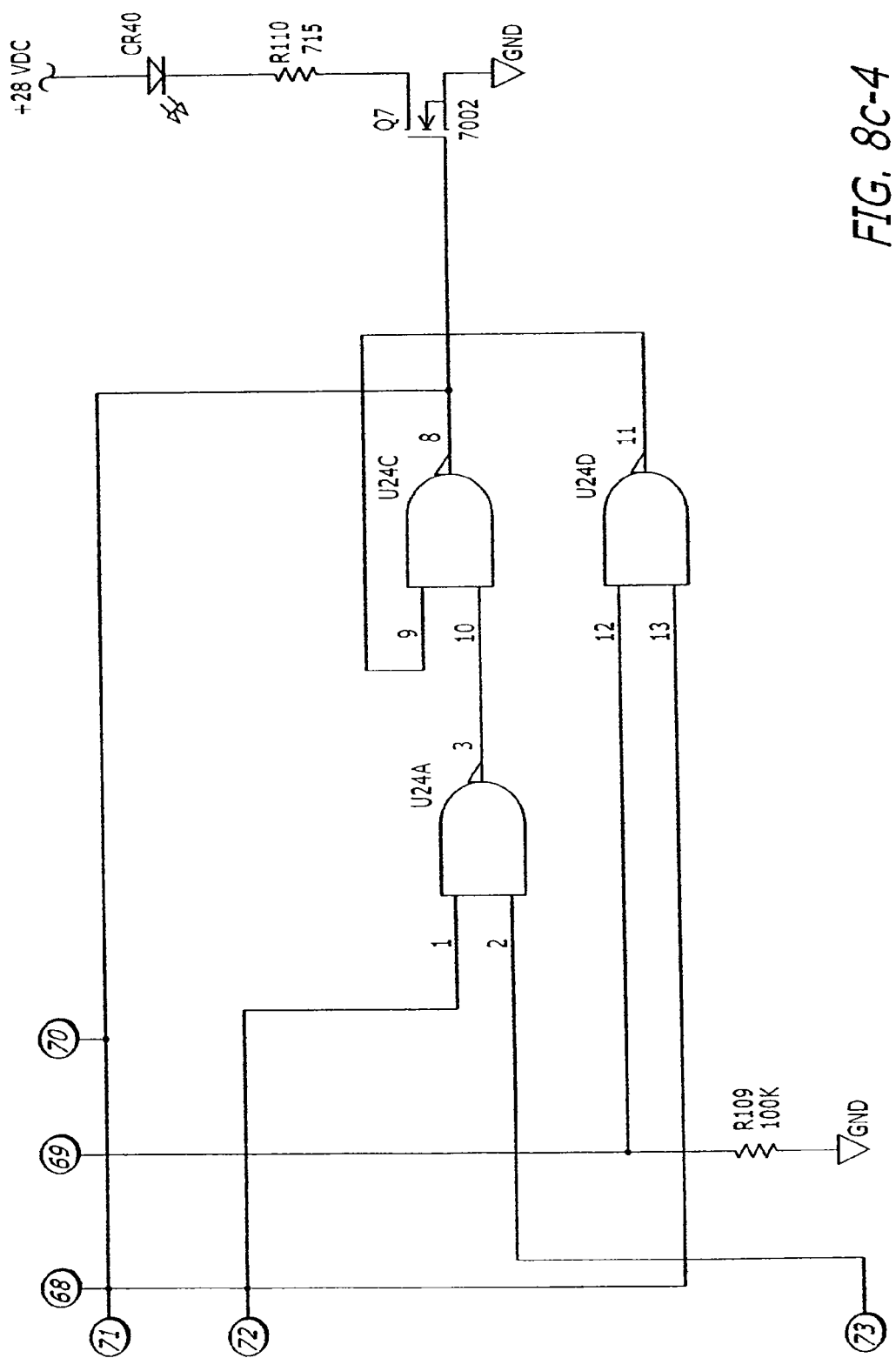

As previously mentioned, the logic controller is configured to provide a start-up threshold and a normal threshold for the over-current detectors. These thresholds are set by resistors R76 and R77. During normal operation, component U5A (FIG. 8a-3) is on, shorting-out resistor R77 (FIG. 8a-4). The voltage developed across resistor R76 is small, thus setting the over-current threshold to the normal threshold value. In one configuration, R76 is 24.3 k and the normal threshold value is 15 A. If any one of the three over-current amplifiers U2A, U3A, U4A outputs a signal having a voltage greater than the voltage corresponding to the normal threshold value, the output of the over-current detector associated with the amplifier goes high. A high output from any of these over-current detectors brings the gate of transistor Q2 low which in turn drives transistor Q3 output high. Transistor Q2 output passes through amplifier U4D. The output of amplifier U4D is input to logic gate U8.

Figures 1, 7:
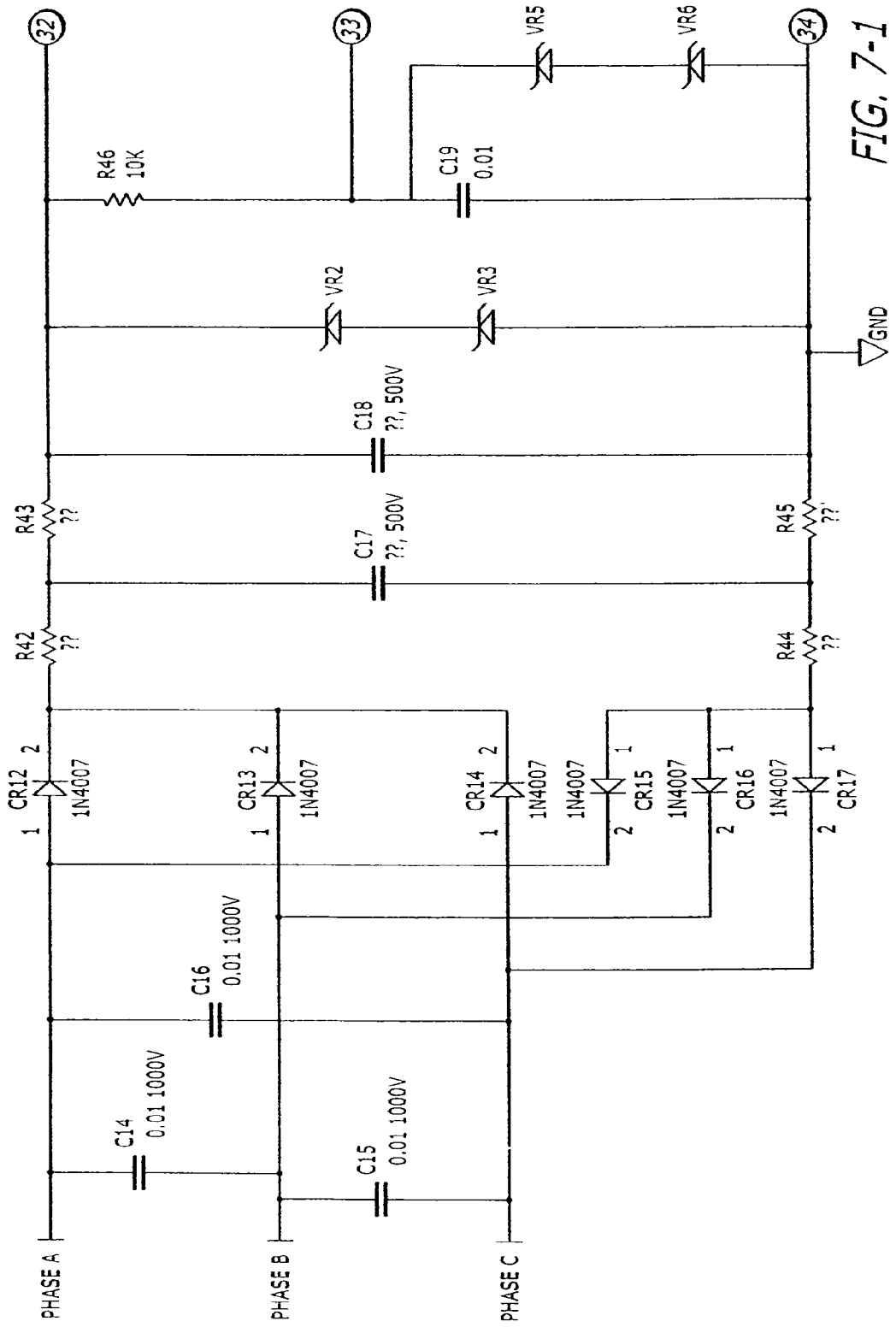
Figures 2, 7:
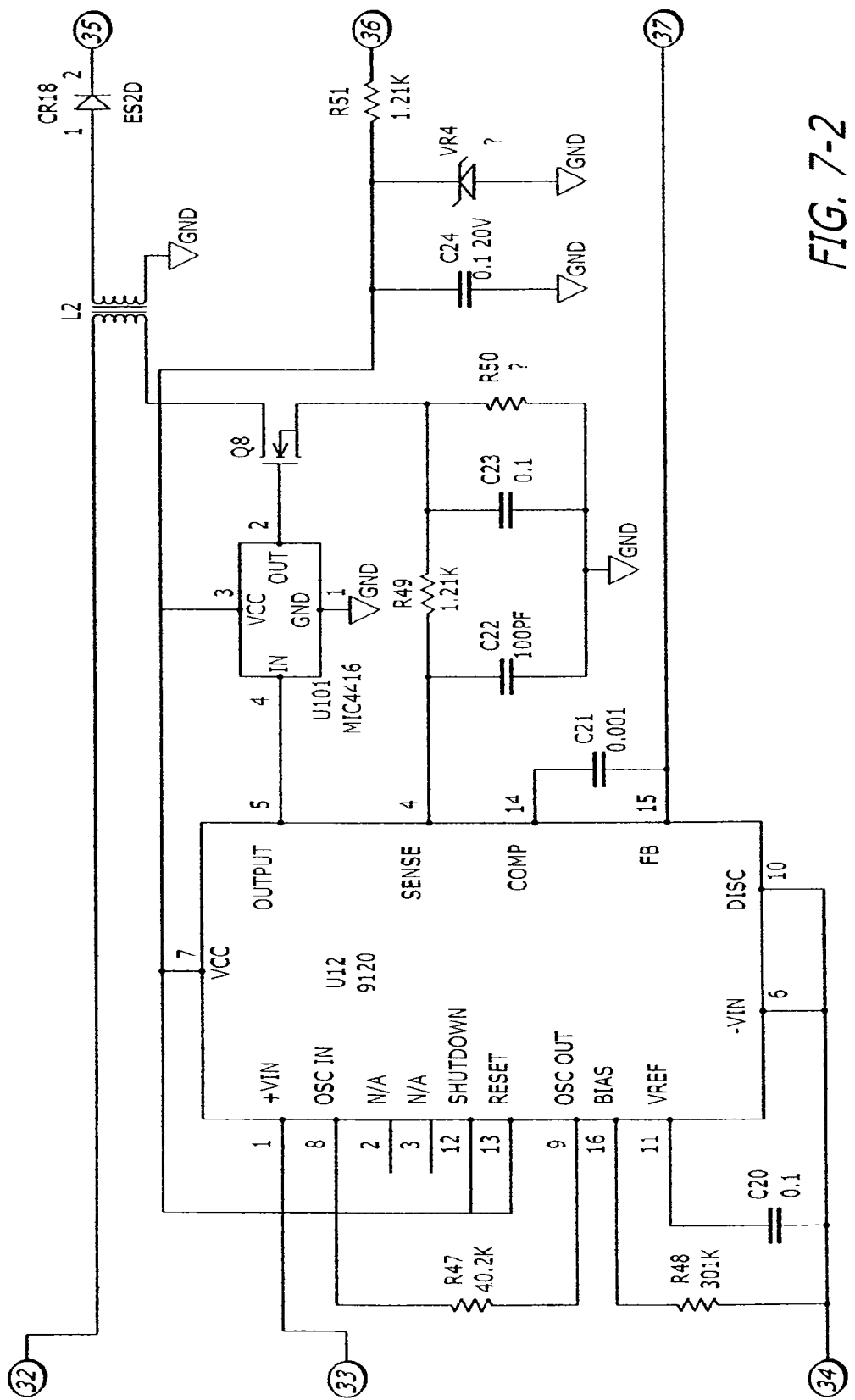
Figures 3, 7:
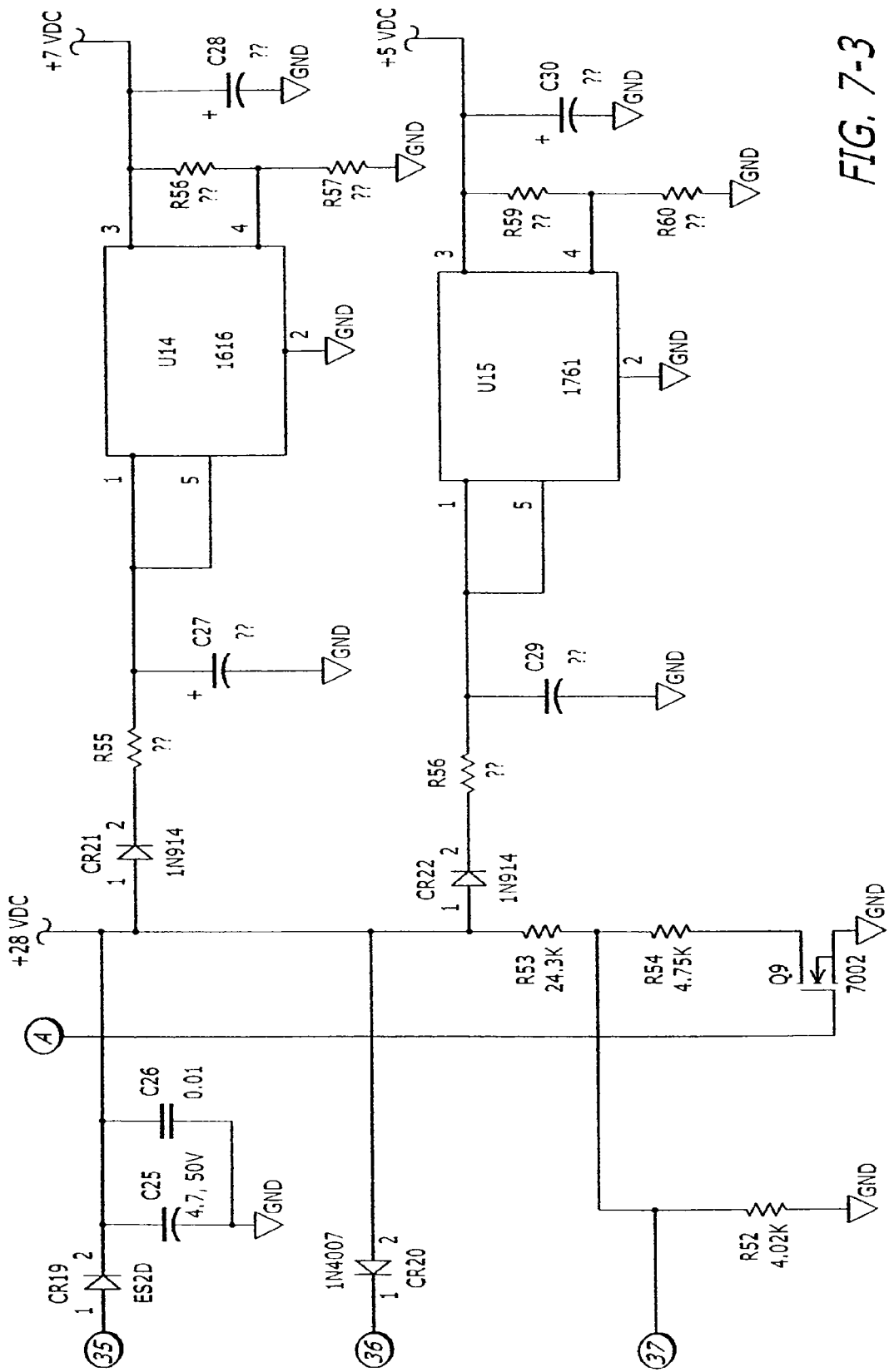

During start-up operation, component U5A is off and the voltage developed across resistors R76 and R77 is larger, thus setting the over-current threshold to the start-up value. In one configuration, resistor R76 is 24.3 k and resistor R77 is 127 k and the start-up threshold value is 60A. The on/off operation of component U5A is linked to the operation of the previously described pop-up power supply through transistors Q1 and Q9 (FIGS. 8a-3 and 7-3). The duration of time for start-up operation, ie., the time during which component U5A is off, is determined by the capacitor C53 (FIG. 8c-3) and resistor R111. For example, with a capacitor C53 of one microfarad and a resistor R111 of 100K, the start-up time is approximately 70 ms.

The rest of the logic controller circuitry, as shown in FIGS. 8b-1 through 8c-4 is similar to that previously described with reference to FIGS. 5b-1 through 5c-4. Though not shown in the schematic, the logic controller may include various maintenance circuitry including the a reset switch and a press-to-test switch and circuitry similar to that previously described with reference to FIGS. 5b-1 and 5c-1.

DC Relay with AC Pump Input

Figure 9:
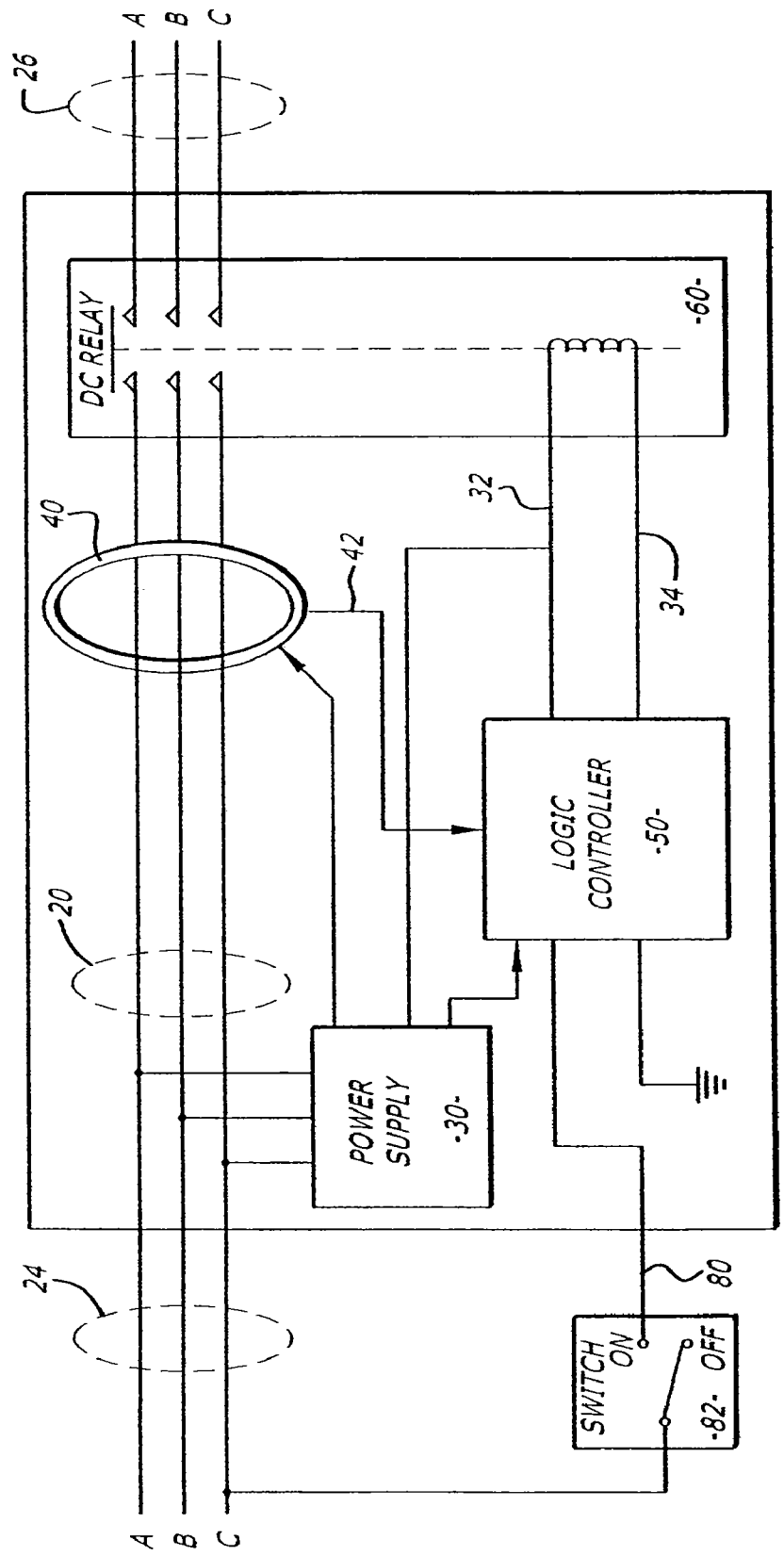
FIG. 9 is a block diagram of another configuration of the system including a power supply, a sensor system comprising a current imbalance sensor, a logic controller, an external AC pump input switch and a power controller comprising a DC relay.

With reference to FIG. 9, there is shown a system for use in an aircraft fuel system having an AC pump input 80 and an DC-coil relay 60, such as is present in the Boeing 757 aircraft. The system includes a power supply 30 that taps off of each of the 115 VAC three phase lines at the input side 24 of the electrical circuit. The power supply 30 provides power to the sensor system 40, the logic controller 50 and the DC relay 60. The AC pump input 80 to the logic controller 50 is provided by a cockpit pump switch 82 which taps off of one of the three phase lines.

Figure 10A:
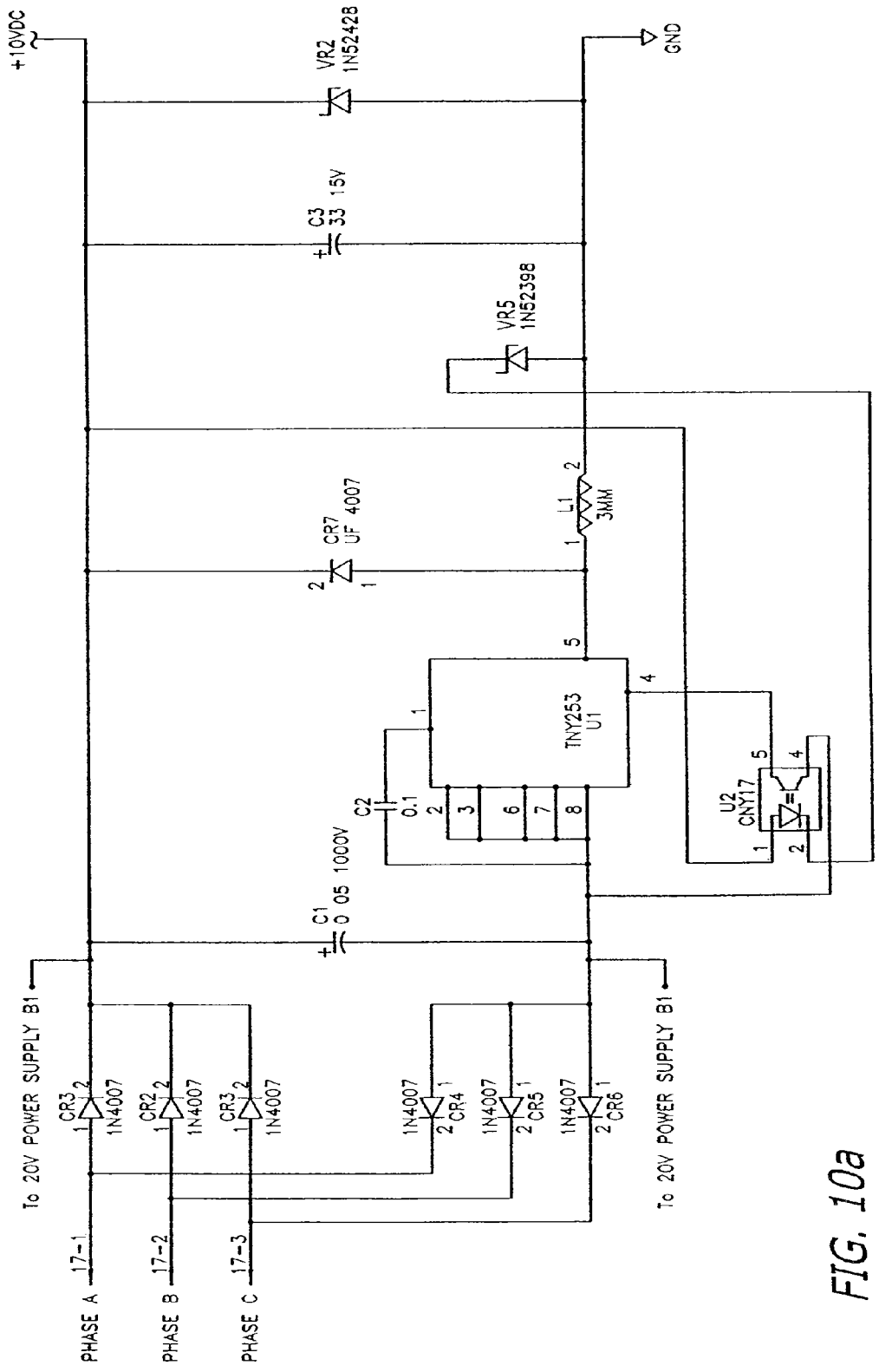
FIGS. 10a and 10b form a schematic diagram of the power supply of FIG. 9.
Figure 10B:
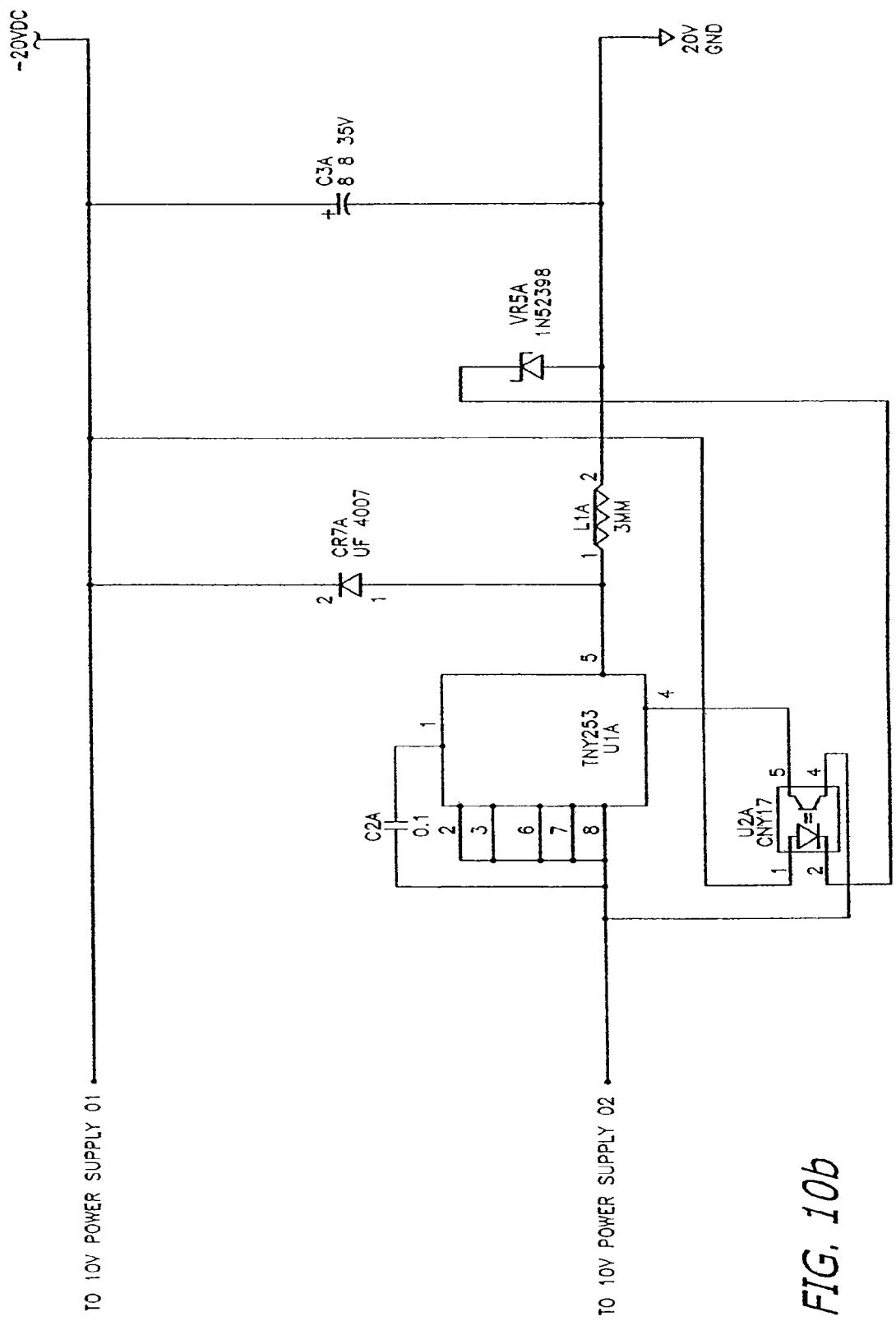

With reference to FIGS. 10a and 10b the power supply includes a 10V Supply (FIG. 10a) and a 20 V supply (FIG. 10b). The power supply includes diodes CR, CR2, CR3, CR4, CR5, and CR6 that form a full-wave three-phase bridge. Capacitor C1 acts as the storage device for the 281 V peak voltage produced by the bridge. The regulators are a buck-type configuration with the abnormal architecture of having the inductor in the lower side. This is acceptable because the circuit does not have to be referenced to earth ground. In fact, the on-board electrical ground is approximately 270V and 260V above earth ground for the 10V and 20V supplies respectively.

Preferably, the switcher operates in a non-conventional mode. If it is sensed that an output voltage is low, the corresponding controller turns on and remains on until the current through inductor L1 or L1A reaches a pre-determined amount. Otherwise, the cycle is skipped. Energy is stored in inductor L1 or L1A and transferred to output capacitor C3 or C3A through diode CR7 or CR7A. Proper regulation is determined by Zener VR1 or VR1A and opto-coupler U2 or U2A. Capacitor C2 or C2A serves to store a small amount of energy that each respective regulator uses to operate its internal circuitry.

Returning to FIG. 9, the sensor system 40 includes a single sensor surrounding the three, three-phase electrical lines which form the current path 20. The sensor 40 determines the current condition in the current path 20 by providing an output sensor signal 42 indicative of the current balance among the electrical lines.

Figure 11:
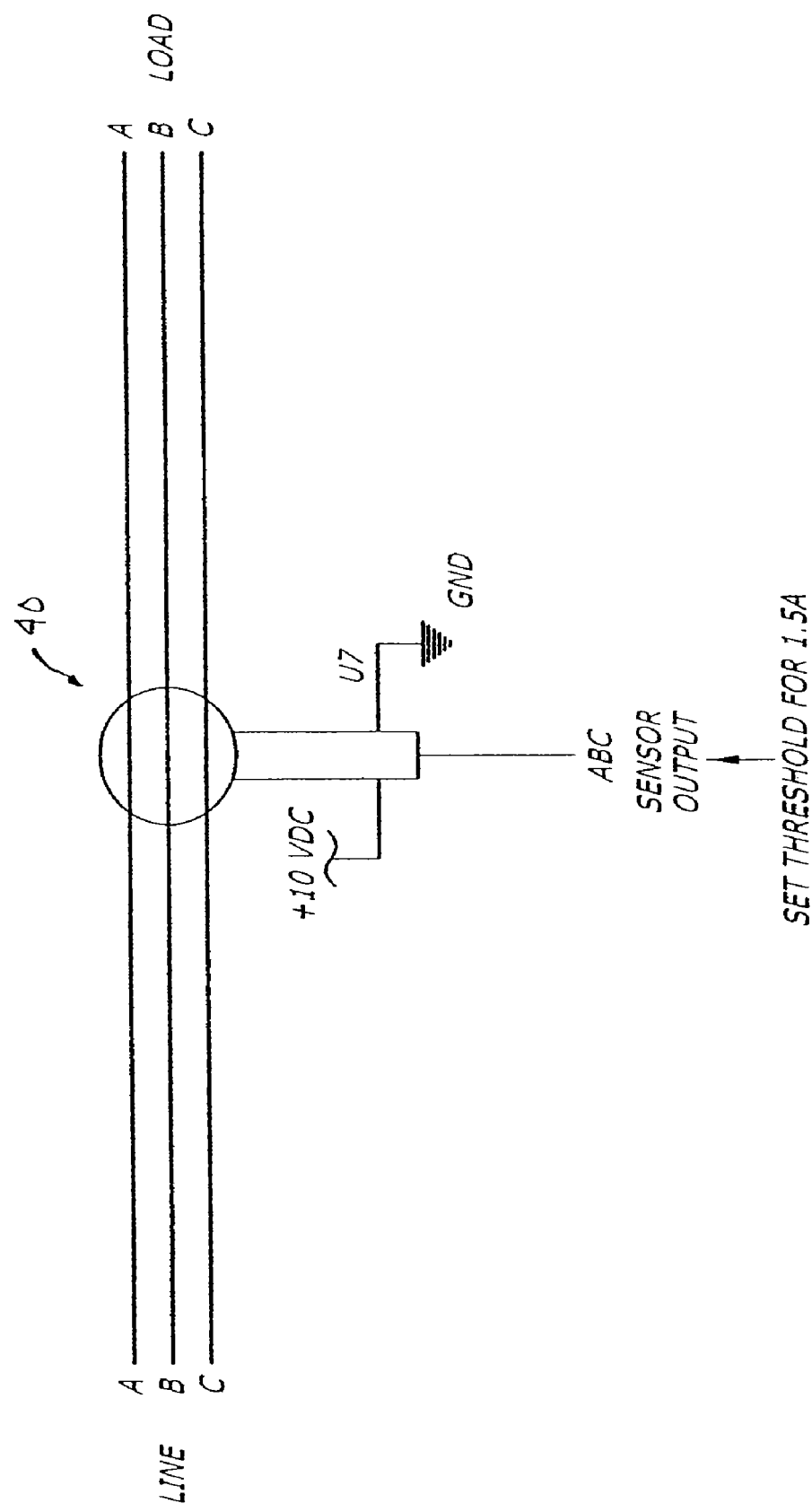
FIG. 11 is a schematic diagram of the current imbalance sensor of FIG. 9.

With reference to FIG. 11, in one embodiment, the sensor 40 is a Hall effect sensor such as an Amploc Pro 5 Hall effect linear current sensor. In alternate embodiments, the sensor 40 may be a current transformer or a giant magneto resistive (GMR) device. The sensor 40 has an output of 233 mV/A when operated at 10V Ground fault detection is accomplished by monitoring the current of all three phases with the single current sensor. The current sensor 40 algebraically sums the magnetic flux generated by the three phase currents and produces an output signal 42 that is proportional to the result. Since 3-phase AC fuel pumps typically have an ungrounded neutral, the system is "closed", requiring the current going to the fuel pump to be equal and opposite the return current. Therefore, when a ground fault condition does not exist, the magnetic flux measured at the current sensor is zero. When a ground fault condition occurs, current flows to ground (which does not return through the sensor), breaking the closed loop system and resulting in a magnetic flux imbalance measured at the sensor. Since the flux imbalance is proportional to the current, the output of the sensor provides the magnitude of the current loss. In a preferred embodiment, the output of the sensor is approximately one-half of the supply voltage, for no measured imbalance.

Returning to FIG. 9, the sensor signal output 42 from the sensor system 40 is received by the logic controller 50. The logic controller 50 compares the sensor signals 42 against an established criteria and interrupts the return path 34 of the power supply 32 to the power controller if the criteria is not satisfied. This removes the drive signal to the power controller and causes the DC relay to latch to a tripped condition and interrupt the current path 20 to the load side 26.

Figures 1, 12:
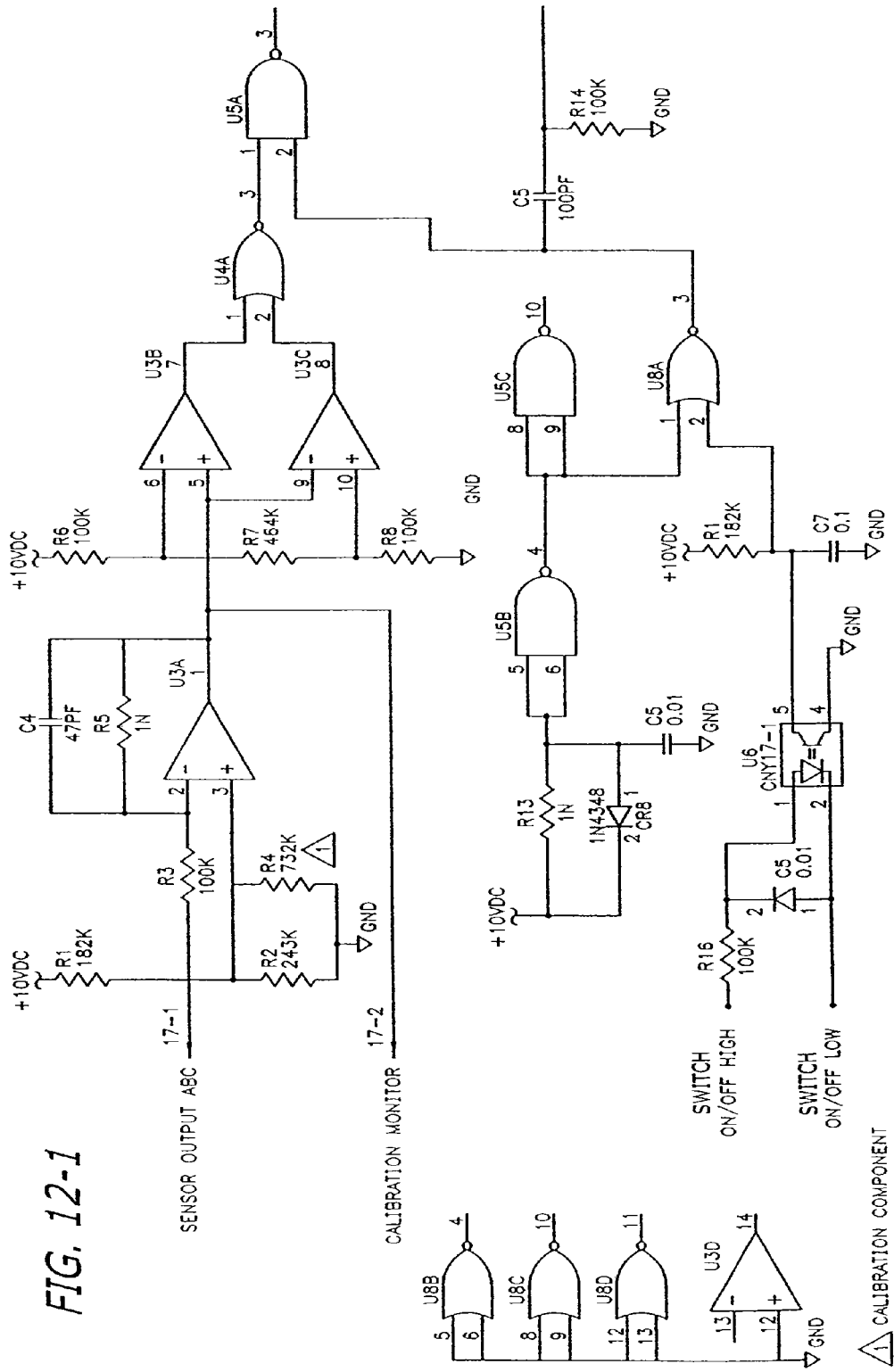
Figures 2, 12:
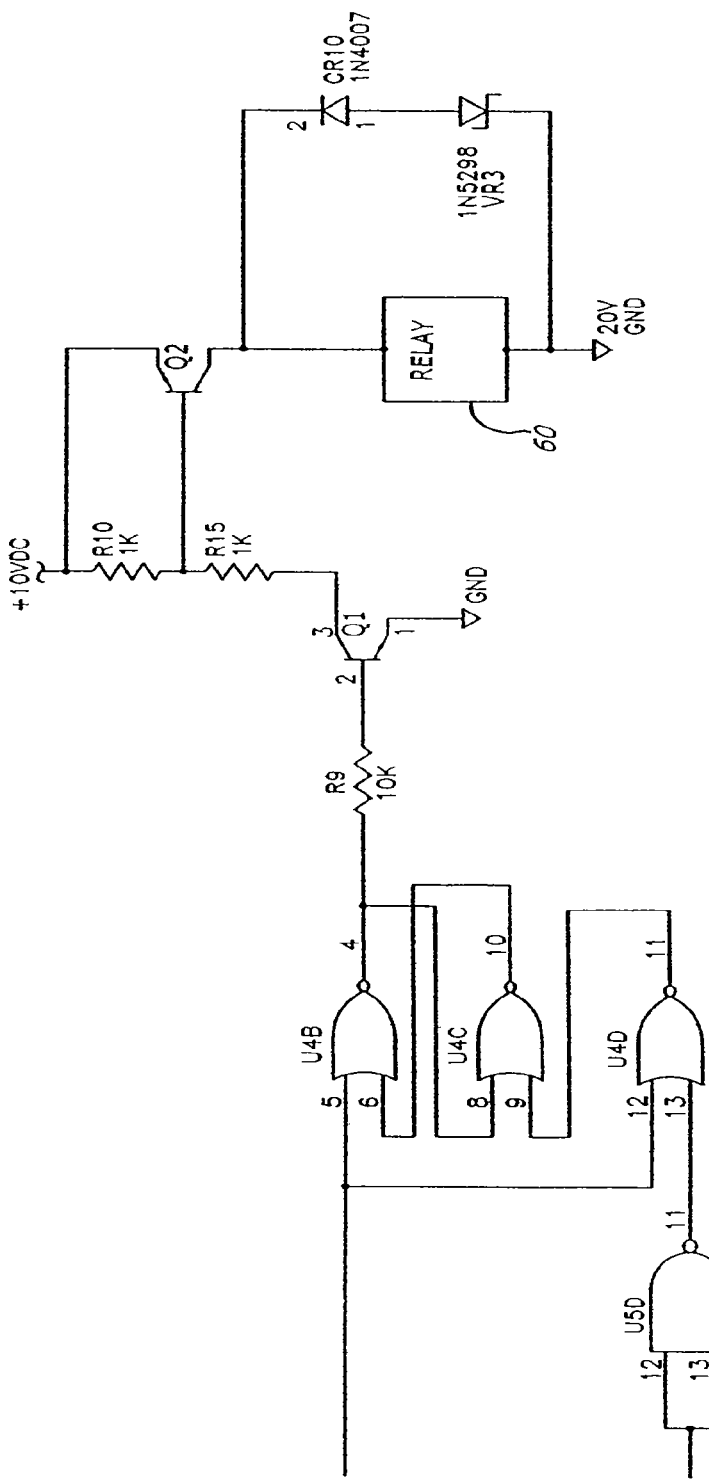

With reference to FIGS. 12-1 and 12-2, in a preferred embodiment, the output of the sensor is approximately one-half of the supply voltage, for no measured imbalance. Amplifier U3A amplifies the signal by a factor of 10. The gain is set by the ratio of resistors R5 and R3. The 3 db point is where the reactance of capacitor C4 is equal to the resistance of R5. This occurs at 3386 Hz. Resistors R1, R2, and R4 bias the amplifier and have been selected so that a maximum value of 1 meg, for resistor R4, is required to adjust the amplifier output to mid supply with the sensor at its specified worse case high output. Calibration for the worse case low output of the sensor is easily achieved.

Amplifiers U3B and U3C, and resistors R6, R7, and R8 are set to detect a current imbalance outside upper and lower current thresholds, which in one embodiment are +1.5 A RMS and −1.5 A RMS respectively. A high output from amplifier U3B or U3C indicates an imbalance is present in excess of the current thresholds Gate U4A "OR's" the outputs from amplifiers U3B and U3C. A logic 0 at its output indicates one or the other failure condition is present. Simultaneous imbalance inputs can be handled but are physically not possible since a positive imbalance cannot exist at the same time as a negative imbalance.

If a fault condition exists, it passes through gate USA presenting a logic 1 to the latch comprised of gates U4B and U4C. A logic 1, at pin 5, forces the output pin 4 low, turning transistor Q1 off, which interrupts the return path of the power supply to the DC relay thereby effectively removing the drive signal to the DC relay causing it to open and interrupt the current path 20 to the load side 26. Pin 9, the other input to the latch, is normally at logic 0. This causes pin 10 to go high, setting the latch by presenting a logic 1 to pin 6.

In a preferred embodiment, the power-up sequence initializes the power control section to the non-operate mode. This is accomplished by presenting a logic 0 to pin 2 of gate U5A to mimic a current imbalance condition. The power-up reset pulse created by gate U5B, resistor R13, capacitor C5 and diode CR8 is typically 7 usec. The reset is determined by the time it takes to charge capacitor C5 through resistor R13 to the threshold set by gate U5B. Diode CR8 provides a quick reset.

Figure 13:
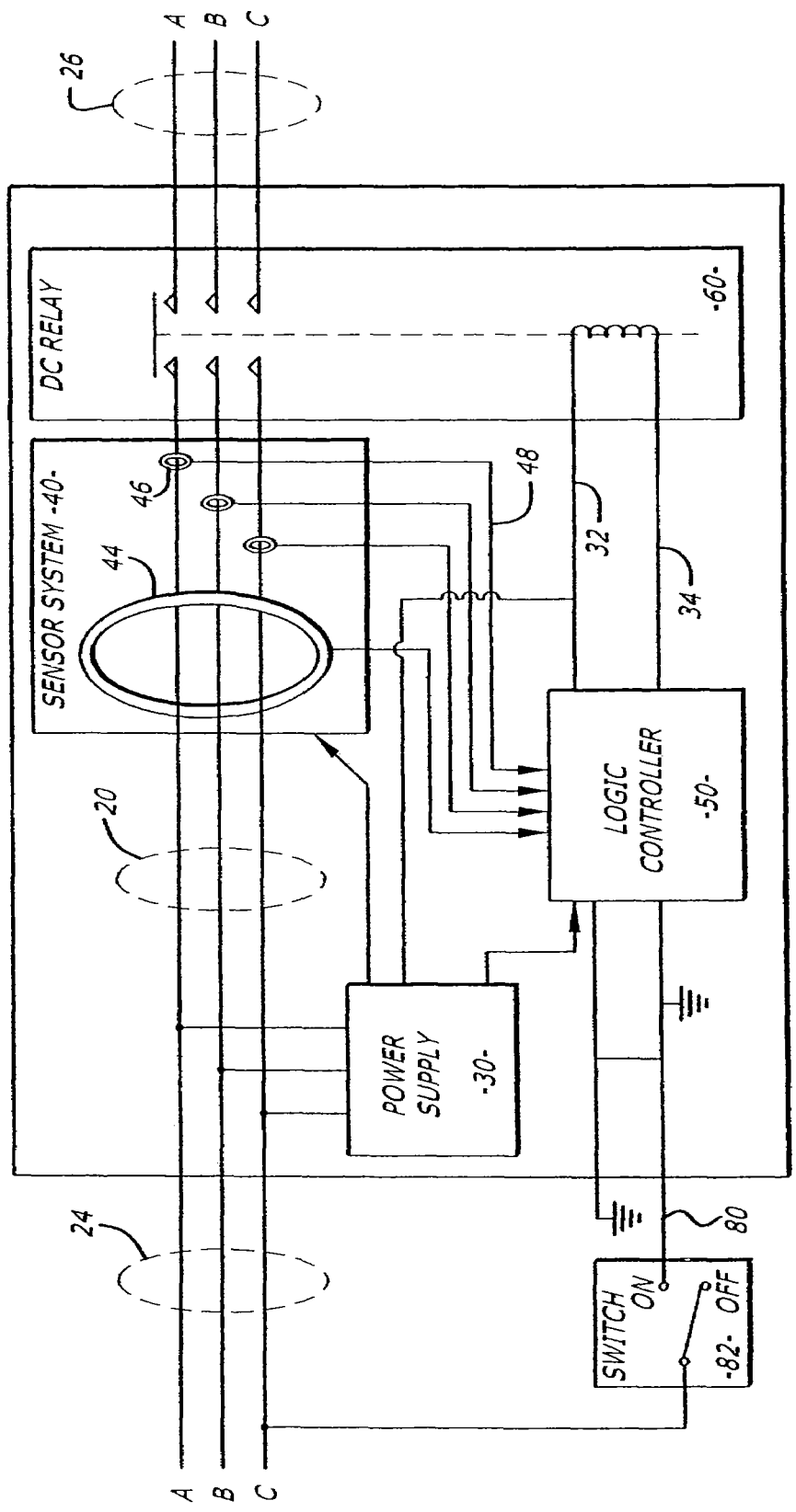
FIG. 13 is a block diagram of another configuration of the system including a power supply, a sensor system comprising a current imbalance sensor and three over-current sensors, a logic controller, an external AC pump input switch and a power controller comprising a DC relay.

With reference to FIG. 13, the system of FIG. 9 may be modified to include a sensor system 40 having over-current sensors 46 for monitoring the phase-to-phase current. The configuration of such a system is similar to that previously described with reference to FIG. 6.

AC Relay with AC Pump Input

Figure 14:
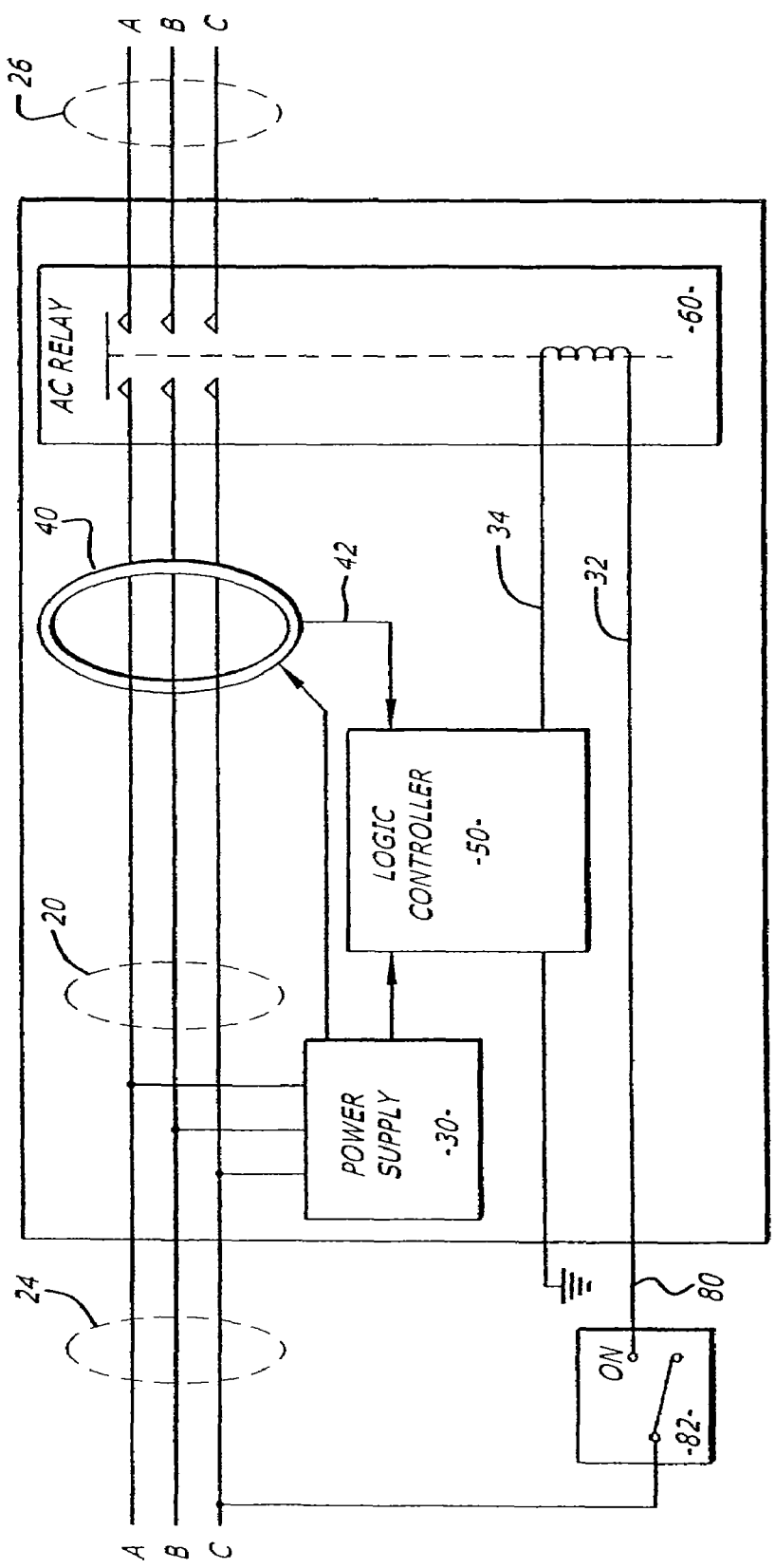
FIG. 14 is a block diagram of another configuration of the system including a power supply, a sensor system comprising a current imbalance sensor, a logic controller, an external AC pump input switch and a power controller comprising a AC relay.

With reference to FIG. 14, there is shown a system for use in an aircraft fuel system having an AC pump input and an AC-coil relay 60. The system includes a power supply 30 that taps off of each of the 115 VAC three phase lines at the input side 24 of the electrical circuit. The power supply 30 provides power to the sensor system 40 and the logic controller 50. The AC pump input 80 for the relay 60 is provided by a cockpit pump switch 82 which taps off of one of the three phase lines.

Figure 15:
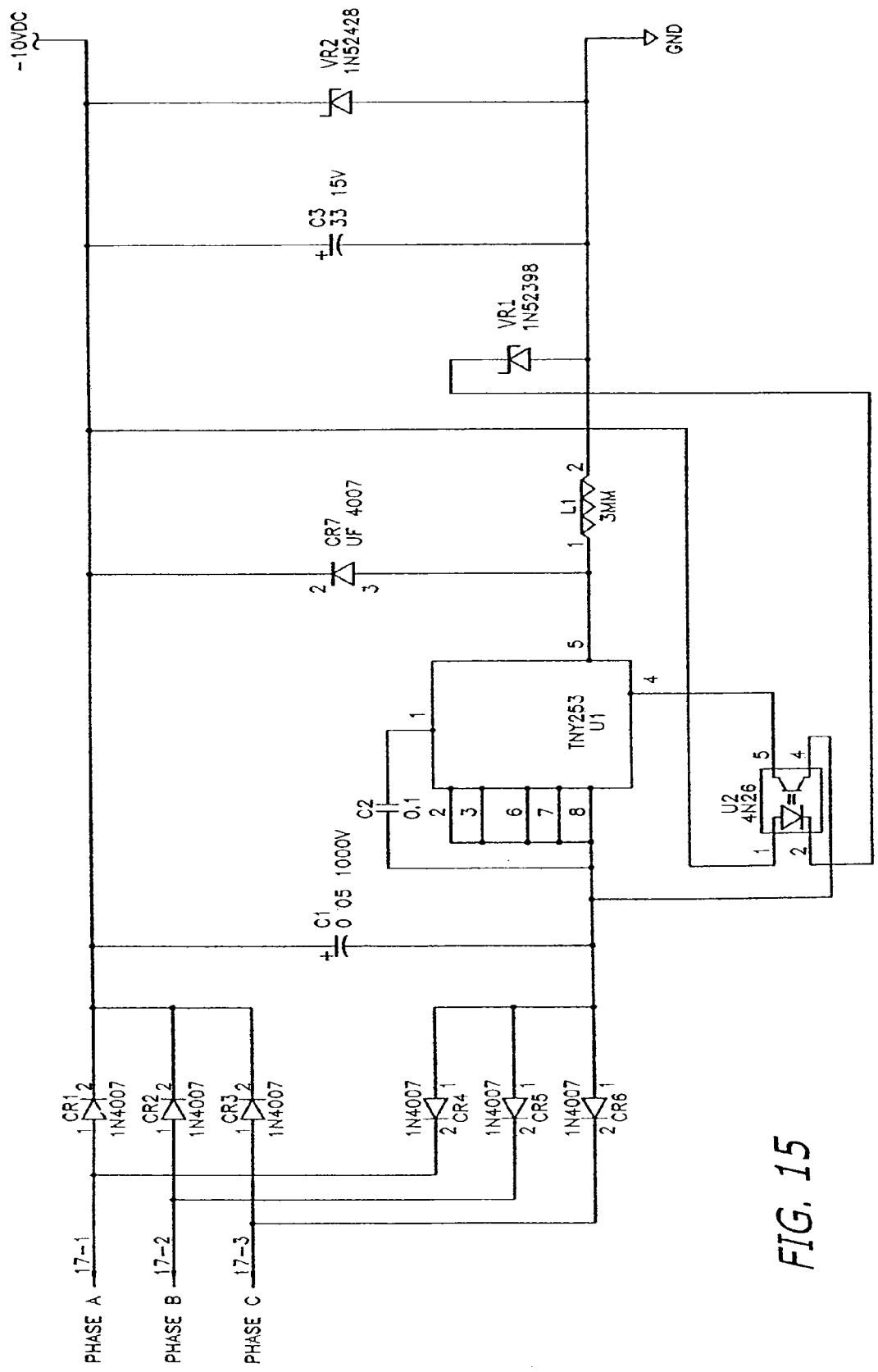
FIG. 15 is a schematic diagram of the power supply of FIG. 14.

With reference to FIG. 15, in one embodiment of the power supply 30, diodes CR1, CR2, CR3, CR4, CR5, and CR6 form a full-wave three-phase bridge. Capacitor C1 acts as the storage device for the 281V peak voltage produced by the bridge. The regulator is preferably a buck-type configuration with the abnormal architecture of having the inductor in the lower side. This is acceptable because the circuit does not have to be referenced to earth ground. In fact, the on-board electrical ground is approximately 270 V above earth ground.

Preferably, the switcher operates in a non-conventional mode. If it senses that output voltage is low, it turns on and remains on until the current through inductor L1 reaches a pre-determined amount. Otherwise, the cycle is skipped. Energy is stored in inductor L1 and transferred to output capacitor C3 through diode CR7. Proper regulation is determined by Zener VR1 and opto-coupler U2. Capacitor C2 serves to store a small amount of energy that the regulator uses to operate its internal circuitry.

Returning to FIG. 14, the sensor system 40 includes a single sensor surrounding the three, three-phase electrical lines which form the current path 20. The sensor 40 determines the current condition in the current path 20 by providing an output sensor signal 42 indicative of the current balance among the electrical lines.

Figure 16:
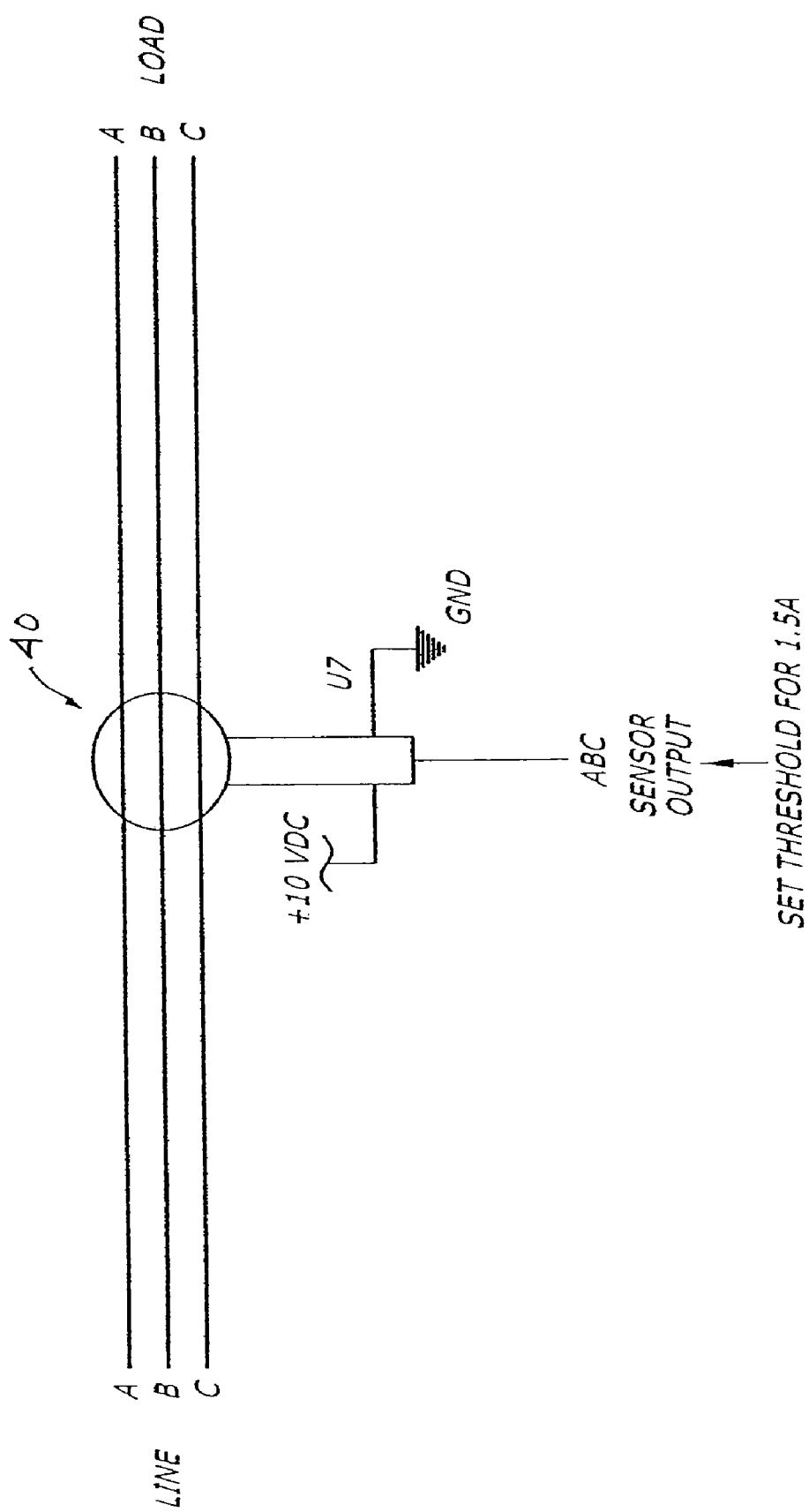
FIG. 16 is a schematic diagram of the current imbalance sensor of FIG. 14.

With reference to FIG. 16, in one embodiment, the sensor 40 is a Hall effect sensor such as an Amploc Pro 5 Hall effect linear current sensor. In alternate embodiments, the sensor 40 may be a current transformer or a giant magneto resistive (GMR) device. The sensor 40 has an output of 233 mV/A when operated at 10V. Ground fault detection is accomplished by monitoring the current of all three phases with the single current sensor 40. The current sensor 40 algebraically sums the magnetic flux generated by the three phase currents and produces an output signal 42 that is proportional to the result. Since 3-phase AC fuel pumps typically have an ungrounded neutral, the system is "closed", requiring the current going to the fuel pump to be equal and opposite the return current. Therefore, when a ground fault condition does not exist, the magnetic flux measured at the sensor 40 is zero. When a ground fault condition occurs, current flows to ground (which does not return through the sensor), breaking the closed loop system and resulting in a magnetic flux imbalance measured at the sensor 40. Since the flux imbalance is proportional to the current, the output of the sensor 40 provides the magnitude of the current loss. In a preferred embodiment, the output of the sensor 40 is approximately one-half of the supply voltage, for no measured imbalance.

Returning to FIG. 14, the sensor signal output 42 from the sensor system 40 is received by the logic controller 50. The logic controller 50 compares the sensor signal 40 against an established criteria and interrupts the return path 34 of the power supply 32 to the power controller if the criteria is not satisfied.

Figures 1, 17:
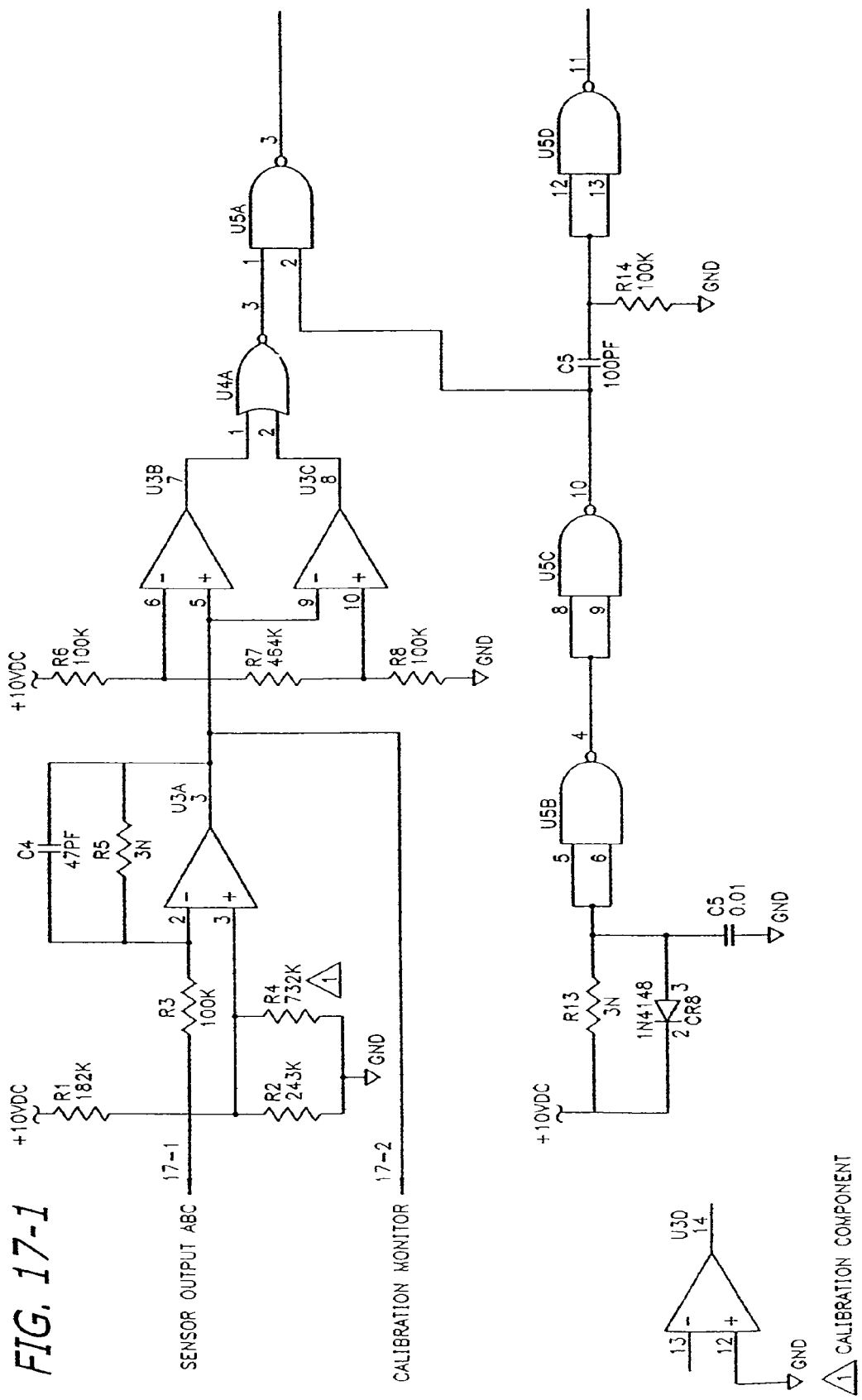
Figures 2, 17:
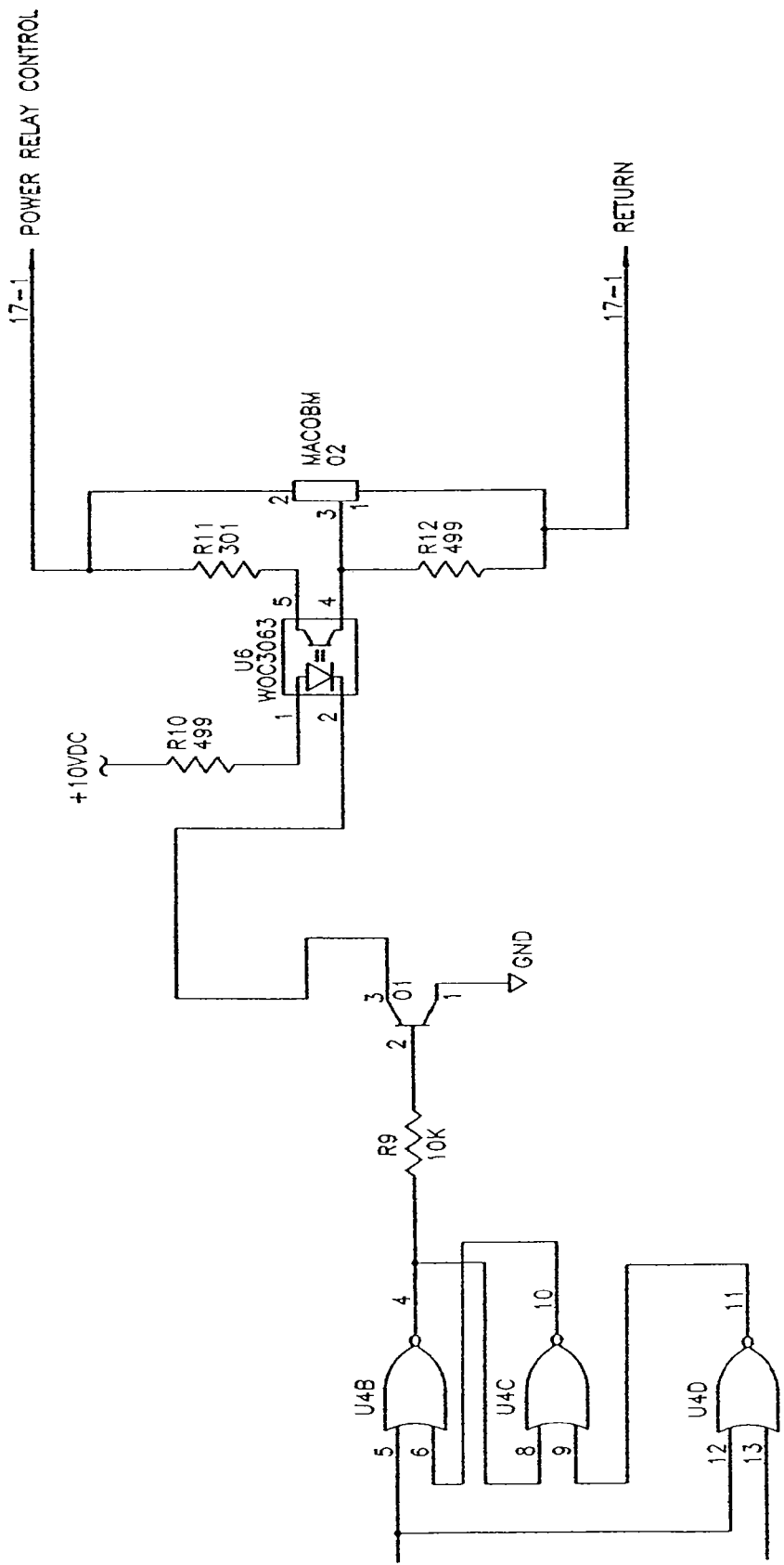

Referring to FIGS. 17-1, 17-2, amplifier U3A of the logic controller 50 receives the sensor signal 42 and amplifies the signal by a factor of ten. The gain is set by the ratio of resistors R5 and R3. The 3 db point is where the reactance of capacitor C4 is equal to the resistance of R5. This occurs at 3386 Hz. Resistors R1, R2, and R4 bias the amplifier and have been selected so that a maximum value of 1 meg, for resistor R4, is required to adjust the amplifier output to mid supply with the sensor at its specified worse case high output. Calibration for the worse case low output of the sensor is easily achieved.

Amplifiers U3B and U3C, and resistors R6, R7, and R8 are set to detect a current imbalance outside upper and lower current thresholds, which in one embodiment are +1.5 A RMS and −1.5 A RMS respectively. A high output from amplifier U3B or U3C indicates an imbalance is present in excess of the 1.5 A RMS threshold. IC U4A "OR's" the outputs from amplifiers U3B and U3C. A logic 0 at its output indicates one or the other failure condition is present. Simultaneous imbalance inputs can be handled but are physically not possible since a positive imbalance cannot exist at the same time as a negative imbalance.

If a fault condition exists, it passes through IC U5A presenting a logic 1 to the latch comprised of ICs U4B and U4C. A logic 1, at pin 5, forces the output pin 4 low, turning transistor Q1 off, which interrupts the return path 34 of the control supply 32 to the power controller 60, thereby removing the drive signal to the power controller and causing the AC relay to latch to a tripped, i.e., open, condition and interrupt the current path 20 to the load side 26. Pin 9, the other input to the latch, is normally at logic 0 This causes pin 10 to go high, setting the latch by presenting a logic 1 to pin 6.

In a preferred embodiment, the power-up sequence initializes the power control section to the non-operate mode This is accomplished by presenting a logic 0 to pin 2 of IC U5A to mimic a current imbalance condition. The power-up reset pulse created by IC U5B, resistor R13, capacitor C5 and diode CR8 is typically 7 usec. The reset is determined by the time it takes to charge capacitor C5 through resistor R13 to the threshold set by IC U5B. Diode CR8 provides a quick reset.

Figure 18:
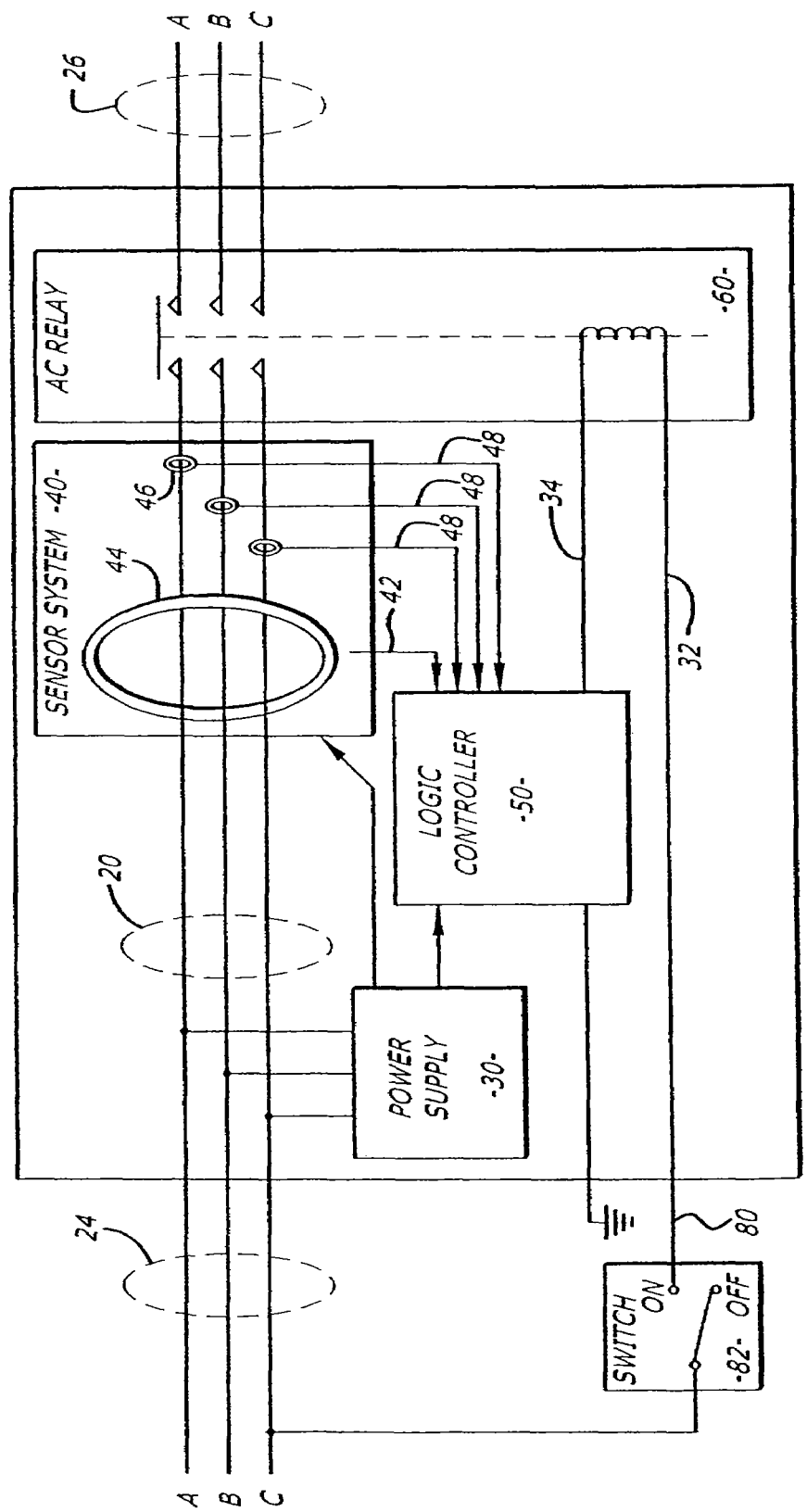
FIG. 18 is a block diagram of another configuration of the system including a power supply, a sensor system comprising a current imbalance sensor and three over-current sensors, a logic controller, an external AC pump input switch and a power controller comprising a AC relay.

With reference to FIG. 18, the system of FIG. 9 may be modified to include a sensor system 40 having over-current sensors 46 for monitoring the phase-to-phase current. The configuration of such a system is similar to that previously described with reference to FIG. 6.

Packaging

Most aircraft presently in service utilize circuit breakers with the limitations previously described. While the electronic and electromechanical aspects of the present invention impart additional protection to the protection provided by such circuit breakers, it would be desirable to be able to package the invention in a form which would allow ease of retrofit to existing aircraft, newly constructed and new aircraft designs, thus bringing the benefits of the invention to a wider range of applications. Accordingly, in a further presently preferred aspect of the invention, the electronic and electromechanical elements of the system are housed within a housing which has a similar form factor to existing power controllers. The system connects with the circuit to be monitored and controlled through the existing power controller electrical connector and draws power from the circuit to be maintained. While there are numerous form factors which can impart additional protection to the protection provided by such circuit breakers, variants of the integrated current fault interrupter are based on: a relay and a current fault interrupter circuit, or a solid state switching device and a current fault interrupter circuit. The integrated current fault interrupter is customized for specific aircraft installations. The fit and form are tailored to accommodate specific relay installations in the aircraft.

With reference to FIGS. 19a-19d, some of the above-described integrated current-fault protection/power controllers can be configured to comply with the form factor of existing power controller housings 90 used in the Boeing 737 Classic, 747 Classic and Airbus aircraft. Such housings 90 typically include a connector portion 92, a mounting flange 94 and a cover 96. The approximate dimensions of the housing 90 are as follows: approximately 2.65 inches (about 6.73 cm.) from top 98 to bottom 100, approximately 1.50 inches (about 3.81 cm.) wide along its sides 102 and approximately 2.0 inches (about 5.08 cm.) from the front side 104 of the mounting flange 94 to the rear side 106 of the mounting flange.

The connector portion 92 includes electrical connector means such as a terminal block or connector plate 108, typically with eight screw-type electrical connectors A1, A2, X1, B1, B2, C1, C2, and X2, although other conventional types of wire connectors may also be suitable. Referring to FIGS. 2 and 6, the connectors A1 and A2 accommodate a first line A and load A, the connectors B1 and B2 accommodate a second line B and load B, and the connectors C1 and C2 accommodate a third line C and load C.

Figure 19A:
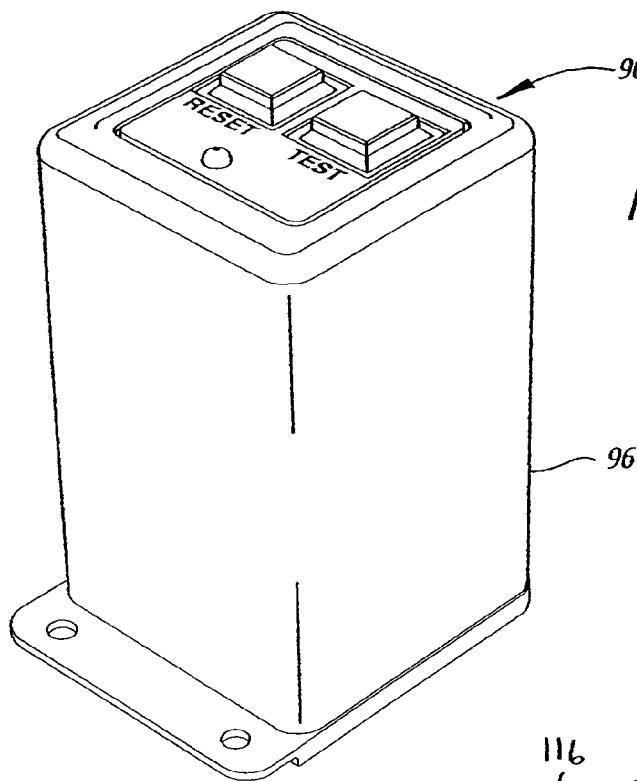
FIG. 19a is a perspective view of a device configured in accordance with the invention and adapted for use in the Boeing 737/747 Classic and Airbus aircraft.
Figure 19E:
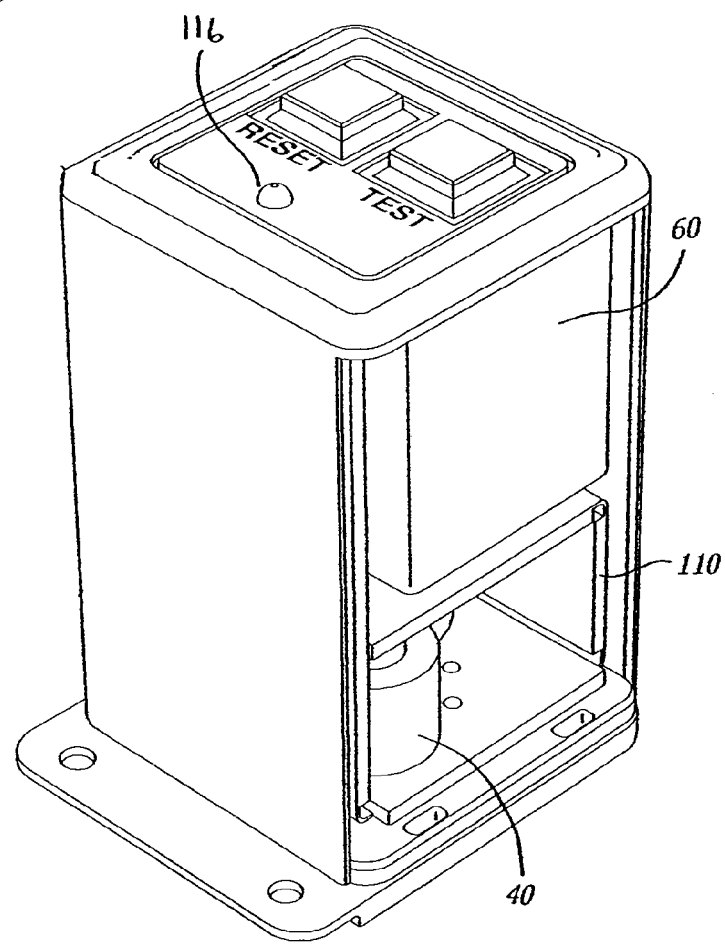
FIG. 19e is a perspective view of the device of FIG. 19a with a cutaway showing components including the power controller, sensor system and a flexible printed wiring board having system components mounted thereon.
Figure 19B:
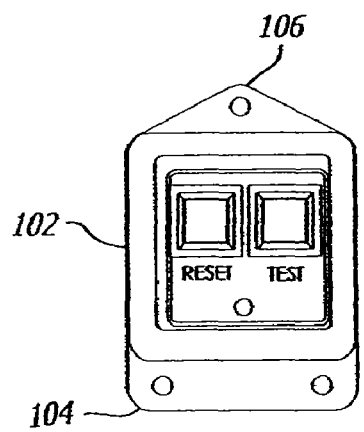
Figure 19C:
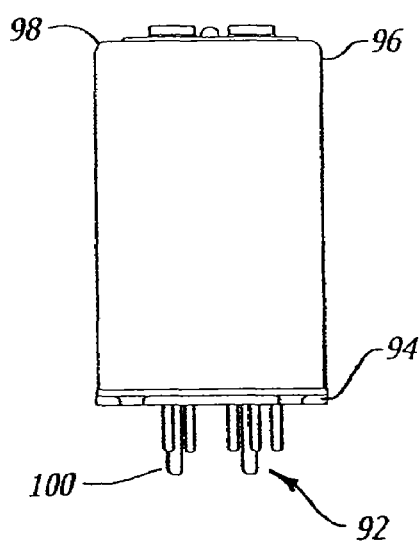
Figure 19D:
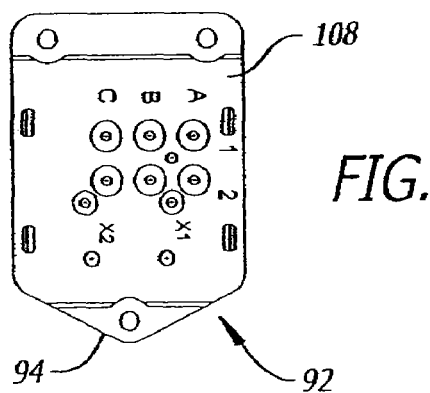
Figure 19F:
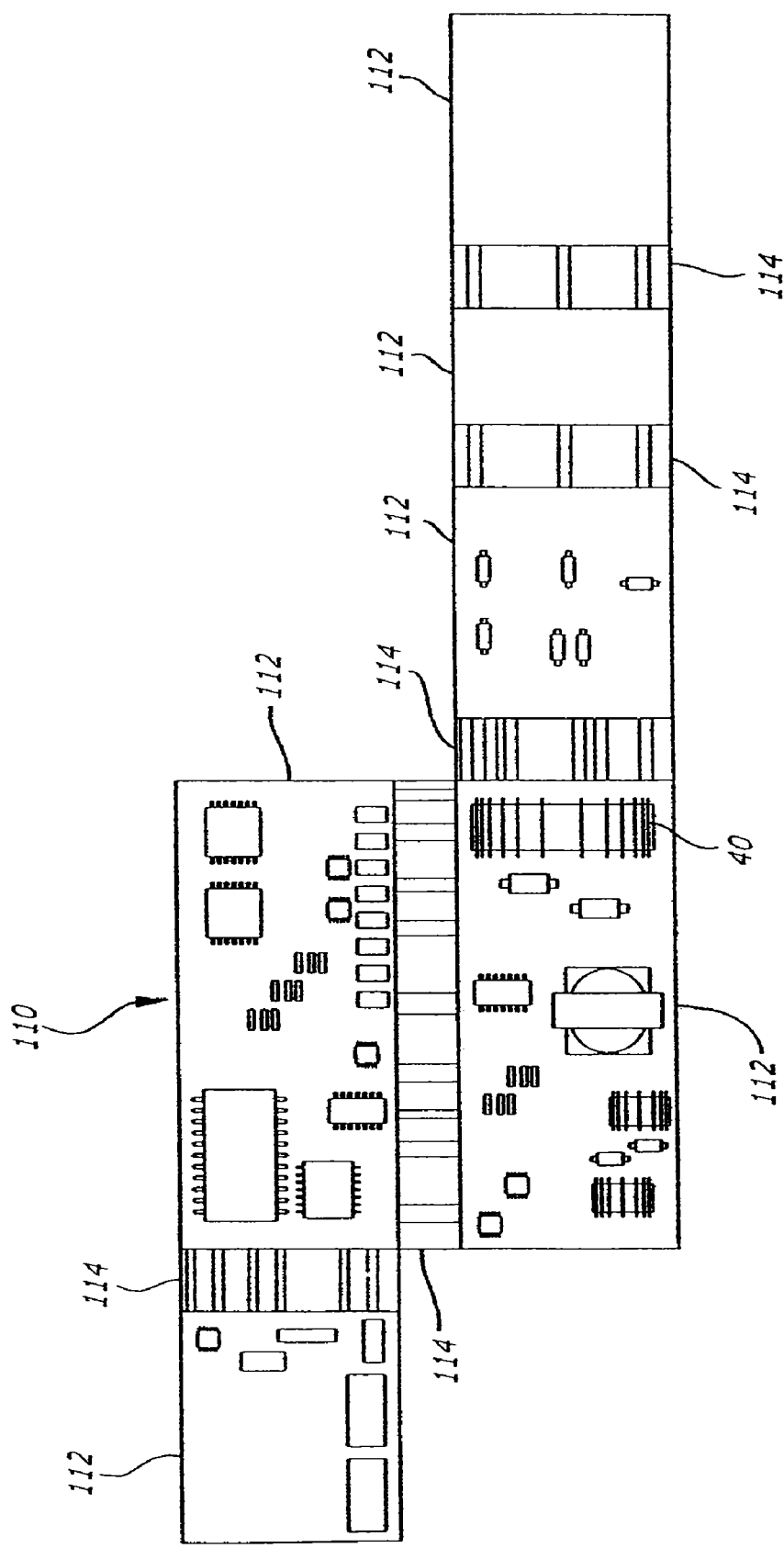
FIG. 19f is a planar view of the flexible printed wiring board of FIG. 19e.

Referring to FIGS. 19c and 19f, the circuitry forming the power supply 30, the sensor system 40, the logic controller 50 and the power controller 60 is mounted to a flex circuit board 110. The flex circuit board 110 includes portions of rigid circuit board 112 joined together by flexible portions 114. The circuit board 110 is folded into a rectangular form that fits within the housing cover 96 as shown in FIG. 19c. The use of the flex circuit board allows for the system circuitry to fit within the a housing having the same form factor as the part which it is replacing. A fault indicator 116 and Reset and Test buttons are located on the top exterior of the cover.

With reference to FIGS. 20a-20f, some of the above-described integrated current-fault protection/power controllers can be configured to comply with the form factor of existing power controller housings 120 used in the Boeing 747-400, 757 and 767 aircraft. Such housings 120 typically include a connector portion 122, a mounting flange 124 and a cover 126. The approximate dimensions of the housing 120 are as follows: approximately 3.28 inches (about 8.33 cm.) from top 128 to bottom 130, approximately 1.53 inches (about 3.89 cm.) wide along its short sides 132, and approximately 2.51 inches (about 6.38 cm.) along its long sides 134.

The connector portion 122 includes electrical connector means such as a terminal block or connector plate 136, typically with eight screw-type electrical connectors, A1, A2, X2, B1, B2, C1, C2, and X2, although other conventional types of wire connectors may also be suitable. Referring to FIGS. 9 and 13, the connectors A1 and A2 accommodate a first line A and load A, the connectors B1 and B2 accommodate a second line B and load B, and the connectors C1 and C2 accommodate a third line C and load C.

Figure 20A:
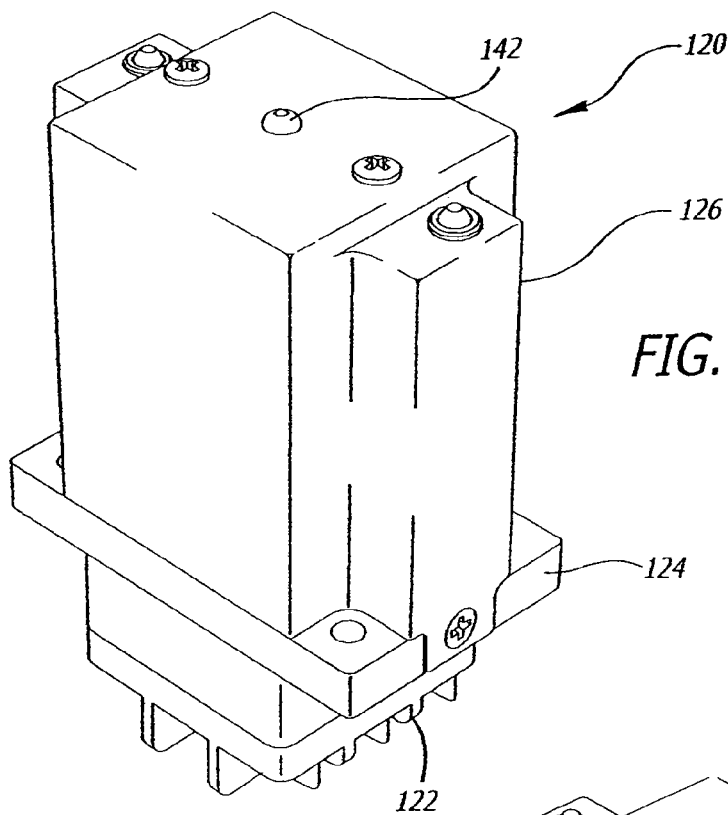
FIG. 20a is a perspective view of a device configured in accordance with the invention and adapted for use in the Boeing 747-400, 757 and 767 aircraft.
Figure 20E:
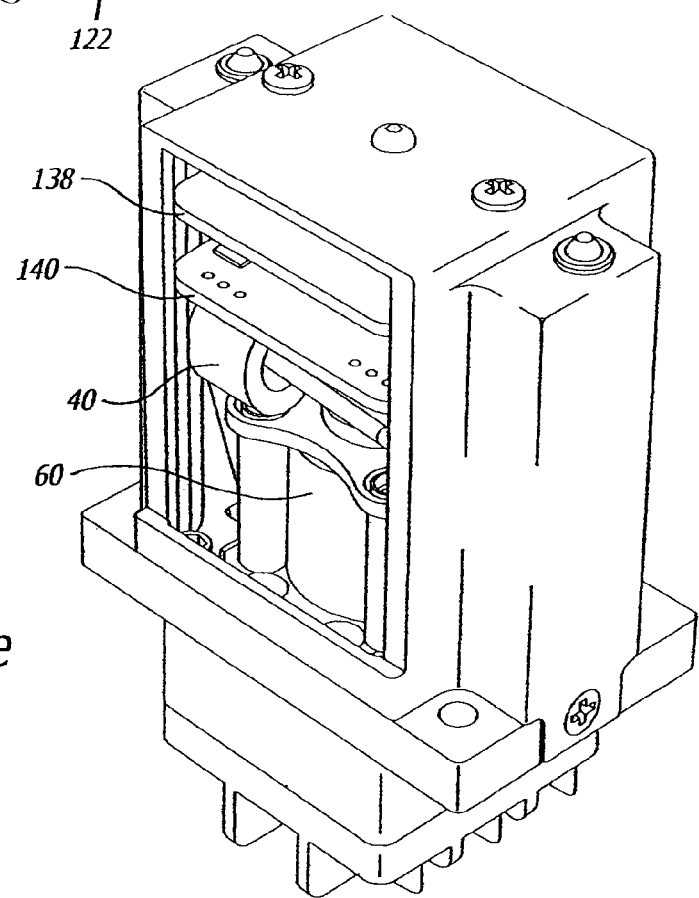
FIG. 20e is a perspective view of the device of FIG. 20a with a cutaway showing components including the power controller, sensor system and printed wiring boards having system components mounted thereon.
Figure 20B:
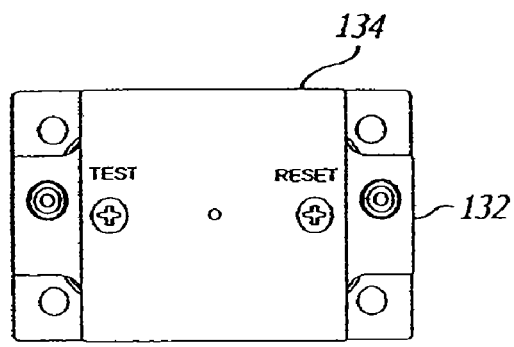
Figure 20C:
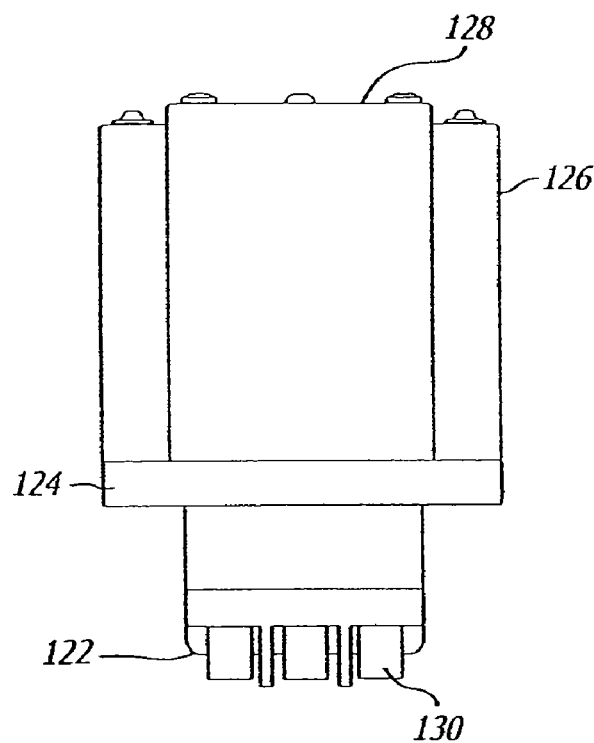
Figure 20D:
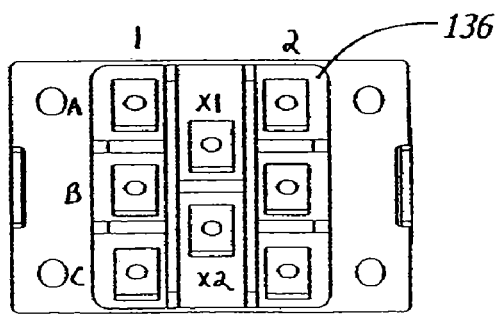

Referring to FIG. 20e, the circuitry forming the power supply 30 and the logic controller 50 is mounted on two circuit boards 138, 140 which are positioned above the sensor system 40 and the power controller 60. A fault indicator 142 and Reset and Test buttons are located on the top exterior of the cover.

With reference to FIGS. 21a-21d, some of the above-described integrated current-fault protection/power controllers can be configured to comply with the form factor of existing power controller housings 150 used in the DC-10 aircraft. Such housings 150 typically include a connector portion 152, a mounting flange 154 and a cover 156. The approximate dimensions of the housing 150 are as follows: approximately 3-25 inches (about 8.26 cm.) from top 158 to bottom 160 and approximately 2.5 inches (about 6.35 cm.) wide along its sides 162.

The connector portion 152 includes electrical connector means such as a terminal block or connector plate 164, typically with eight screw-type electrical connectors, A1, A2, X1, B1, B2, C1, C2, and X2, although other conventional types of wire connectors may also be suitable. Referring to FIGS. 9 and 13, the connectors A1 and A2 accommodate a first line A and load A, the connectors B1 and B2 accommodate a second line B and load B, and the connectors C1 and C2 accommodate a third line C and load C.

Figure 21A:
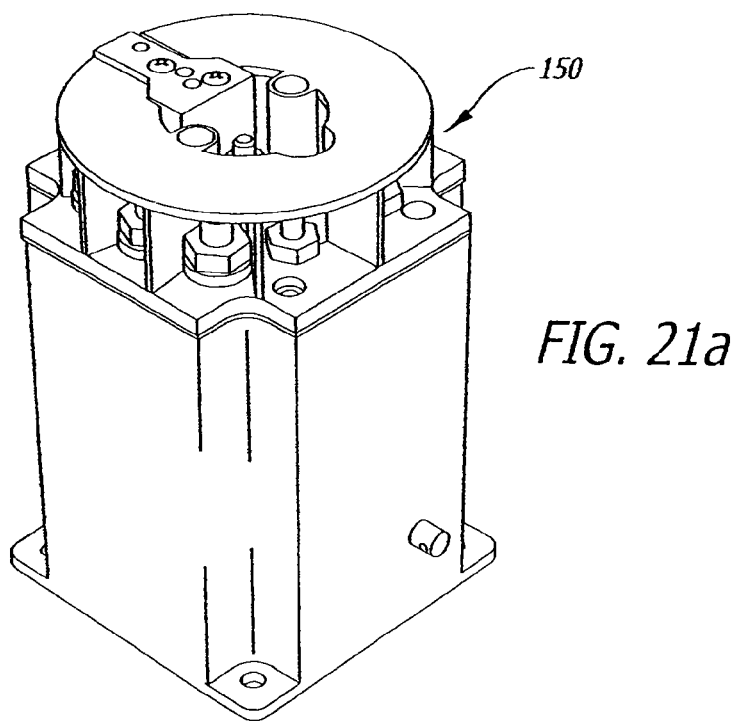
FIG. 21a is a perspective view of a device configured in accordance with the invention and adapted for use in the DC-10, MD10 and MD11 aircraft.
Figure 21E:
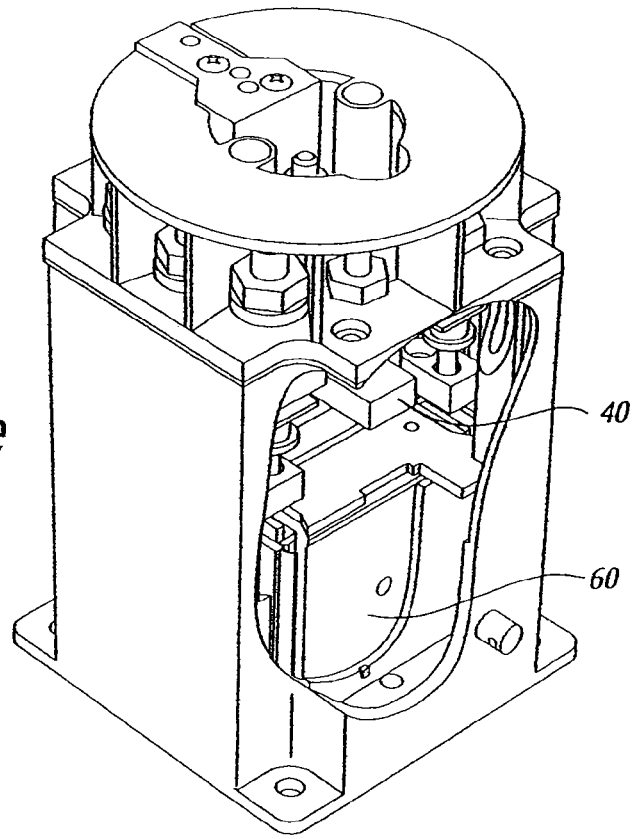
FIG. 21e is a perspective view of the device of FIG. 21a with a cutaway showing components including the power controller, sensor system and a flexible printed wiring board having system components mounted thereon.
Figure 21B:
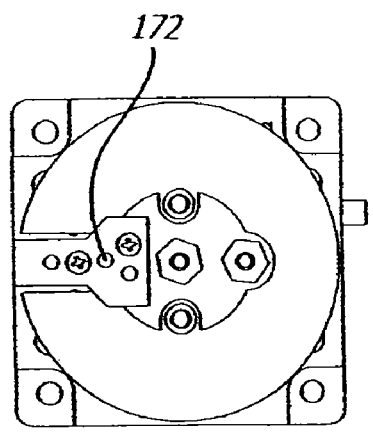
Figure 21C:
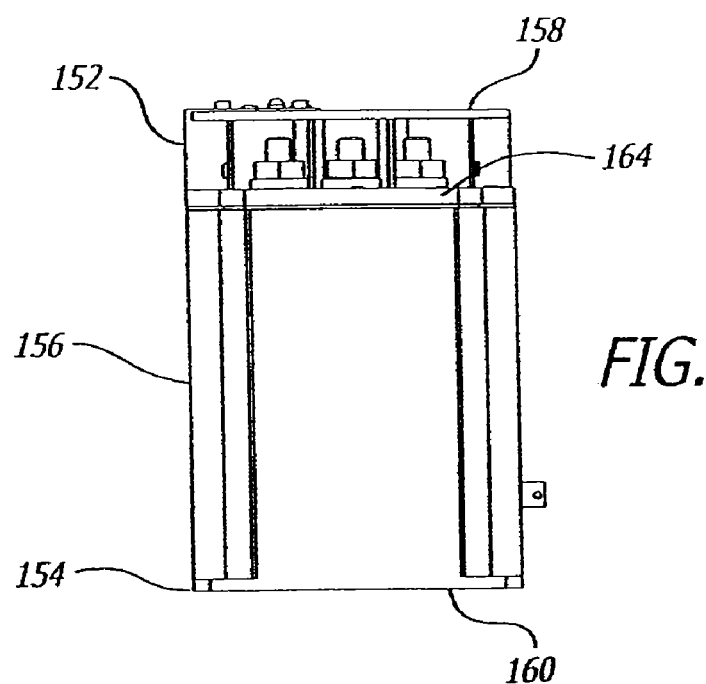
Figure 21D:
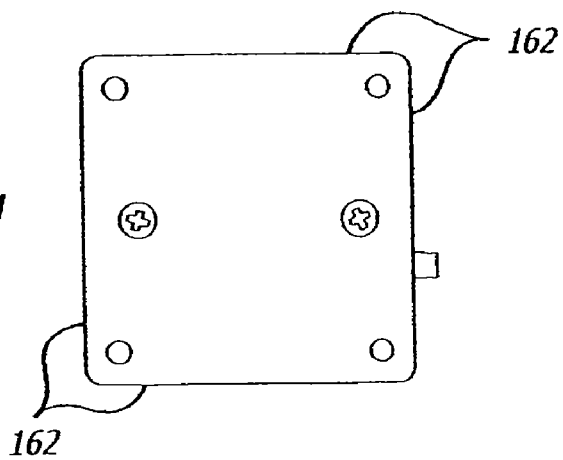
Figure 21F:
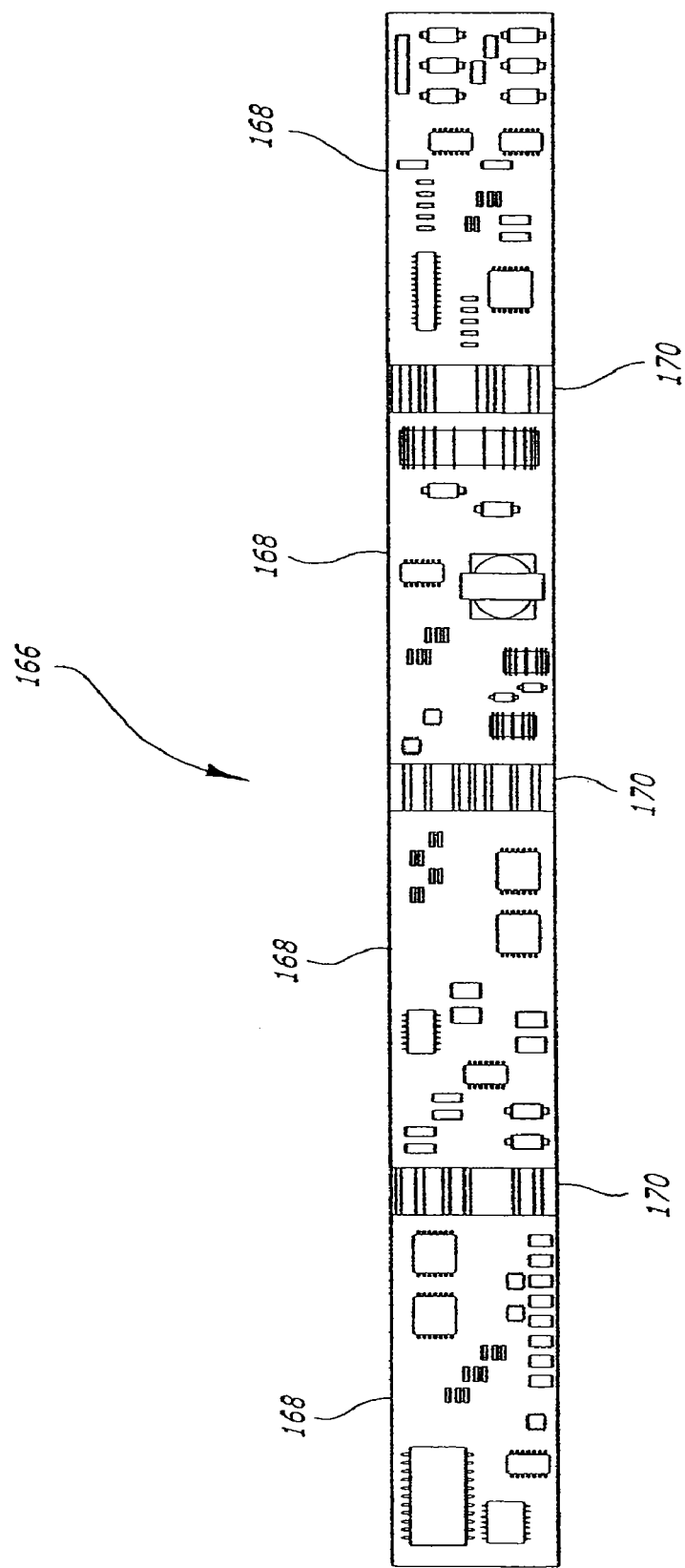
FIG. 21f is a planar view of the flexible printed wiring board of FIG. 21e.

Referring to FIGS. 21e and 21f, the circuitry forming the power supply 30, the sensor system 40, the logic controller 50 and the power controller 60 is mounted to a flex circuit board 166. The flex circuit board 166 includes portions of rigid circuit board 168 joined together by flexible portions 170. The circuit board 166 is folded into a rectangular form that fits within the housing cover 156. The maintenance system 70 circuitry is located near the top of the cover and interfaces with a fault indicator 172 and Reset and Test buttons located on the top exterior of the cover.

Integrated Current-Fault Protection/Circuit Breaker

In another embodiment, the invention provides an integrated current-fault protection circuit breaker, referred to herein as a fault protection breaker (FPB). The FBD incorporates the current fault protection aspects of the previously described integrated current-fault protection/power controllers into a circuit breaker that is intended to replace existing aircraft system circuit breakers. The FPB consists of sensing and control electronics and electromechanical components integrated with a circuit breaker in a single package to provide the addition of ground fault and/or over-current detection while maintaining the existing capabilities and functionality of the 3-phase 115 VAC circuit breaker. An extension push-pull button, herein referred to as the FPB push-pull button is attached to the internal circuit breaker push-pull button, and when this extension is electromechanically tripped, it pulls open the circuit breaker push-pull button. In a preferred embodiment, the electromechanical trip is done with a solenoid and balance spring to provide the necessary forces to pull open the circuit breaker. Manual operation of the FPB push-pull button can also be performed to open and close the circuit breaker contacts to remove or apply power to the fuel pump.

Figure 22:
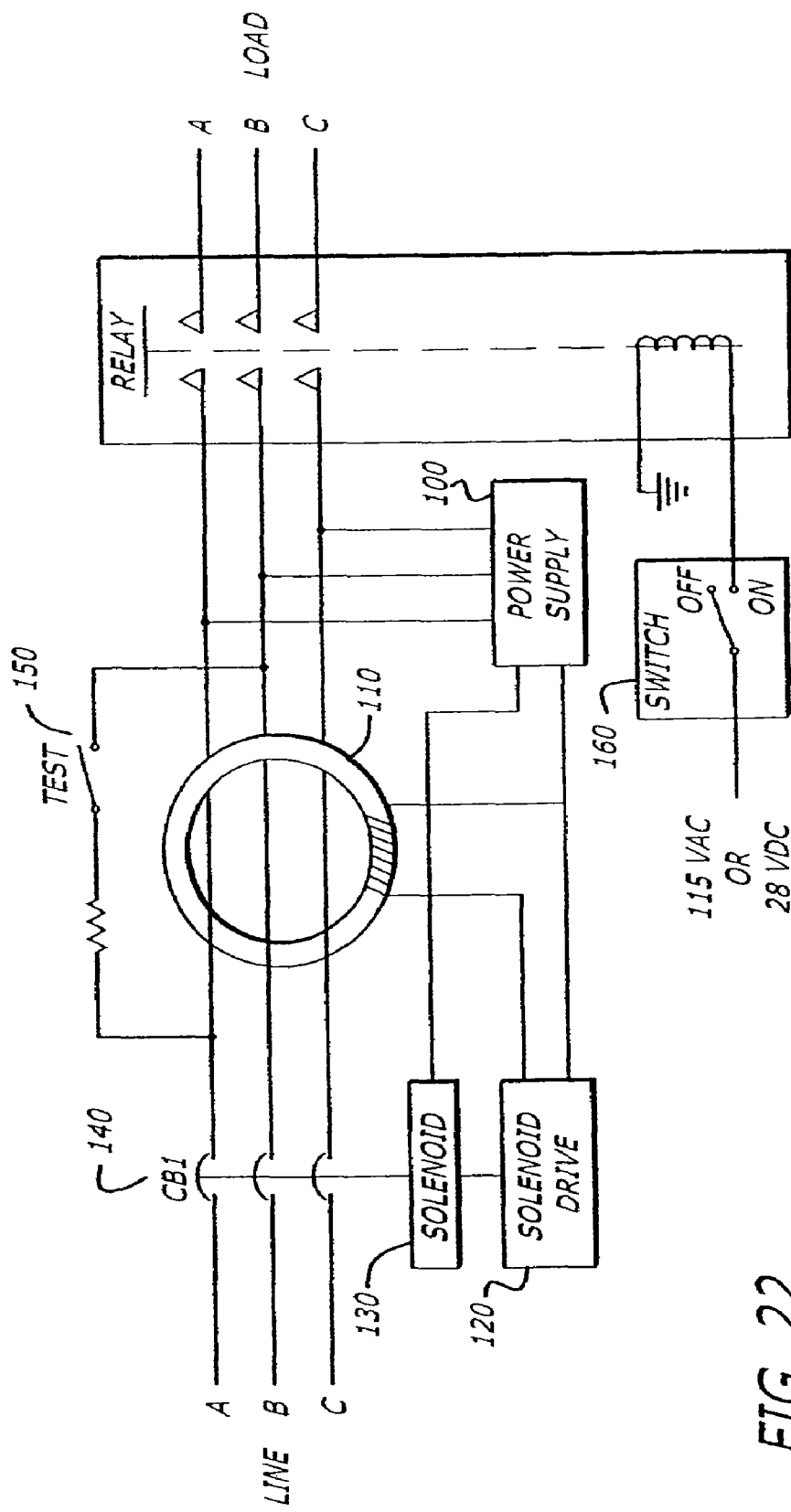
FIG. 22 is a block diagram of a current-fault detector/circuit breaker configuration of the system including a power supply, a sensor system comprising a current imbalance sensor, a solenoid drive and a power controller comprising a circuit breaker and a solenoid.

With reference to FIG. 22, in one configuration, the FPB includes a power supply 100, a current sensor 110, a controller or solenoid drive 120, a solenoid 130, a mechanical circuit breaker 140 with associated push-pull button (not shown) and a test switch 150. The FPB push-pull button is electromechanically tripped to latch the ground fault condition, removing the 3-phase power to the fuel pump and providing FPB indication. The FPB is a completely self-contained unit, obtaining its electronics power from the load side 3-phase power and uses the same aircraft wire interfaces as the circuit breaker.

Figure 23:
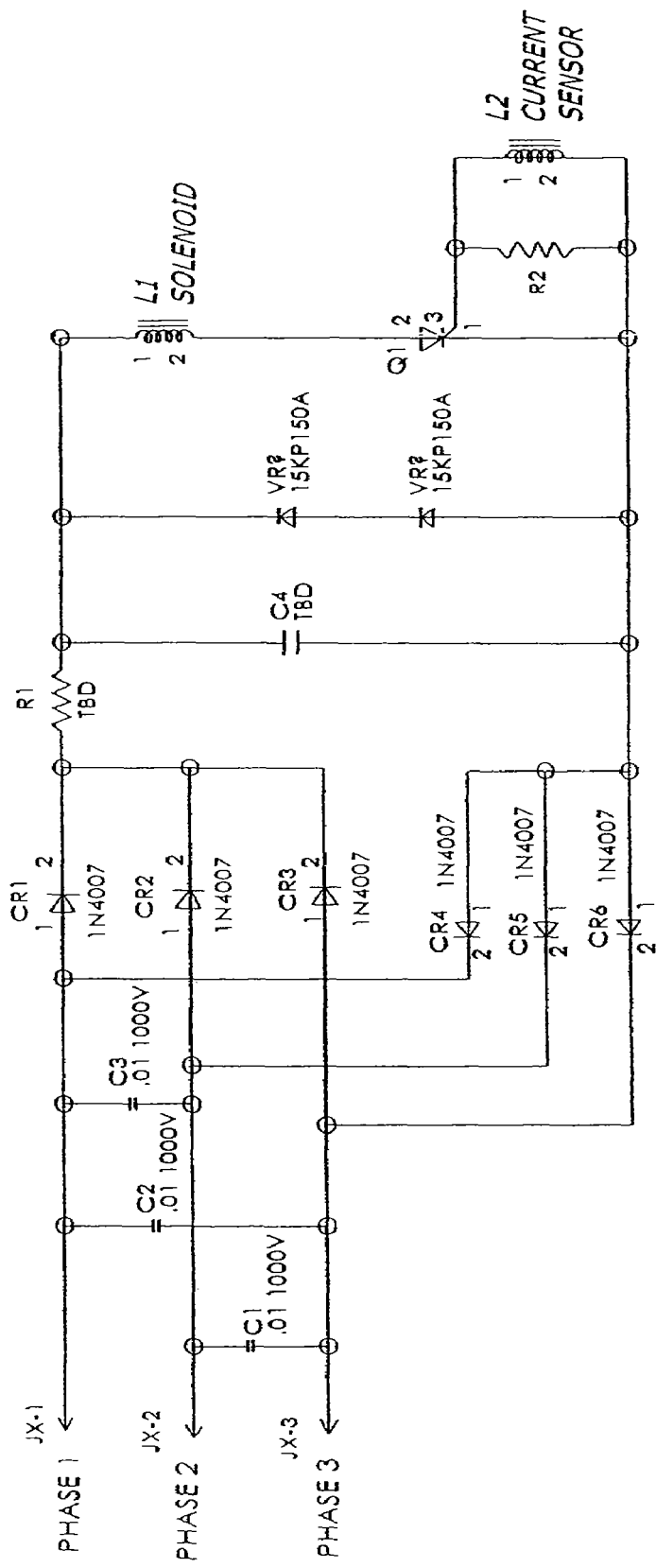
FIG. 23 is a schematic diagram of the system of FIG. 22.
Figure 24A:
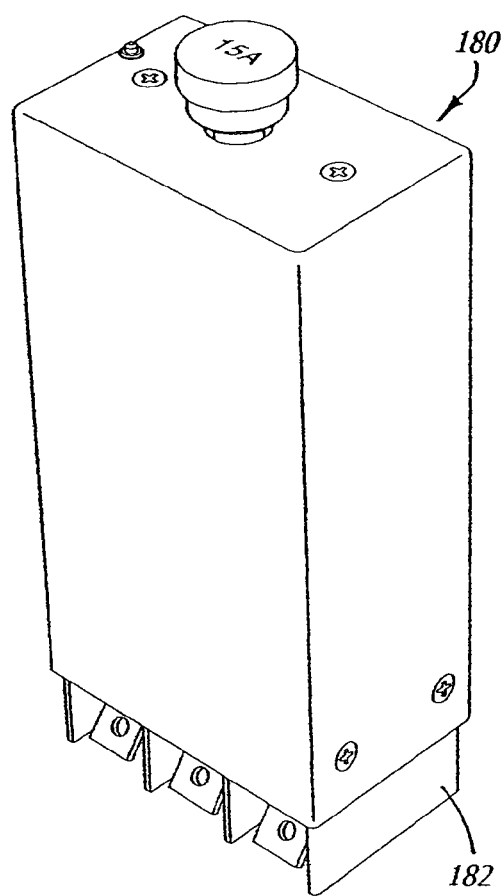
FIG. 24a is a perspective view of a current-fault detector/circuit breaker configured in accordance with the invention.
Figure 24E:
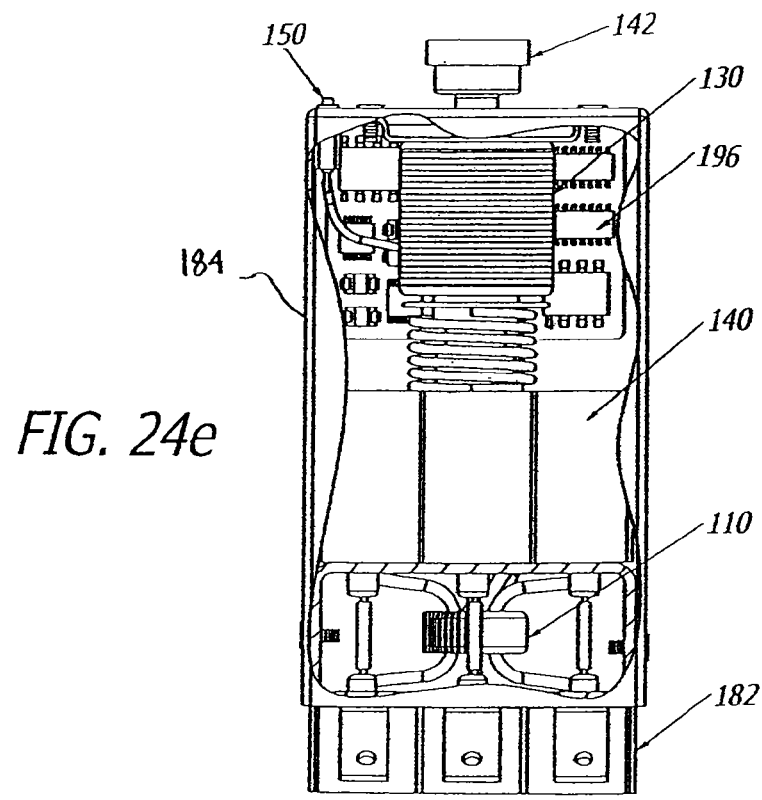
FIG. 24e is a cutaway view of the device of FIG. 24a showing components including the circuit breaker and solenoid, sensor system and a printed wiring board having system components mounted thereon.
Figure 24B:
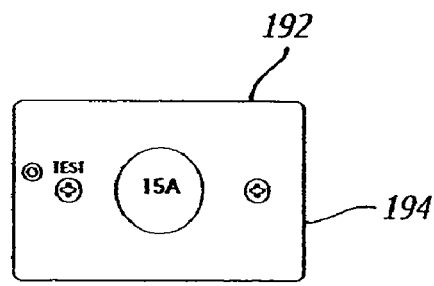
Figure 24C:
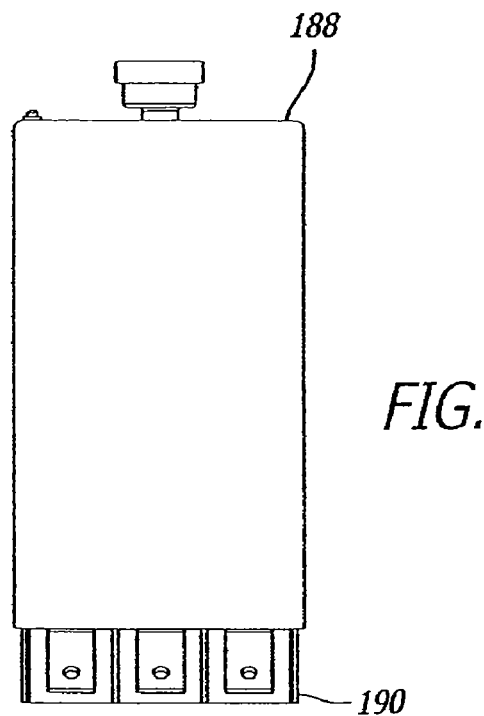
Figure 24D:
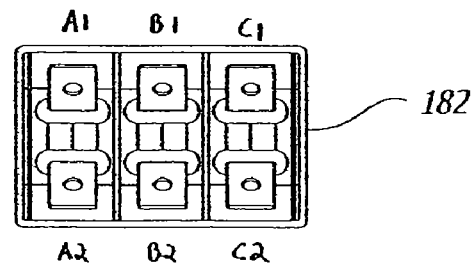

With reference to FIG. 23, the FPB detects net flux generated by the three phase currents using a single current sensor L2. The flux signal is input to the solenoid drive Q1 where it is conditioned and filtered to eliminate nuisance trips and the net fluxes of either polarity are detected. Upon the occurrence of a ground fault the solenoid drive Q1 causes the solenoid L1 to trigger an electromechanical activation of the push-pull button, removing the 3-phase power. The FPB push-pull button remains in the latched faulted condition until the push-pull button is manually reset. When the FPB is in the faulted state, cycling the pump control switch 160 (115 VAC or 28 VDC) has no effect on control of the fuel pump.

In one configuration, the FPB detects a ground fault condition when a current imbalance exists that is outside of an established range, which in one configuration is −1.5 A RMS to +1.5 ARMS. This range allows sufficient margin to prevent fuel pump motor leakage current that is a function of motor winding insulations and contaminated fuel, from causing nuisance trips.

As in the case of determining fault detection thresholds, nuisance trips are also a concern when choosing fault detection speed. The FPB response to a ground fault can be broken into detection and reaction times. The reaction time is dependent on the electromechanical actuation of the push-pull button, while the detection time is dependent on minimizing nuisance trips. The FPB includes a filtering system to attenuate high frequency effects most commonly caused by noise, EMI, lightning and HIRF. Typically these high frequency signals cause erroneous indications. The bandwidth of the system and the range of operation have been restricted to minimize nuisance trips while retaining the widest possible frequency spectrum of detection A sensor 110 with the proper range of sensitivity is selected to allow signals in the range of interest to be measured.

FPB operation is lost in the event of a power interruption of the 3-phase power to the line side of the FPB. However, power interruptions of any duration, do not result in a latched FPB fault condition or reset of a latched FPB fault condition. When the interrupt terminates, the FPB returns to the mode it was in prior to the interruption.

A ground fault condition trips the FPB push-pull button located on the top of the FPB, extending the button to a height to provide visual indication of the FPB state. The FPB in a tripped condition can only be reset by manually resetting the push-pull button 142 on the FPB.

In a preferred embodiment, an end-to-end test verifies the FPB is operating correctly. This is accomplished with a press-to-test switch 150 located on the top of the FPB housing. Activation of this switch simulates a ground fault condition by passing a current through the sensor that is just above the maximum threshold. This manual test results in a latched FPB, removes power from the load side contacts and extends the push-pull button to provide visual indication. The push-pull button must be reset (pushed in) to clear the FPB fault condition.

Packaging

With reference to FIGS. 24a-24f, the above-described integrated current-fault protection/circuit breaker can be configured to comply with the form factor of existing 15A and 20A circuit breaker housings 180 used in the Boeing 700 series aircraft and the like. Such housings 180 typically include a connector portion 182, a cover 184 and a push/pull button 142. The approximate dimensions of a 15 A circuit breaker housing 180 are as follows: approximately 4.00 inches (about 10.16 cm.) from top 188 to bottom 190, approximately 2.00 inches (about 5.08 cm.) along its long sides 192 and approximately 1.38 inches (about 3.51 cm.) along its short sides 194.

The connector portion 182 includes electrical connector means such as a terminal block or connector plate with six terminals, A1, A2, B1, B2, C1 and C2. Referring to FIG. 23, the connectors A1 and A2 accommodate a first line A and load A, the connectors B1 and B2 accommodate a second line B and load B, and the connectors C1 and C2 accommodate a third line C and load C. The sensor system 110 is positioned above the connector portion 182. The input lines A, B and C pass through the sensor system 110 and are input to a circuit breaker which functions as the power controller 140. The output lines A, B and C return to the connector portion.

The circuitry forming the power supply 100, and the solenoid drive 120 is mounted to a circuit board 196. The power supply 100 and solenoid drive 120 interface with the solenoid 130.

Standalone Current-Fault Protection Device

In accordance with another embodiment of the invention, the system is configured as a standalone device that can be installed anywhere in a circuit between a circuit breaker and the load, as long as the power and return lines associated with the load are accessible to the device. As with the previously described system configurations, the standalone devices derive their operational power from the line side of the power line being monitored. Accordingly, no additional power sources are required by the device.

DC Configuration

Figure 25:
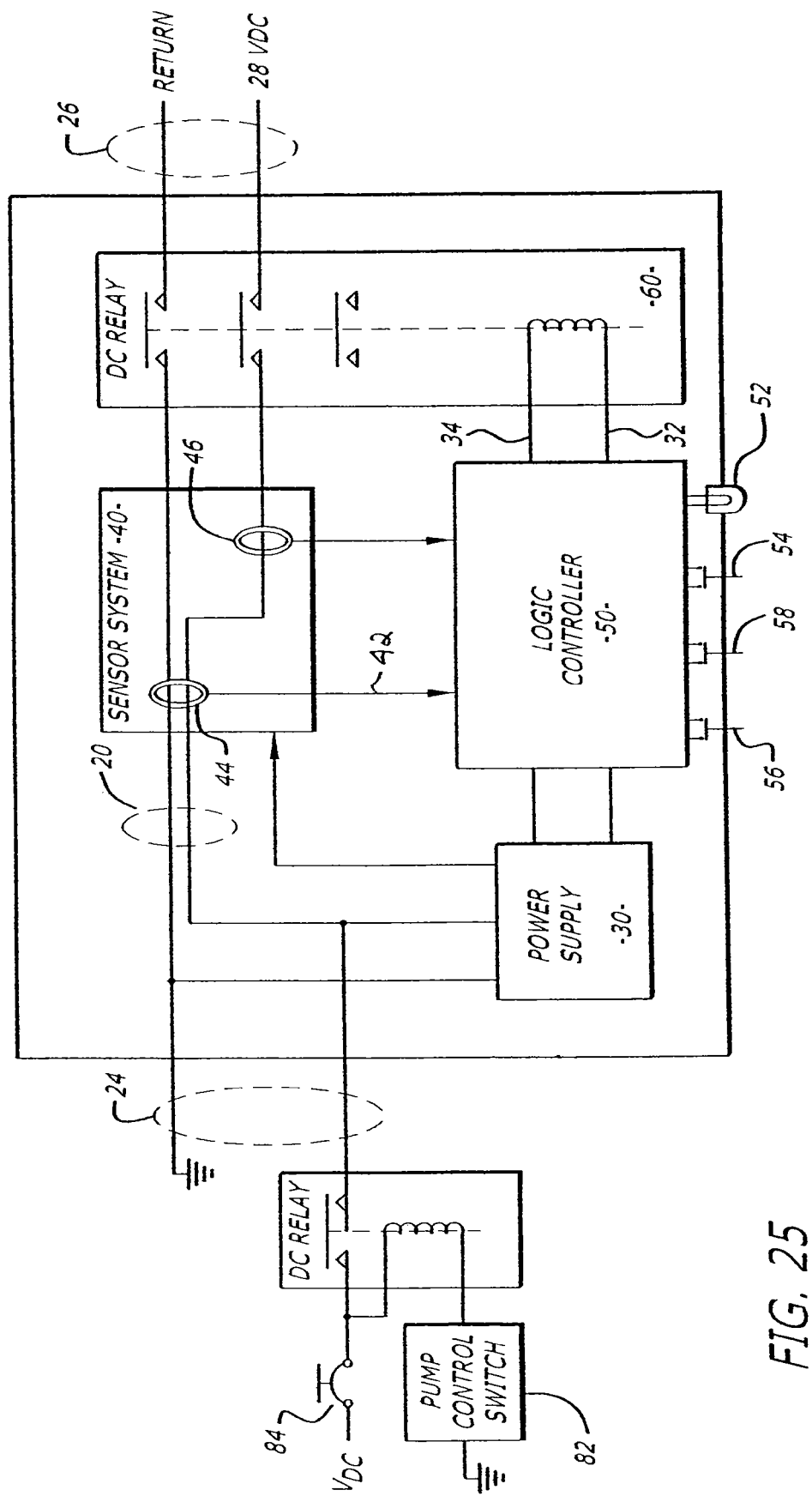
FIG. 25 is a DC standalone current-fault detector configuration of the system including a power supply, a sensor system comprising a current imbalance sensor and an over-current sensor, and a power controller comprising a DC relay.

With reference to FIG. 25, the system is adapted to monitor the current path between a DC power source and a load powered by the power source. The system includes a power supply 30 that taps off of the DC line and the return line at the input side 24 of the electrical circuit. The power supply 30 provides power to the sensor system 40, the logic controller 50 and the power controller 60. The sensor system 40 includes one imbalance sensor 44 and one over-current sensor 46.

Figure 26:
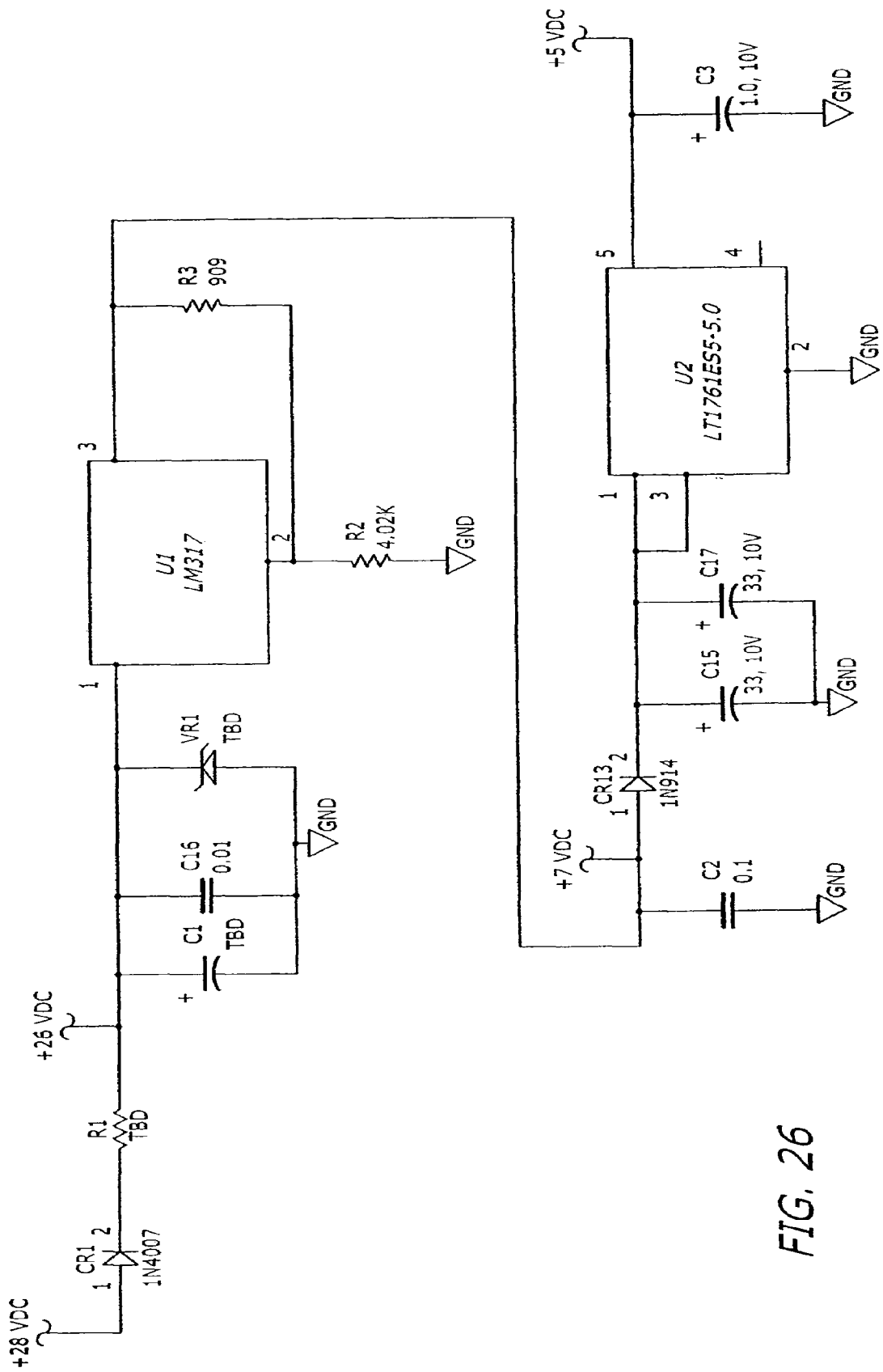
FIG. 26 is a schematic diagram of the power supply of FIG. 25.

With reference to FIG. 26, in one preferred embodiment, the power supply has two linear power supplies U1 and U2. Power supply U1 provides 7 VDC to the current sensors 44, 46 (FIG. 25) in order to get the maximum gain out of the current sensor while power supply U2 provides 5 VDC to the logic controller circuitry.

At the input side of the power supply, 28 VDC are received from the aircraft. Diode CR1 acts as a blocking diode. Capacitors C1 acts as storage devices for the approximate 26 VDC output by diode CR1. Resistors R2 and R3 function as a voltage divider to set the output of power supply U1 to 7 VDC. Diode CR13 in combination with capacitors C15 and C17 function to set the output of power supply U2 to 5 VDC.

Returning to FIG. 25, the power supply ground fault protection is accomplished by monitoring the current of the 28 VDC power and load return signals with the imbalance sensor 44. This current sensor 44 algebraically sums the magnetic flux generated by the power and return currents and produces an output signal 42 that is proportional to the result. With the 28 VDC power and load return signals of the fuel pumps passing through the ground fault sensor, the system is "closed", requiring the current going to the fuel pump to be equal and opposite the return current. Therefore, when a ground fault condition does not exist, the magnetic flux measured at the sensor is zero. When a ground fault condition occurs, current flows to ground (which does not return through the sensor), breaking the closed loop system and resulting in a magnetic flux imbalance measured at the sensor. Since the flux imbalance is proportional to the current, the output 42 of the sensor provides the magnitude of the current loss.

Although the ground fault nomenclature implies an arc/short to ground, the detection method senses a current imbalance condition due to current loss as a result of a power to ground path or from power to any other aircraft wiring outside the closed loop system. The system thus provides detection of any incorrect connection downstream of its installation A 28 VDC to load-return arc/short would not be detected as ground fault since a 28V to load-return current flow is normal and the closed loop system does not result in current loss. Although this arc-short increases the current amplitude beyond normal levels, this is not an imbalance condition and the net corresponding magnetic flux sum at the ground fault sensor will be zero.

In order to detect this undesirable fault condition, over-current protection is achieved with the over-current sensor 46 to monitor the current level of the 28 VDC power signal. The magnetic flux generated by the current passing through this sensor 46 produces an output signal proportional to current amplitude. An over-current condition exists when the current amplitude exceeds a predetermined threshold limit. Similar to ground fault detection, over-current detection latches a tripped condition. The threshold limit for over-current detection is chosen with a sufficient margin to prevent the fuel pump maximum start up and pump maximum operating currents from creating nuisance trips. Due to the differences in the start up and operating currents, two threshold limits are used for the over-current design, in a manner similar to that previously discussed with respect to other embodiments of the invention.

In operation, the system monitors the electrical circuit 20 between the line side 24 and the load side 26 for undesirable ground faults and over-current conditions. These flux signals produced by the sensors 44, 46 are input to the logic controller 50. The logic controller 50 conditions and passes the signals through filters to eliminate noise fluxes of either polarity. When a ground fault or over-current condition occurs, the logic controller 50 interrupts the return path 34 of the relay power input 32. This causes the relay 60 to latch open thereby interrupting the current path 20 to the load side 26. An LED 52 indicates the detected fault. The relay 60 remains latched until reset manually by pressing the reset button 54 on the system housing. A separate latching relay (described further below) in the logic controller 60 is used to store the fault condition resulting in indefinite retention of the fault condition. Thus, cycling the fuel pump 28 VDC power via the control switch 82 does not reset the system. When the system is not in a faulted state, control of the fuel pump is achieved through the aircraft pump control switch 82.

The manual reset switch 54 prevents aircraft cockpit cycling of switch 82 and circuit breaker 84 from reapplying power back into an existing ground fault or over-current condition. A manual reset forces a conscious maintenance action that should be performed after performing the necessary maintenance trouble shooting to fault isolate the failure.

A periodic maintenance inspection to verify the integrity of the system is performed by pressing two press-to-test switches located on the housing. One switch provides a ground-fault test 56 and the other provides an over-current test 58. Positive visual indication to show the FBP is functioning properly is provided by the LED 52.

In one configuration of the standalone current-fault protection device, a ground fault detection is accomplished when a current imbalance exists that is outside the acceptable range of −1.5 A RMS to +1.5 A RMS. This range provides sufficient margin to prevent leakage current that normally occurs with components submerged in fuel from causing nuisance trips.

Over-current detection is achieved with a separate sensor to monitor the current level of the 28 VDC power. The magnetic flux generated by the 28 VDC current passing through this sensor produces an output signal proportional to current amplitude, resulting in an over-current condition when the current amplitude exceeds the predetermined threshold. Similar to the ground fault condition, over-current detection latches a tripped condition. As with earlier described embodiments, the threshold limit for over-current detection is chosen with sufficient margins to prevent normal start up and operating conditions from creating nuisance trips. Thus, the over-current design has a two-tier threshold, one threshold during start up and another threshold for operation, similar to those previously described with reference to other embodiments of the invention.

Pressing the ground fault test switch 56 simulates a ground fault condition by passing a current through the imbalance sensor 44 that is just above the maximum threshold. The manual test provides visual indication of the ground fault detection by lighting the LED 52, latching the fault condition and opening the relay 60. The reset switch must be pressed to clear the latched ground fault condition, LED, and allow the relay 60 to close. The over-current test switch 58 simulates an over-current condition by passing a current through the over-current sensor 44 that is just above the threshold. Visual indication of the over-current detection is provided by lighting the LED 52, latching the fault condition and opening the relay 60 Pressing the reset switch 54 again clears the device and completes the end-to-end test, rearming the device for normal use. When performing the end-to-end test, the ground fault test switch 56 and over-current test switch 58 can be pressed in either order. The switches are guarded to prevent accidental pressing. In an alternate configuration, the system is provided with two LEDs, one for providing an indication of a ground fault condition and the other for providing an indication of an over-current condition.

In the event of a real fault condition, the device de-energizes its relay and removes power to the pump. The device does not have any direct output to the aircraft alerting system, so the flight crew is alerted to the fault condition by the existing alerting method of the component being protected. When the motor is de-energized the pump loses pressure and the boost pump pressure switch alerts the flight crew that the boost pump is inoperative. Any attempts to turn on the boost pump again have no results. Resetting the device after a fault condition is accomplished by ground maintenance crew after performing the necessary fault isolation procedures.

Figures 1, 27A:
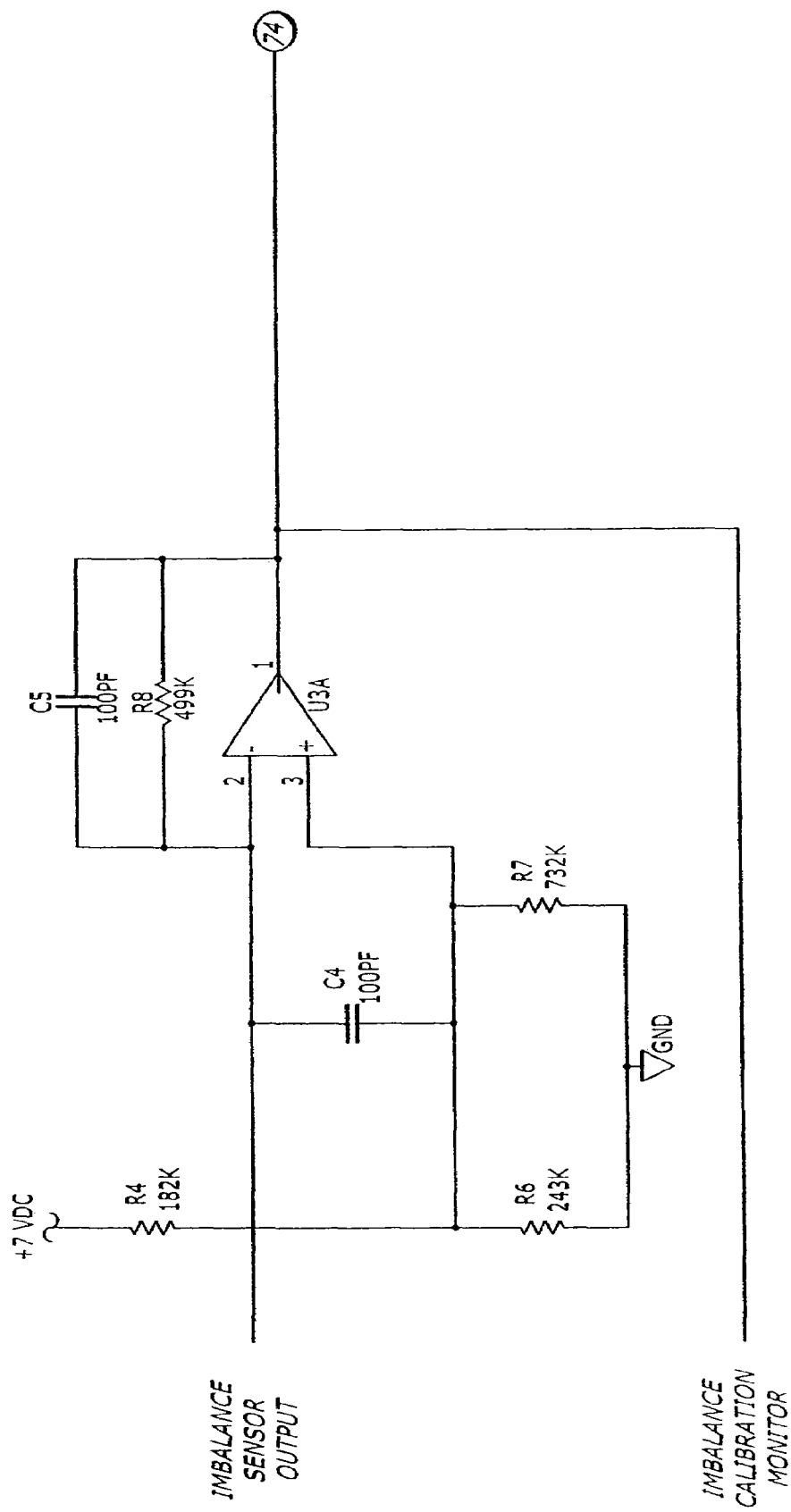
Figures 2, 27A:
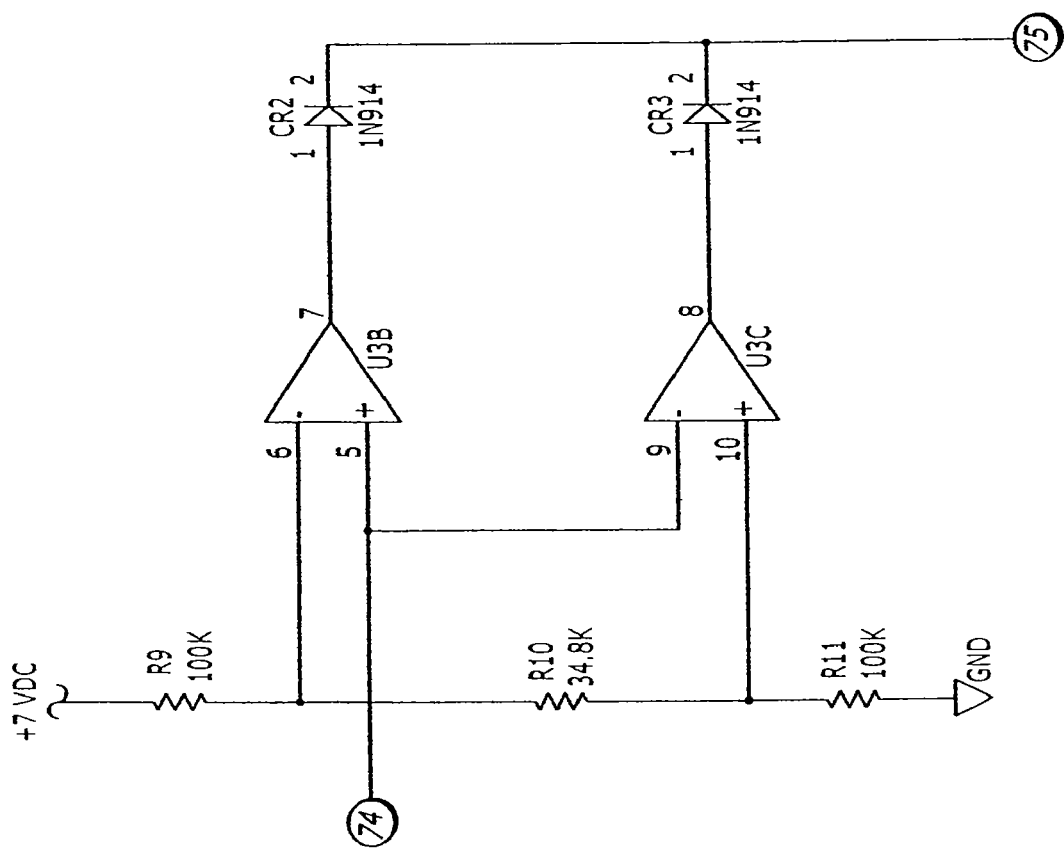
Figures 3, 27A:
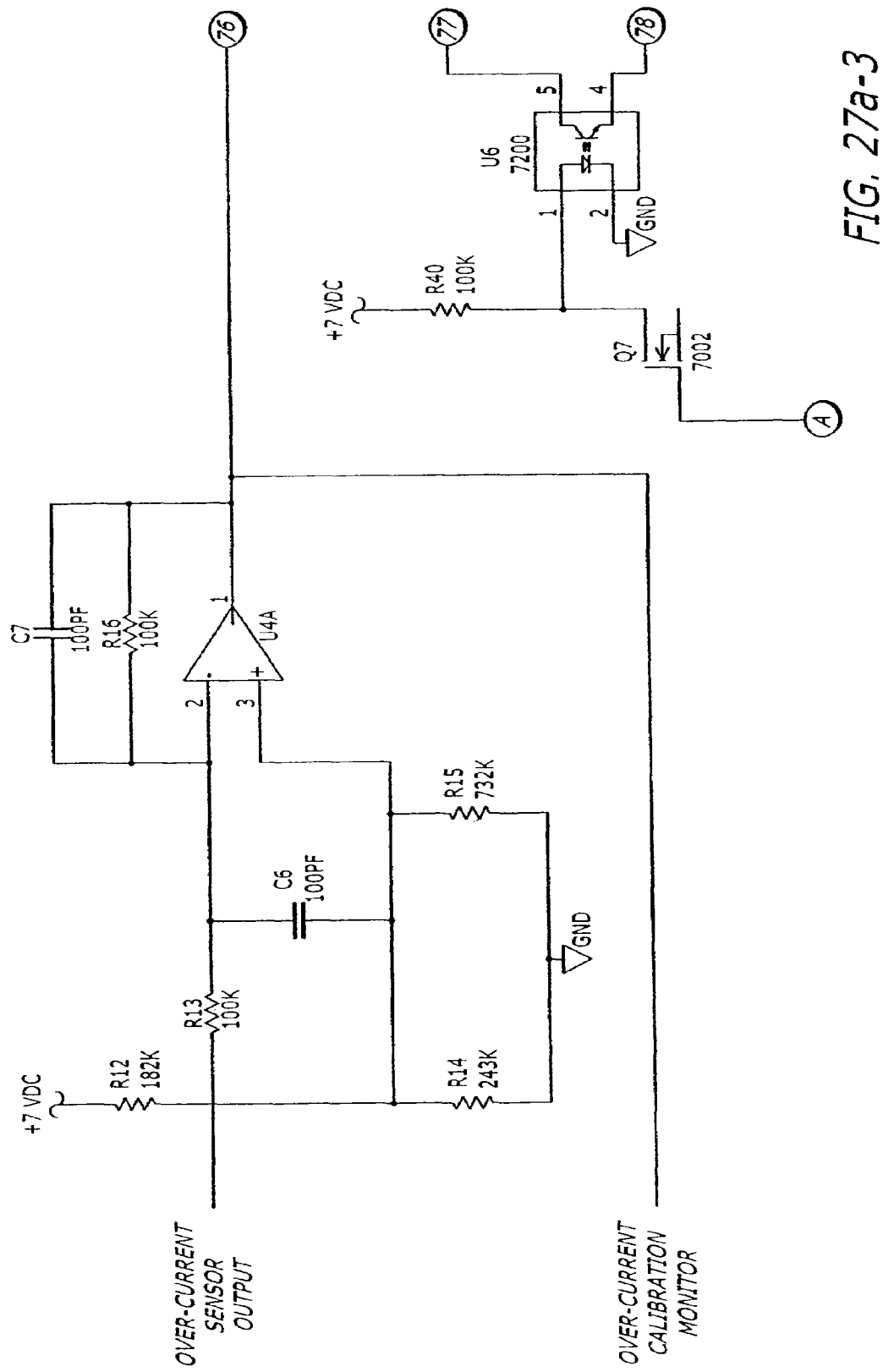
Figures 4, 27A:
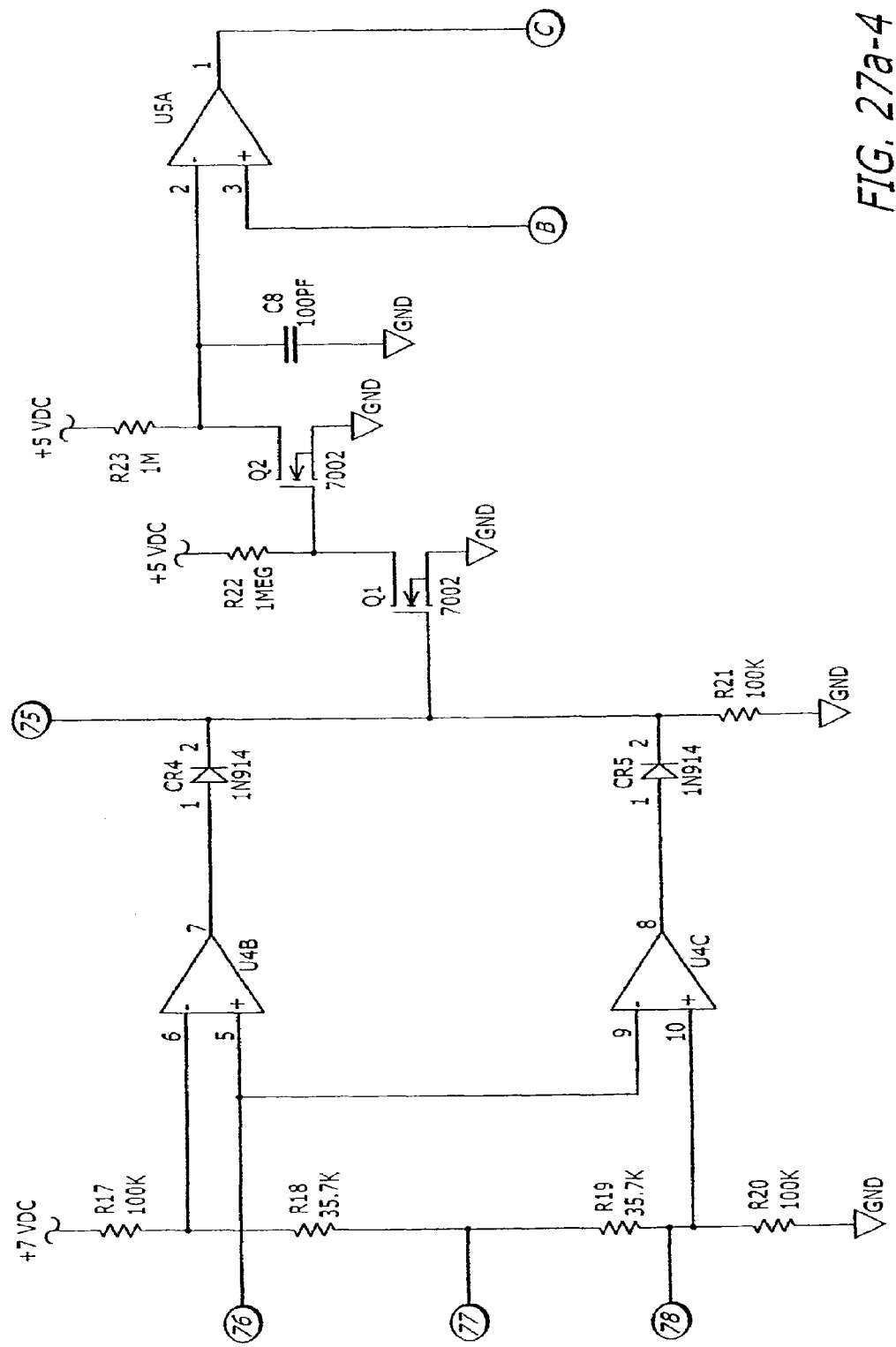
Figures 1, 27B:
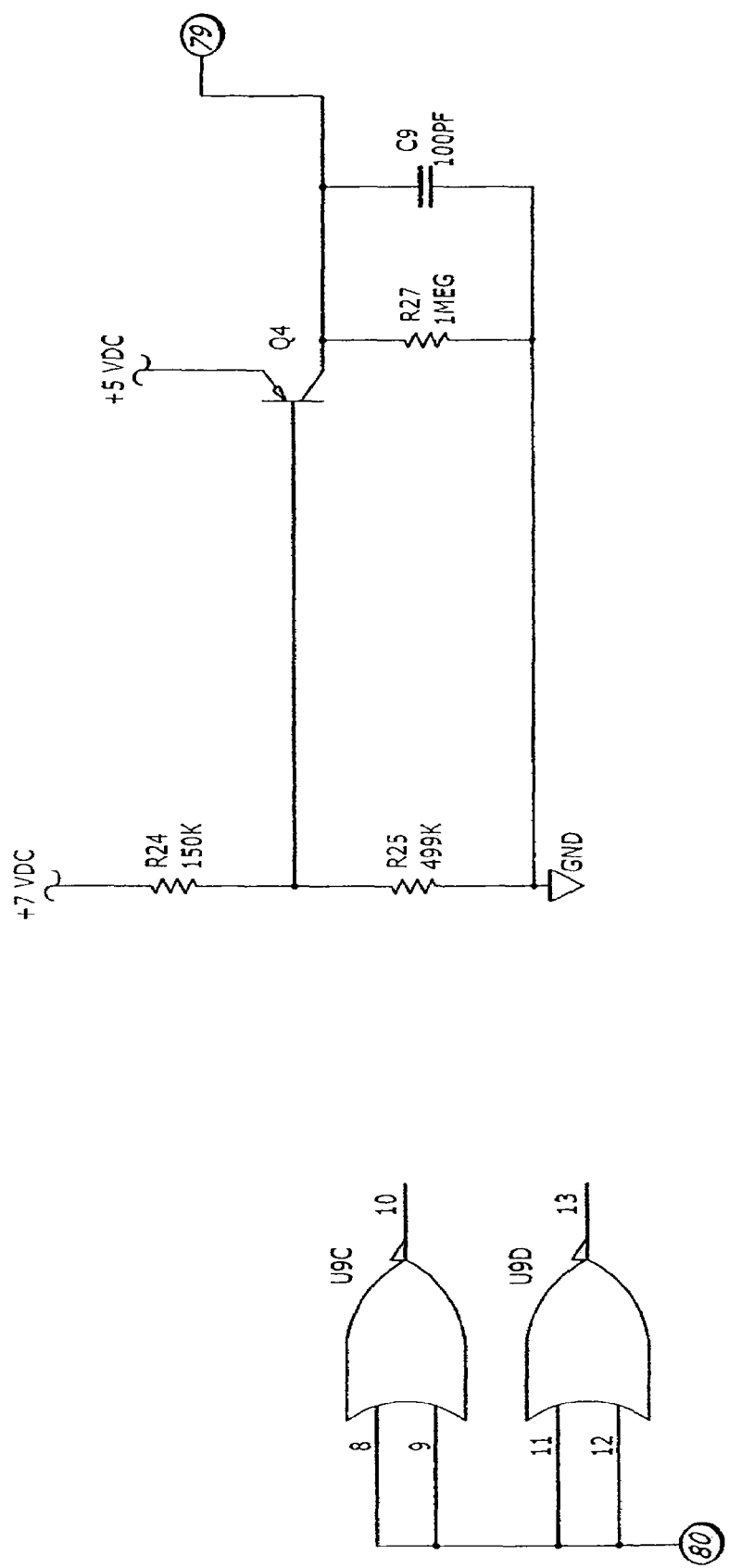
Figures 2, 27B:
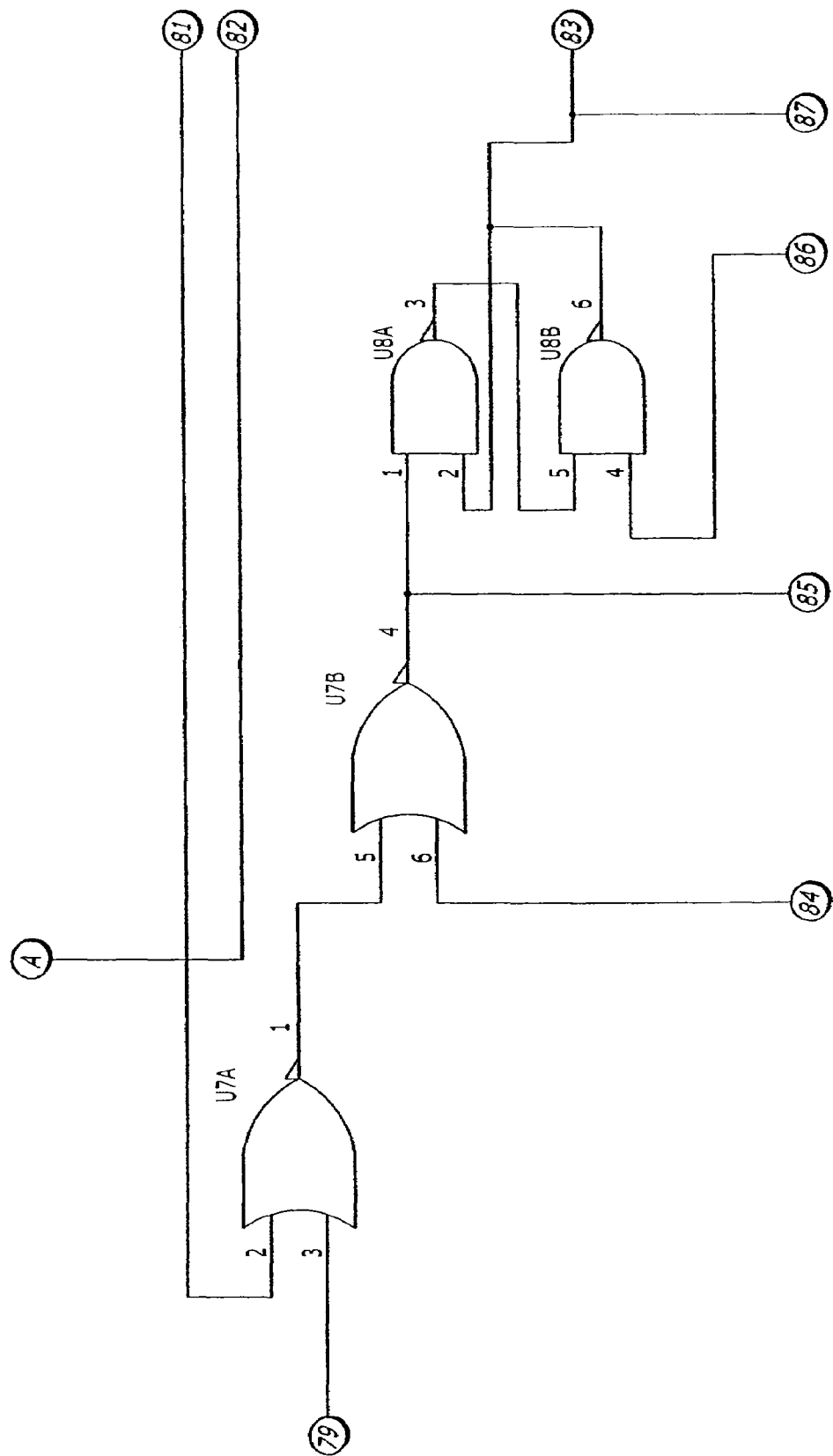
Figures 3, 27B:
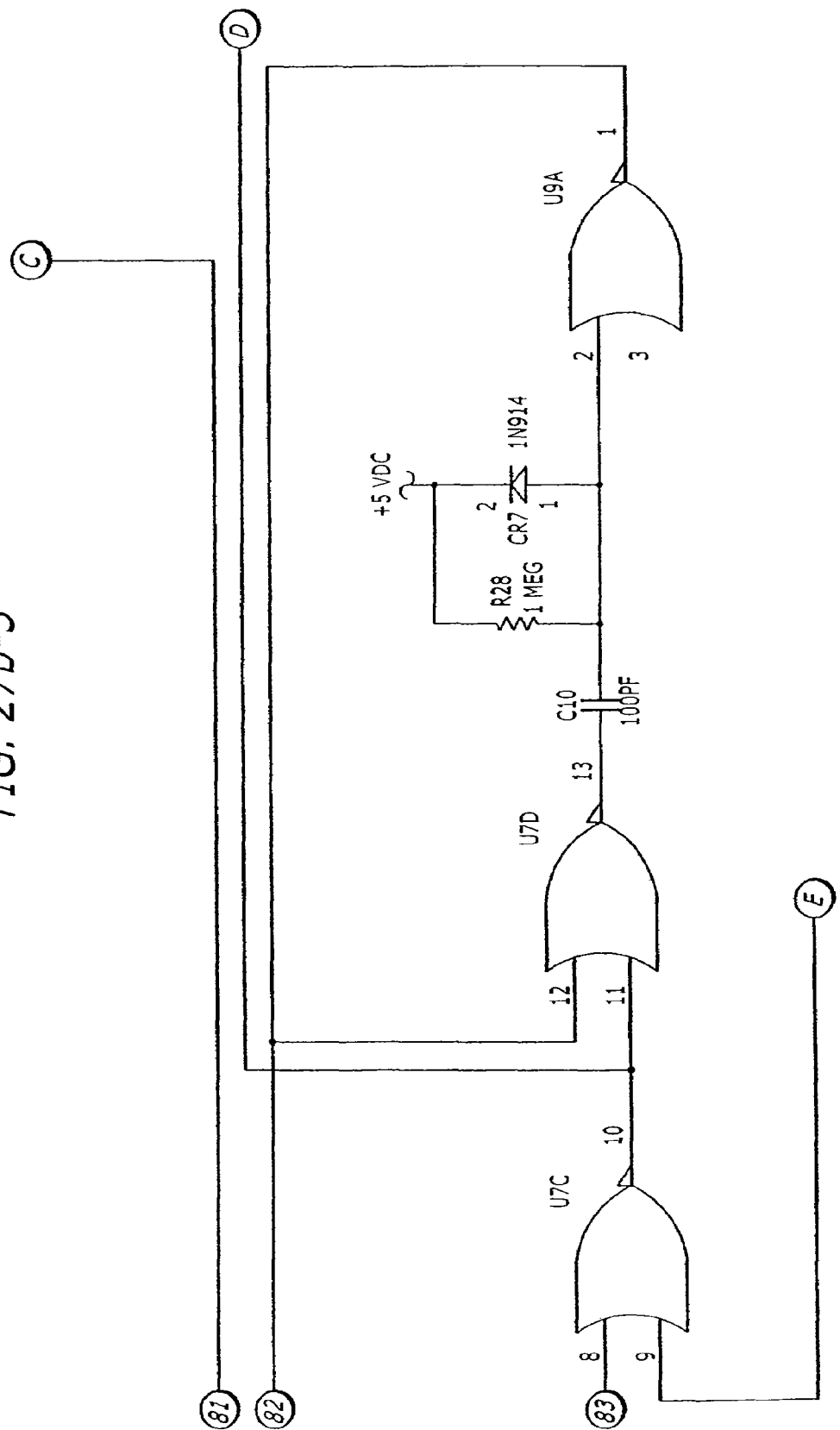
Figures 4, 27B:
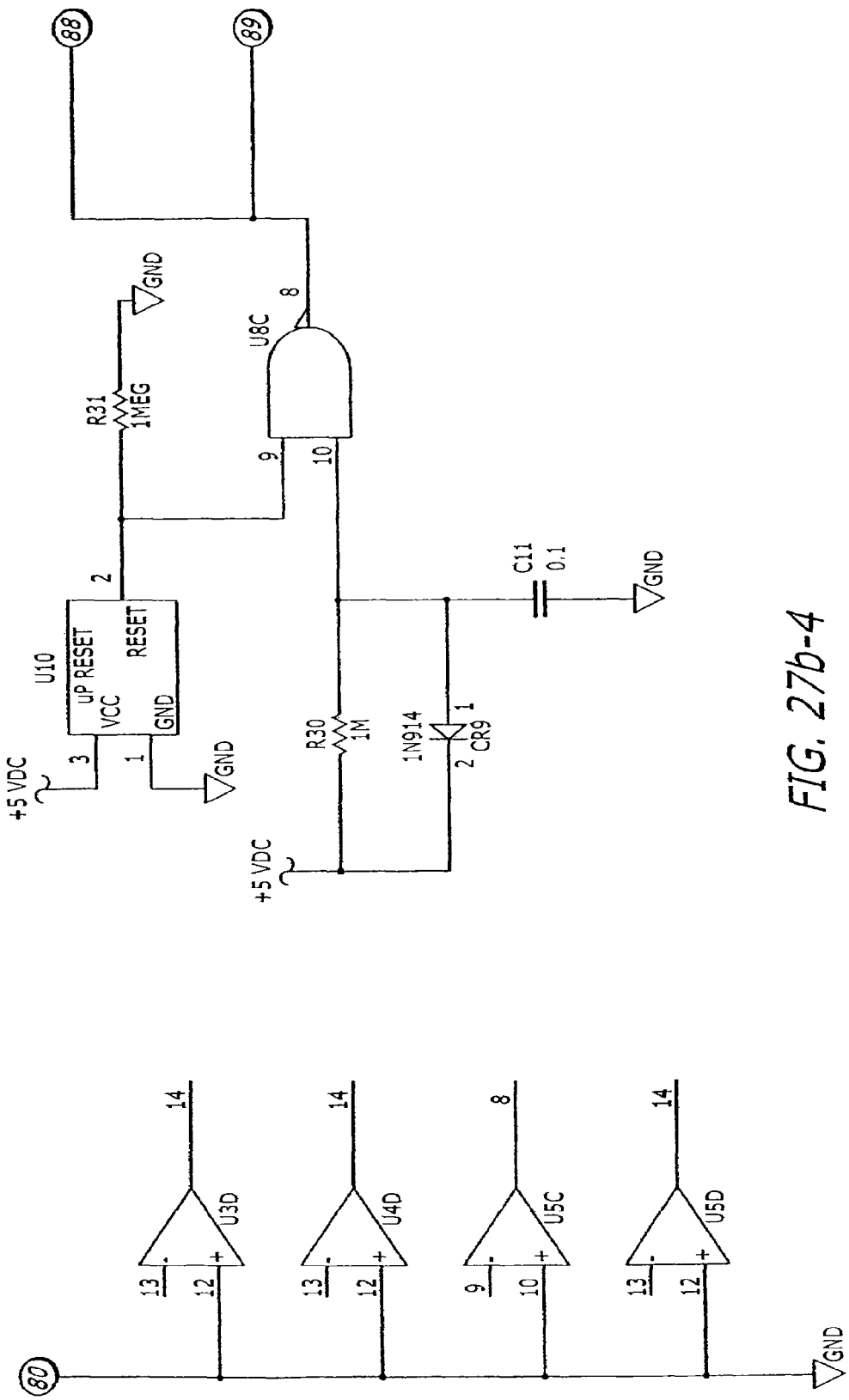
Figures 5, 27B:
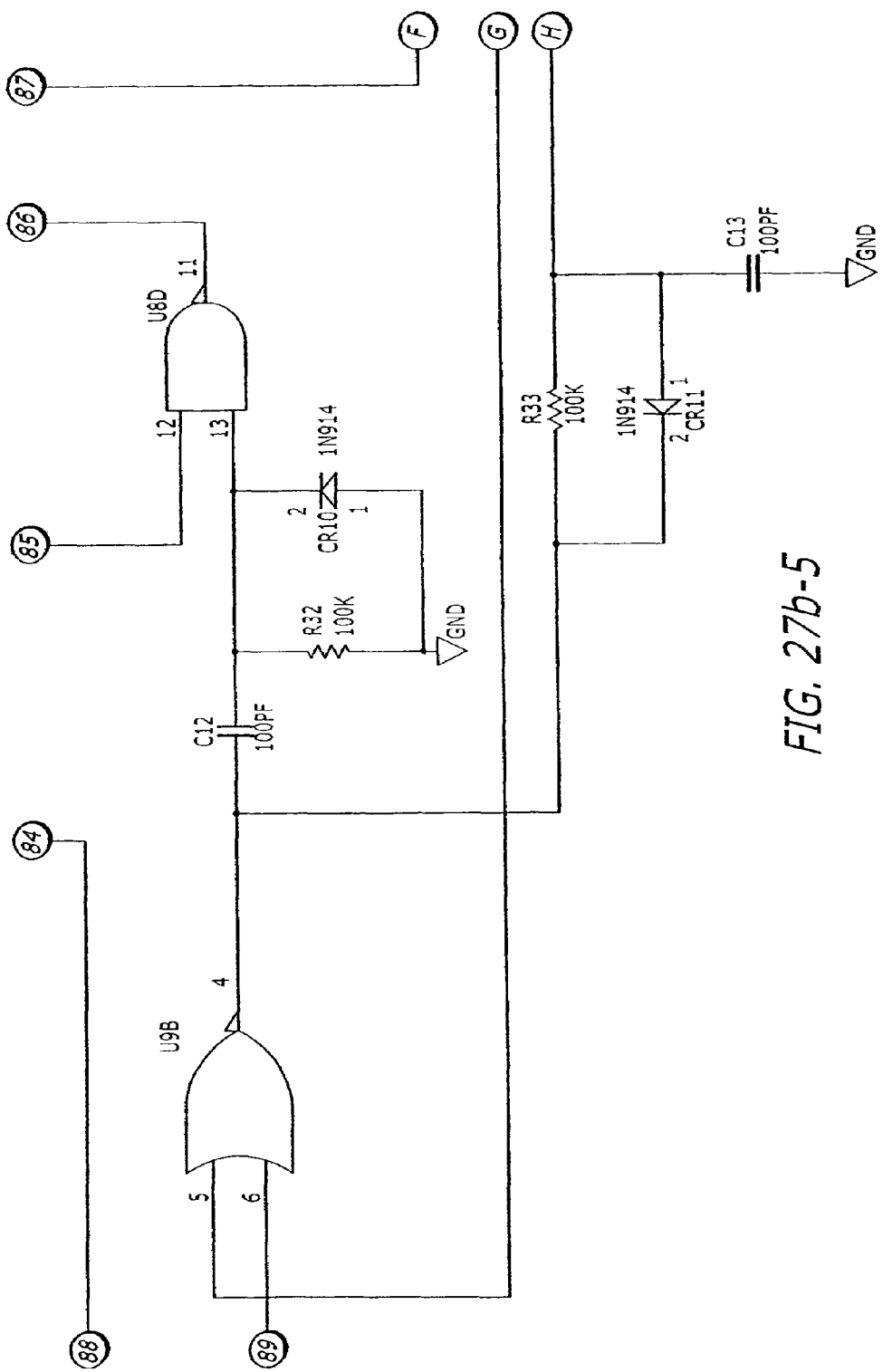
Figures 1, 27C:
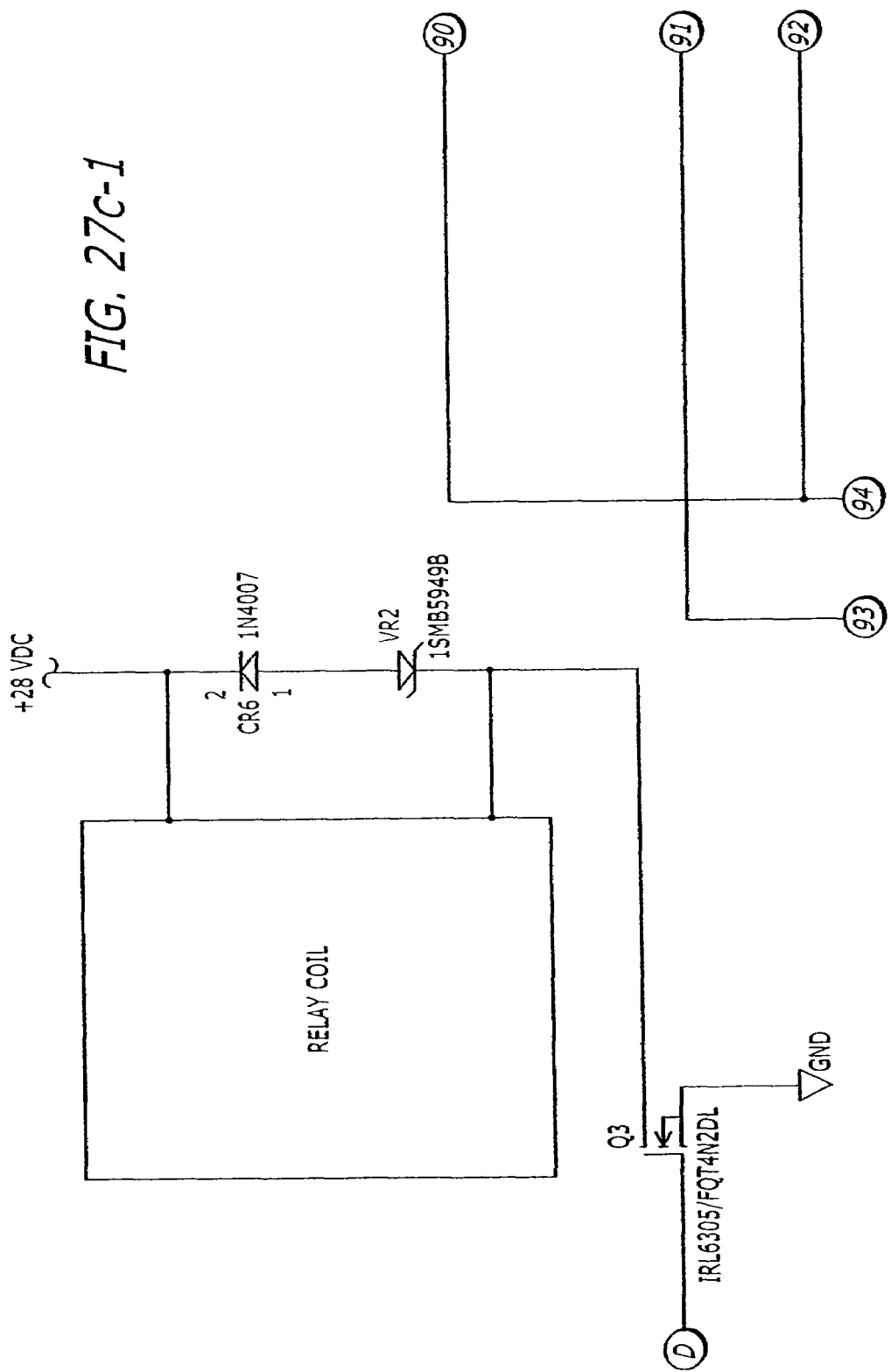
Figures 3, 27C:
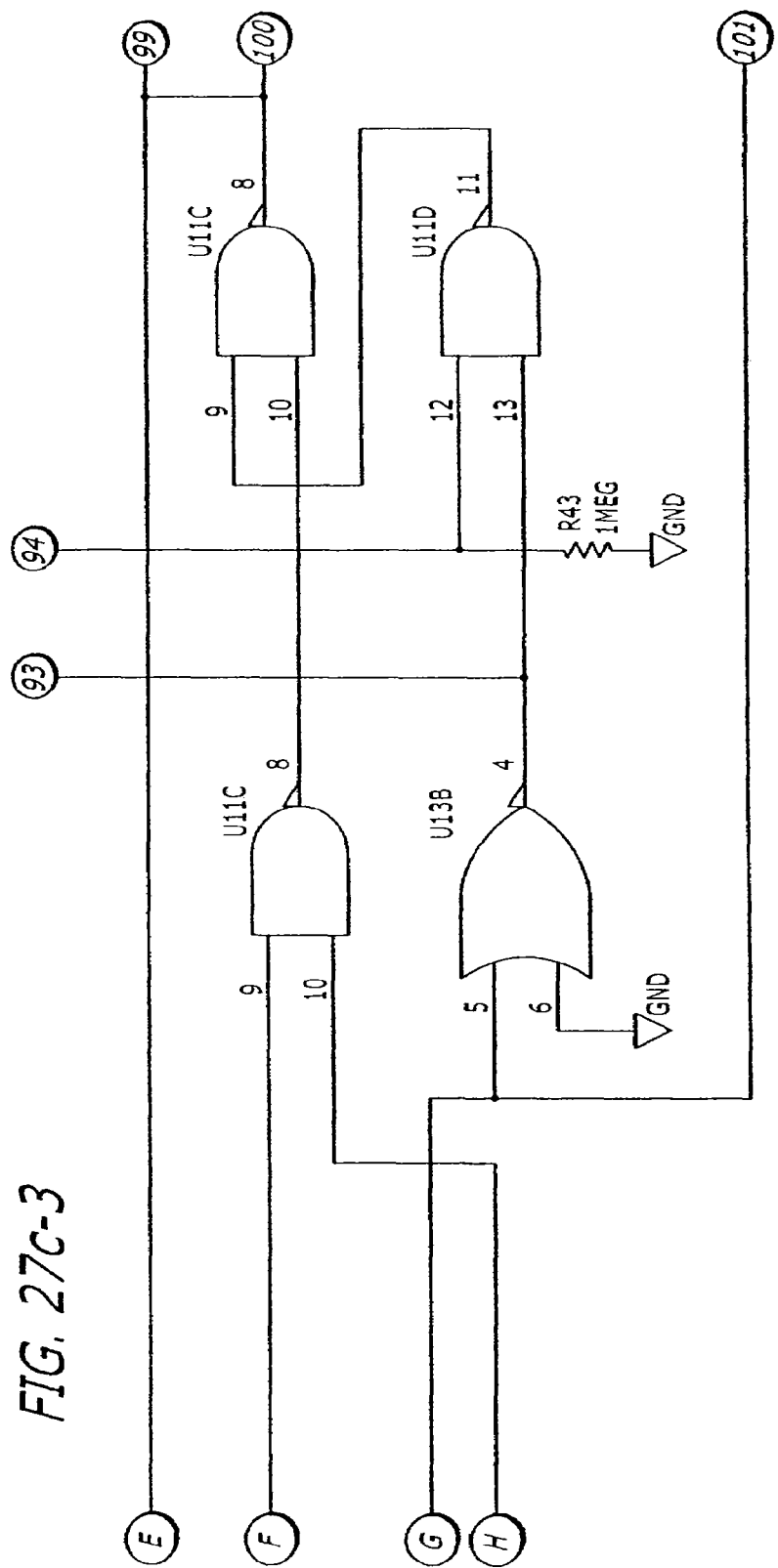
Figures 4, 27C:
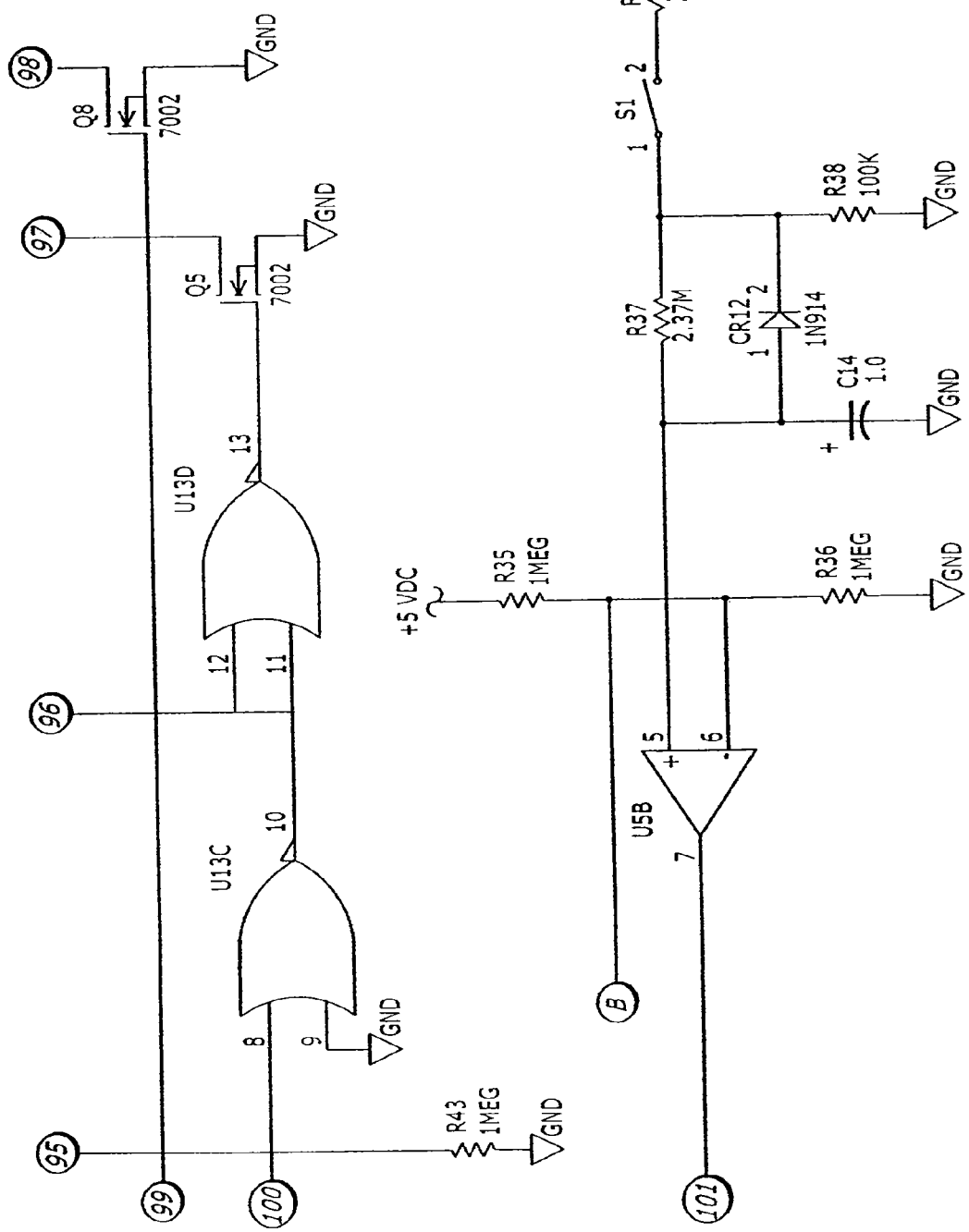

With reference to FIGS. 27a through 27c, the logic controller includes circuitry similar to that previously described with reference to other embodiments of the invention. Specifically, the sensor control circuitry (FIG. 27a) includes an amplifier U3A that conditions the imbalance signal received from the imbalance sensor and amplifier U4A that conditions the over-current signal received from the over-current sensor. The output of the over-current sensor is input to amplifiers U4B and U4C. Component U6, in combination with transistor Q7 and resistors R19 and R20, set the over-current threshold to either a normal operation threshold or a start-up threshold in a manner similar to that described with reference to FIG. 8a.

The maintenance circuitry (FIG. 27c) includes three switches S1, S2 and S3. Switch S1 functions as a reset switch like that previously described with reference to FIG. 5b. Switch S2, resistor R41 and coil L1 function as the press-to-test circuit with respect to the imbalance sensor while switch S3, resistor R42 and coil L2 function as the press-to-test circuit with respect to the over-current sensor. In each case the coil is wrapped around its associated current sensor a sufficient number of times such that when its associated switch is closed the sensor outputs a signal indicative of a current fault condition. The rest of the logic circuitry, as shown in FIGS. 27b and 27c, is similar to that previously described with reference to FIGS. 5b and 5c-4.

AC Configuration

Figure 28:
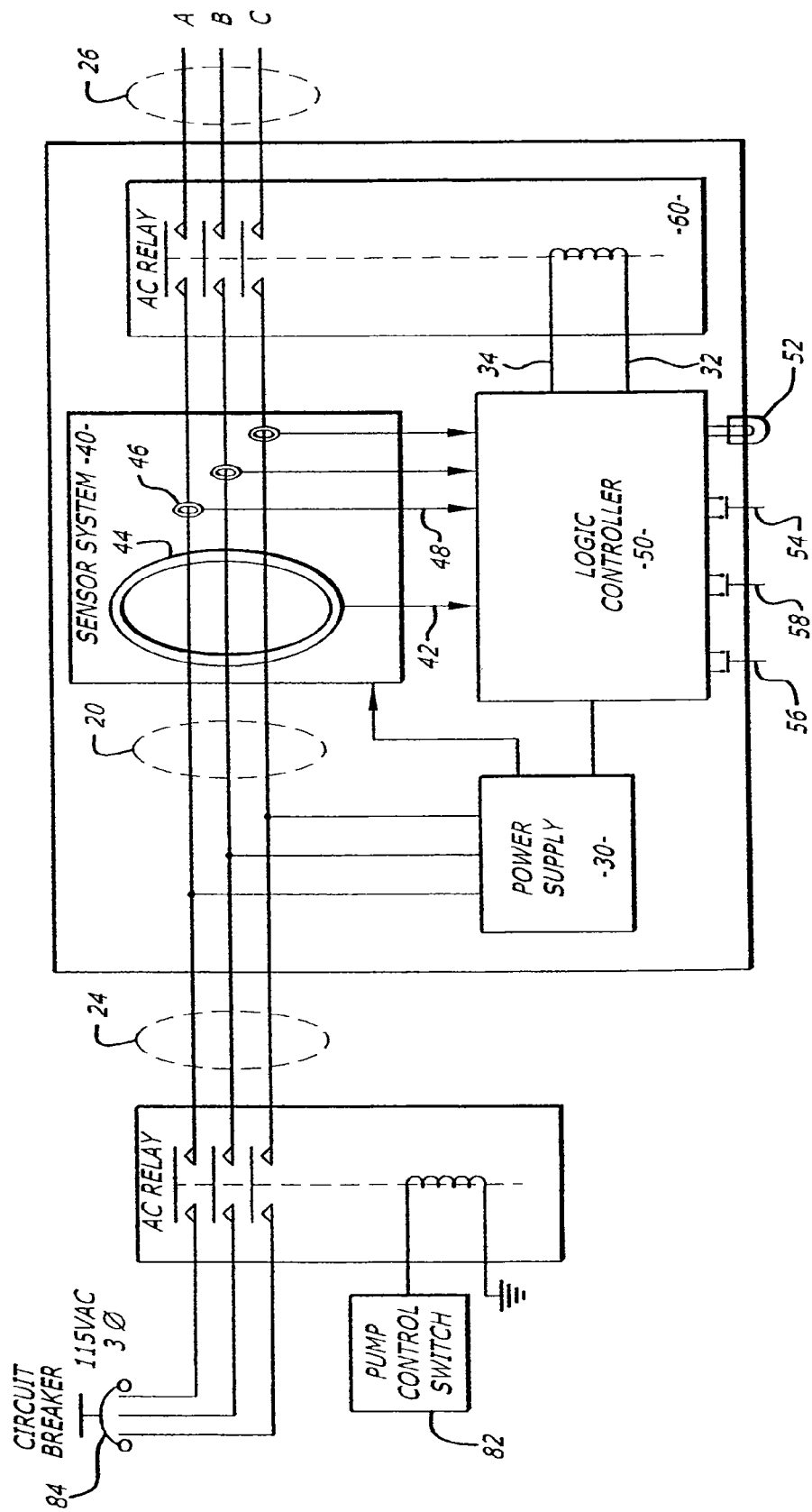
FIG. 28 is a AC standalone current-fault detector configuration of the system including a power supply, a sensor system comprising a current imbalance sensor and three over-current sensors and a power controller comprising an AC relay.

With reference to FIG. 28, in another configuration the system is adapted to monitor the current path between an AC power source and a load powered by the power source. The system includes a power supply 30 that taps off of each of the 115 VAC three phase lines at the input side 24 of the electrical circuit. The power supply 30 provides power to the sensor system 40, the logic controller 50 and the power controller 60. The sensor system 40 includes a single sensor 44 and three over-current sensors 46. The single sensor 44 determines the current condition in the current path 20 by providing an output sensor signal 42 indicative of the current balance among the electrical lines. Each of the over-current sensors 46 outputs a signal 48 indicative of the amount of current passing through its associated electrical line.

These signals are provided to the logic controller 50 where they are compared against maximum acceptable threshold values in a manner similar to that described with reference to FIGS. 8a-1 through 8c-4. If any of the sensor signals 42, 48 does not satisfy the preestablished criteria, the return path 34 of the power supply 32 to the AC relay 60 is interrupted.

Solid State Configuration

Figure 29:
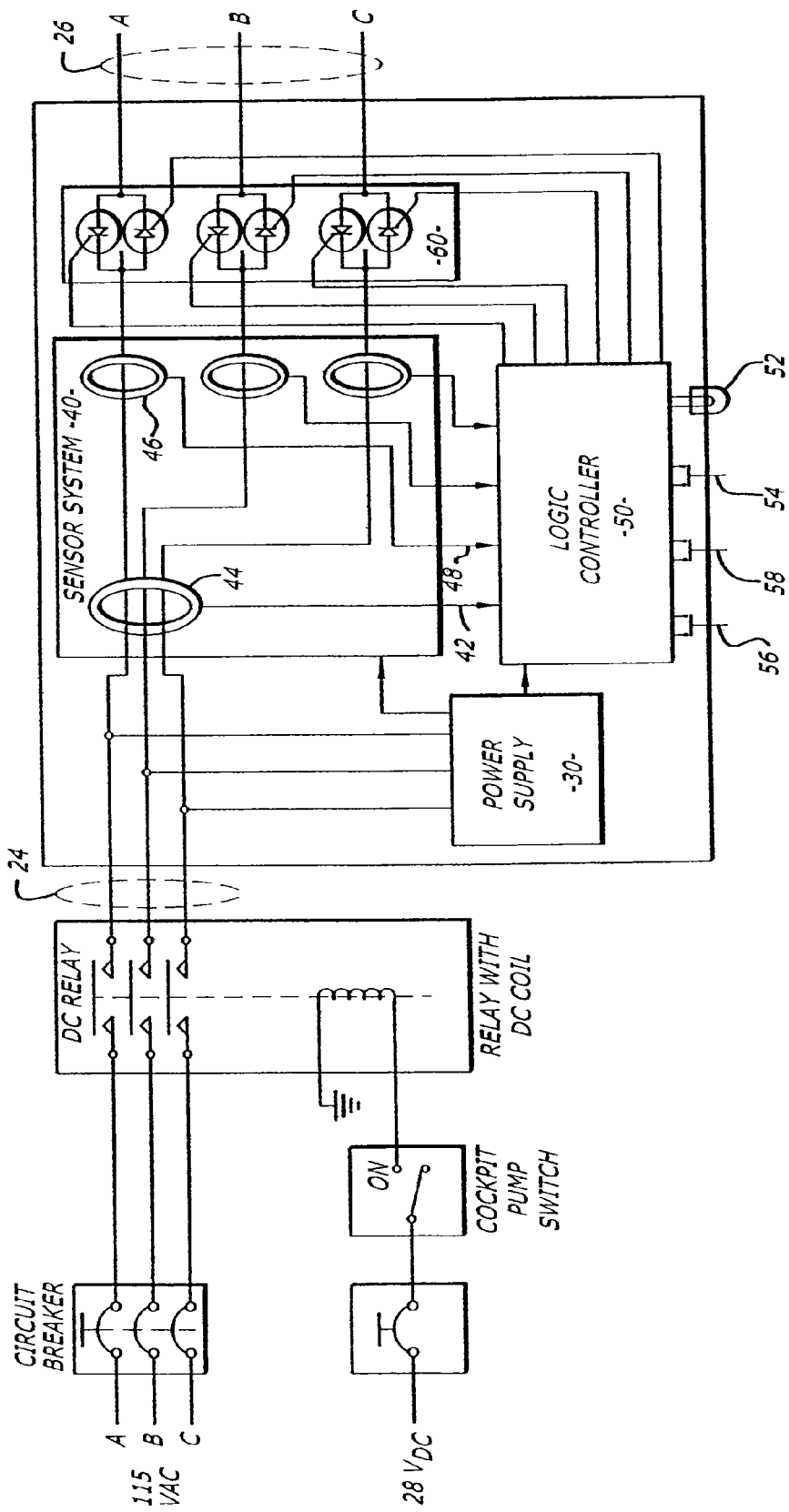
FIG. 29 is a solid state standalone current-fault detector configuration of the system including a power supply, a sensor system comprising a current imbalance sensor and three over-current sensors, and a power controller comprising a solid state relay.

With reference to FIG. 29, in another configuration the system is adapted to monitor the current path between an AC power source and a load powered by the power source. The system includes a power supply 30 that taps off of each of the 115 VAC three phase lines at the input side 24 of the electrical circuit. The power supply 30 provides power to the sensor system 40, the logic controller 50 and the power controller 60. The sensor system 40 includes a single sensor 44 and three over-current sensors 46. The single sensor 44 determines the current condition in the current path 20 by providing an output sensor signal 42 indicative of the current balance among the electrical lines. Each of the over-current sensors 46 outputs a signal 48 indicative of the amount of current passing through its associated electrical line.

These signals are provided to the logic controller 50 where they are compared against maximum acceptable threshold values in a manner similar to that described with reference to FIGS. 8a-1 through 8c-4. If any of the sensor signals 42, 48 does not satisfy the preestablished criteria, the logic controller 50 switches the solid state device to an open position, thereby interrupting the current path to the load side 26.

Packaging

With reference to FIGS. 30a-30f, the above-described standalone current fault protection devices can be contained in a corresponding housing 200 which in one embodiment has the following dimensions: approximately 2.50 inches (about 6.35 cm.) from top 202 to bottom 204 and approximately 4.00 inches (about 10.16 cm.) along its sides 206. The housing also includes a line input connector 208 and a line output connector 210 for interfacing with existing aircraft wiring.

Figure 30A:
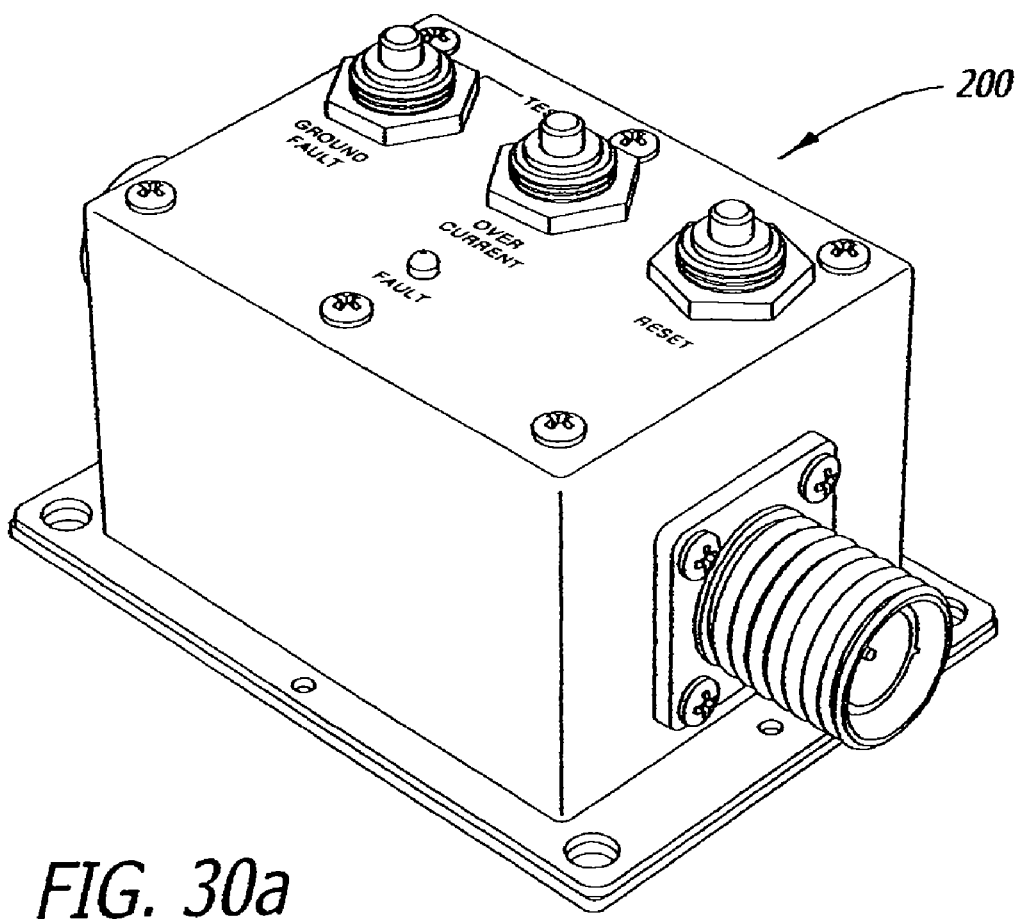
FIG. 30a is a perspective view of a standalone current-fault detector device configured in accordance with the invention.
Figure 30B:
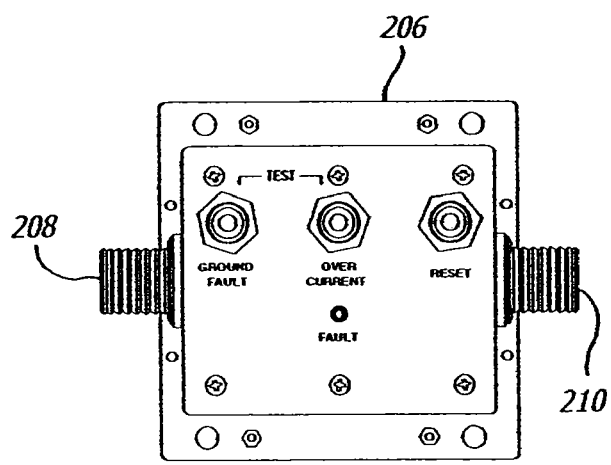
Figure 30C:
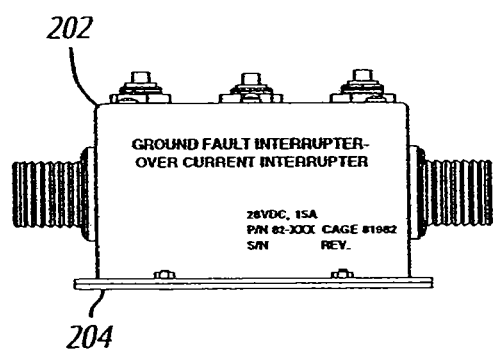
Figure 30D:
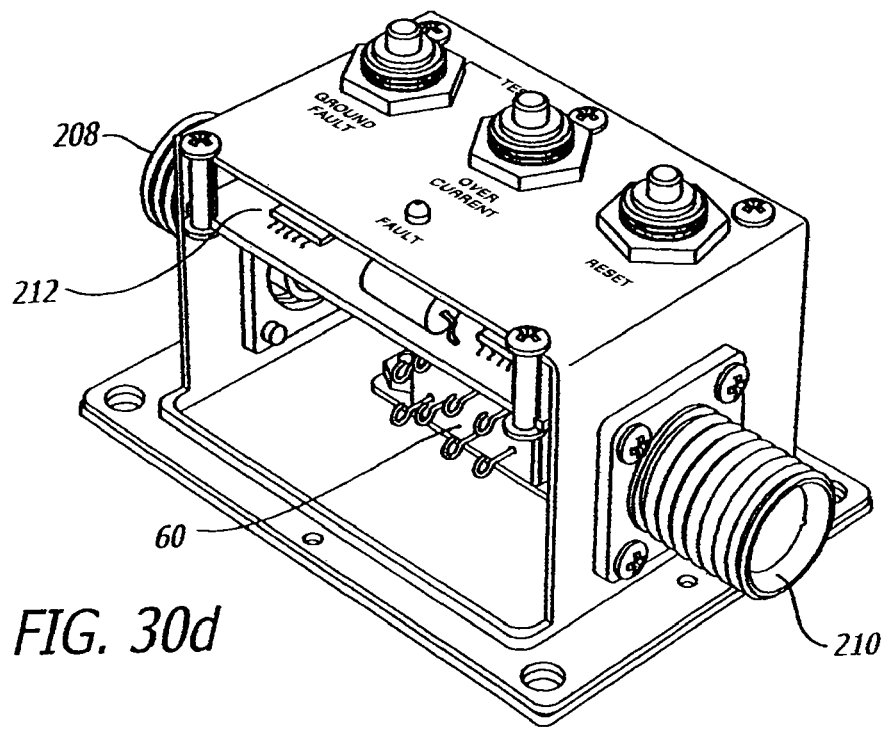
FIG. 30d is a perspective view of the device of FIG. 30a with a cutaway showing components including the power controller and a printed wiring board having system components mounted thereon.

Referring to FIGS. 25 and 30d, the input connector 208 accommodates a DC input line from the aircraft while the output connector 210 accommodates a DC line to the aircraft load. The circuitry forming the power supply 30, the logic controller 50 and the maintenance system 70 is mounted to a circuit board 212. The maintenance system 70 circuitry interfaces with the push/pull button 186 and the Test button located on the top of the housing 180. The sensor system (not visible) are positioned beneath the circuit board 212. The input lines A and B pass through the sensor system power controller 60 and are input to the power controller 60.

From the above, it may be seen that the present invention provides a method and apparatus for maintaining the current conditions in electrical equipment in aircraft which may be adapted to a variety of systems and components. As such, it provides additional reliable and rapid disconnect of power to the existing systems, thus reducing damage from ground faults or over-current conditions in the circuits. While a particular form of the invention has been illustrated and described it will also be apparent that various modifications can be made without departing from the spirit and scope of the invention. Accordingly, it is not intended that the invention be limited except as by the appended claims.

What is claimed is:

1. A device for interrupting a current path between the line side and the load side of an electrical circuit:
   a power controller adapted to close the current path in the presence of a control signal and open the current path in the absence of the control signal;
   terminals for interconnecting said power controller to said line side and said load side of said electrical circuit;
   a sensor system adapted to monitor the current in the current path and output a sensor signal indicative of a current condition within the current path; and
   a logic controller adapted to receive the sensor signal and remove the control signal from the power controller when the sensor signal does not satisfy an established criteria;
   wherein said sensor system and said logic controller are positioned between said power controller and said terminals.

2. The device of claim 1 wherein the current path comprises three electrical lines, the sensor system comprises a single sensor associated with the electrical lines and the current condition comprises the current balance among the electrical lines.

3. The device of claim 1 wherein the current path comprises three electrical lines, the sensor system comprises three sensors, each associated with one of the electrical lines and the current condition comprises the current measurement in each electrical line.

4. The device of claim 1 wherein the current path comprises three electrical lines, the sensor system comprises four sensors, three sensors each associated with one of the electrical lines individually and one sensor associated with the three electrical lines collectively, and the current condition comprises the current balance among the electrical lines and the current measurement in each electrical line.

5. The device of claim 1 wherein the current path comprises a DC voltage line and a return line, the sensor system comprises a single sensor associated with the lines and the current condition comprises the current balance among the DC voltage line and the return line.

6. The device of claim 1 wherein the current path comprises a DC voltage line and a return line, the sensor system comprises a single sensor associated with the DC voltage line and the current condition comprises the current measurement in the DC voltage line.

7. The device of claim 1 wherein the current path comprises a DC voltage line and a return line, the sensor system comprises two sensors, one sensor associated with the DC voltage line individually and one sensor associated with the DC voltage line and the return line collectively, and the current condition comprises the current balance among the DC voltage line and the return line and the current measurement in the DC voltage line.

8. The device of claim 1 wherein the sensors comprise any one of a Hall effect sensor, a current transformer and a giant magneto resistive sensor.

9. The device of claim 1 wherein the logic controller comprises electrical circuitry configured to compare the sensor signal to a preestablished threshold range and to output a fault signal when the sensor signal is not within the range.

10. The device of claim 9 wherein the sensor system comprises a sensor associated with at least two electrical lines, the sensor adapted to output a sensor signal indicative of the current balance among the electrical lines and the predetermined threshold range is between approximately −1.5 A RMS and +1.5 A RMS.

11. The device of claim 9 wherein the load side of the electrical circuit is connected to an electrical load having an associated operating current, the sensor system comprises at least one sensor associated with one electrical line, the sensor adapted to output a signal indicative of the current passing through the electrical line and the predetermined threshold value is approximately 1.25× the operating current.

12. The device of claim 9 wherein the load side of the electrical circuit is connected to an electrical load having an associated first operating current for a first amount of time and a second operating current for a second amount of time and the logic controller comprises circuitry adapted to set the predetermined threshold value at a first level during the first amount of time and a second level during the second amount of time.

13. The device of claim 9 wherein the first amount of time comprises the startup time associated with the electrical load and the second amount of time comprises time other than the startup time.

14. The device of claim 1 wherein the power controller comprises a DC relay.

15. The device of claim 1 wherein the power controller comprises a AC relay.

16. The device of claim 1 wherein the logic controller is further adapted to monitor an external on/off power switch and remove the control supply from the power controller when either of the following conditions occur: the sensor signal does not satisfy an established criteria, or the external power switch is off.

17. The device of claim 1 further comprising test circuitry adapted to cause the sensor system to output a sensor signal that does not satisfy the established criteria.

18. The device of claim 1, wherein said power controller, sensor system and logic controller are packaged within a single housing.

19. The device of claim 18, further comprising a light emitting diode interfacing with the logic controller, positioned on the outside of said housing and adapted to illuminate when the sensor signal does not satisfy the established criteria.

20. The device of claim 18, further comprising a mechanical indicator having first and second positions, interfacing with the logic controller and positioned on the outside of said housing and adapted to change position when the sensor signal does not satisfy the established criteria.

21. The device of claim 18, further comprising buttons positioned on the outside of said housing for testing and resetting said device.

* * * * *

UNITED STATES PATENT AND TRADEMARK OFFICE
CERTIFICATE OF CORRECTION

| | | |
|---|---|---|
| PATENT NO. | : 7,375,937 B2 | Page 1 of 1 |
| APPLICATION NO. | : 11/678496 | |
| DATED | : May 20, 2008 | |
| INVENTOR(S) | : Ronald A. Bax et al. | |

It is certified that error appears in the above-identified patent and that said Letters Patent is hereby corrected as shown below:

<u>Column 1</u>,
Line 47, after "aircraft" insert --.-- (a period).

<u>Column 2</u>,
Line 28, delete "output" and insert --outputs--.
Line 29, delete "that" and insert --that is--.

<u>Column 3</u>,
Line 51, after "criteria" insert --.-- (a period).

<u>Column 15</u>,
Line 28, delete "USA" and insert --U5A--.

<u>Column 17</u>,
Line 6, delete "USA" and insert --U5A--.
Line 14, after "logic 0" insert --.-- (a period).
Line 21, delete "USA" and insert --U5A--.

Signed and Sealed this

Fourteenth Day of October, 2008

JON W. DUDAS
*Director of the United States Patent and Trademark Office*